United States Patent [19]

Hasegawa et al.

[11] Patent Number: 6,046,983
[45] Date of Patent: Apr. 4, 2000

[54] DYNAMIC RATE CONTROL SYSTEM

[75] Inventors: Haruhisa Hasegawa, Higashiyamato; Naoaki Yamanaka, Kokubunnji; Kouhei Shiomoto, Iruma, all of Japan

[73] Assignee: Nippon Telegraph and Telephone Corporation, Tokyo, Japan

[21] Appl. No.: 08/825,936

[22] Filed: Apr. 1, 1997

Related U.S. Application Data

[63] Continuation of application No. PCT/JP96/02131, Jul. 29, 1996.

[30] Foreign Application Priority Data

| Aug. 2, 1995 | [JP] | Japan | 7-197728 |
| Sep. 4, 1995 | [JP] | Japan | 7-226746 |
| Sep. 18, 1995 | [JP] | Japan | 7-238691 |
| Oct. 12, 1995 | [JP] | Japan | 7-264422 |
| Nov. 1, 1995 | [JP] | Japan | 7-285289 |

[51] Int. Cl.$^7$ .................................................. H04L 12/56
[52] U.S. Cl. ......................... 370/232; 370/395; 370/468
[58] Field of Search .................................... 370/229, 230, 370/231, 232, 233, 234, 235, 395, 468, 410, 455, 236, 252, 253, 411, 414, 415, 416, 412, 413; 395/200.65, 200.63; 710/29, 33, 34, 36, 37, 40, 41, 42

[56] References Cited

U.S. PATENT DOCUMENTS

| 5,258,979 | 11/1993 | Oomuro et al. | 370/233 |
| 5,381,407 | 1/1995 | Chao | 370/233 |
| 5,515,359 | 5/1996 | Zheng | 370/231 |
| 5,519,689 | 5/1996 | Kim | 370/253 |
| 5,583,857 | 12/1996 | Soumiya et al. | 370/233 |
| 5,583,861 | 12/1996 | Holden | 370/395 |
| 5,675,576 | 10/1997 | Kalampoukas et al. | 370/232 |
| 5,691,975 | 11/1997 | Hamada et al. | 370/232 |
| 5,734,825 | 3/1998 | Lauck et al. | 370/231 |
| 5,838,663 | 11/1998 | Elwalid et al. | 370/233 |

FOREIGN PATENT DOCUMENTS

| 5-268242 | 10/1993 | Japan. |
| 6-046085 | 2/1994 | Japan. |
| 7-231322 | 8/1995 | Japan. |

OTHER PUBLICATIONS

Sato et al: "ATM WAN architecture for implementation of multi protocol, part 1 ABR Service Using VS/VD Method"–IEICE Technical Research Report. Mar. 15, 1996, pp. 73–78.

(List continued on next page.)

*Primary Examiner*—Chi H. Pham
*Assistant Examiner*—Steven Nguyen
*Attorney, Agent, or Firm*—Pillsbury Madison & Sutro, LLP

[57] ABSTRACT

In a best effort type service of an ATM communication network for circulating an RM cell, a subscriber's switchboard holds the latest route information, and the RM cell is used for short distance communication between the communication terminal and subscriber's switchboard. For a plurality of connections accommodated in the switchboard and using a transmission line or a route in common, information on the allowable transmission rate, the actual transmission rate, the full bandwidth and full input bandwidth of the transmission line or the route, and the number of connections using in common the transmission line are collected and held. A transmission rate acceptable for the caller's terminal is calculated for each connection on the basis of the information. An increase of a memory capacity is restricted by providing a common buffer and managing it by a pointer value. A list of cells which have arrived simultaneously is prepared, and is managed by the pointer value. The cells are sent out at different timings so as not to be discarded. Even when congestion is solved, the restriction is not quickly lifted but control is enforced in consideration of the increment of the cell flow rate immediately after the lift. Convolution calculation is made only once for determining the overall mean cell loss ratio and consequently the number of calculations is reduced.

12 Claims, 45 Drawing Sheets

OTHER PUBLICATIONS

Hasegawa et al: "ATM WAN architecture for implementation of multi protocol, part 2–Multi Protocol ATM–WAN with ALPEN"–IEICE Technical Research report. Mar. 15, 1996, pp. 79–84.

Hasegawa et al: "ABR Emulation by ATM Multi–protocol Emulation Network (ALPEN)",IEICE Communications Society Convention, B–347, Aug. 15, 1995, p. 14.

Yamanaka et al: "ATM Multi–Protocol Emulation Network (ALPEN)" –IEICE Communications Society Convention, B–345, Aug. 15, 1995, p. 12.

Yamanaka et al: "ALPEN: A Simple and Flexible ATM Network Based on Multi Protocol Emulation at Edge Nodes",IEICE Transaction on Communications Vo. E79–B No. 4, Apr. 25, 1995, pp. 611–615.

Hasegawa et al: "ER Mode ABR by Multi Protocol Emulation Network (ALPEN)"–IEICE Technical Research Report, Oct. 20, 1995,pp. 61–66.

Yamanaka et al: "Jitter Tolerant Usage Parameter Control Method for ARM–based B–ISDN" IEICE Technical Report, Sep. 30, 1993, pp. 7–12.

Kitazume et al: "Support of ABR Service in Public Networks", IEICE Technical Research Report, Jul. 14, 1995, pp. 31–36.

Sato et al:"Network Resource Managment Techniques for VP–Based B–ISDN", NTT R&D vol. 42, No. 3, Mar. 10, 1993, pp. 343–356.

Shimoto et al: "Admission/Flow control based on measurements of instantaneous utilization", IEICE Technical Research Report, Dec. 7, 1995, pp. 1–6.

Oki et al: "Impact of Multimedia Service Requirements on ATM–VC Network Configurations", IEICE Technical Research Report, Mar. 15, 1995, pp. 31–36.

Shiomoto et al: "Cell Loss Probability Estimation Using Measurement of Cell Arrivals in ATM Networks", IEICE Technical Research Report, Mar. 11, 1994, pp. 93–98.

|  | Wth3 ≤ Residual Bandwidth | Wth2 ≤ Residual Bandwidth < Wth3 | Wth1 ≤ Residual Bandwidth < Wth2 | Residual Bandwidth < Wth1 |
|---|---|---|---|---|
| Terminals with Cell Rate > Rth1 | Notify "No Congestion" | — | Notify "Congestion" | Notify "Congestion" |
| Terminals with Cell Rate > Rth2 | Notify "No Congestion" | Notify "No Congestion" | — | Notify "Congestion" |
| Other Terminals | Notify "No Congestion" | — | — | Notify "Congestion" |

Fig.14

|  | Qth3 ≤ Qu | Qth2 ≤ Qu < Qth3 | Qth1 ≤ Qu < Qth2 | QU < Qth1 |
|---|---|---|---|---|
| Terminals with Cell Rate > Rth1 | Notify "Congestion" | Notify "Congestion" | — | Notify "No Congestion" |
| Terminals with Cell Rate > Rth2 | Notify "Congestion" | — | Notify "No Congestion" | Notify "No Congestion" |
| Other Terminals | Notify "Congestion" | — | — | Notify "No Congestion" |

Fig.18

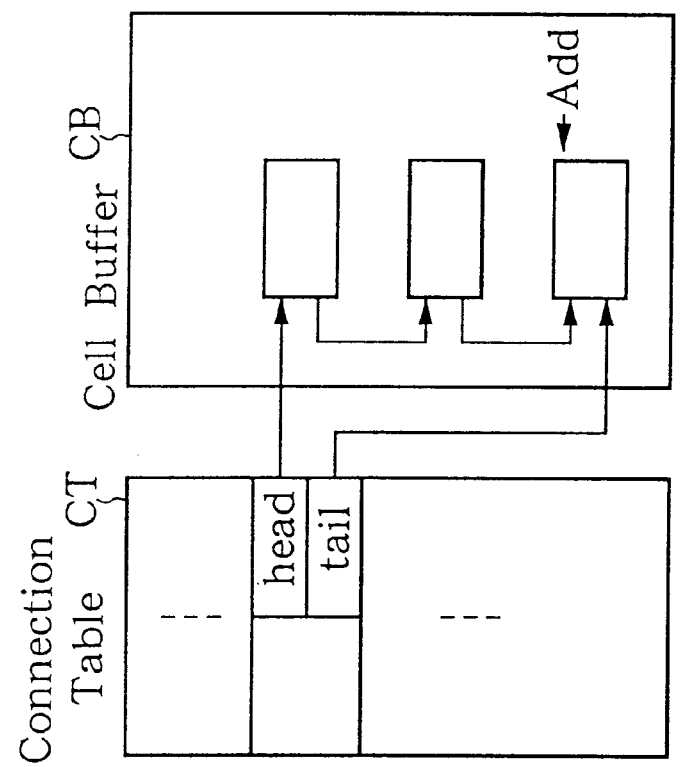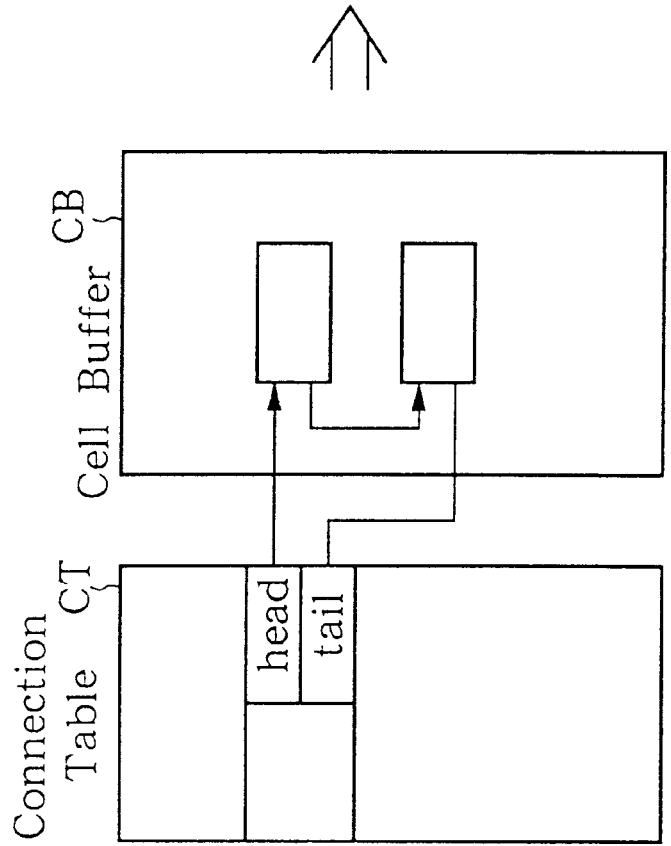
Fig.26

| Call Type | Number of Connections | Peak Rate | Average Rate |
|---|---|---|---|
| 1 | 350 | 10Mb/S | 0.05Mb/S |
| 2 | 120 | 1.5Mb/S | 0.15Mb/S |
| | | | |
| | | | |
| | | | |
| | | | |

Fig.51

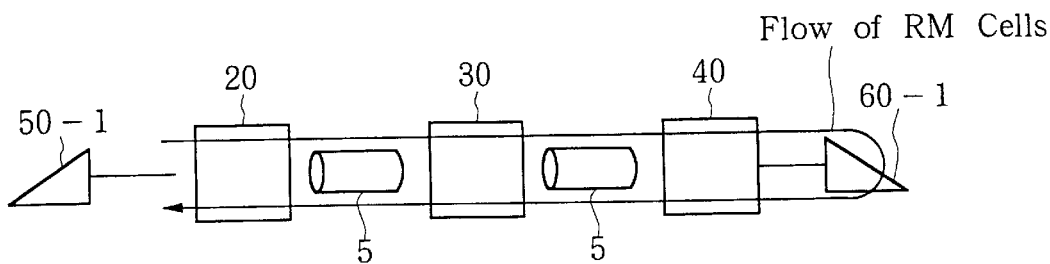

PRIOR ART
Fig.52

Constitution of an RM Cell

| field | Length (Octets) | Content |
|---|---|---|
| Header | 1 – 5 | ATM Header |
| ID | 6 | Protocol Identifier |
| DIR | 7 | Direction Identifier |
| BN | 7 | Backward Congestion Notification |
| CI | 7 | Congestion Indication |
| NI | 7 | No-increase Bit for Prohibiting Increase in Allowed Cell Rate |
| RA | 7 | Request/Acknowledgement |
| ER | 8 – 9 | Explicit Rate |
| CCR | 10 – 11 | Current Allowed Cell Rate |
| MCR | 12 – 13 | Minimum Cell Rate |
| QL | 14 – 17 | Queue Length |
| SN | 18 – 21 | Sequential Number |
| Reserved | 22 – 51 | Reserved |
| Reserved | 52 | Reserved |
| CRC – 10 | 52 – 53 | Other |

DYNAMIC RATE CONTROL SYSTEM

This application is a continuation of PCT/JP96/02131 filed Jul. 29, 1996.

BACKGROUND OF THE INVENTION

1. Field of the Invention

This invention is utilized for asynchronous transfer mode (hereinafter, "ATM") telecommunications. It relates to a telecommunications network and control system which, when a plurality of terminals which receive a best effort type service use the same route, the cell rates of the various terminals are controlled in such a manner that they rapidly approach values which are fair. This invention relates to rate control and traffic control in packet switching networks or ATM networks. It is provided in an ATM network and is utilized as a buffer means for temporarily storing cells or packets. This invention relates to techniques for controlling the prescribed intervals at which cells or packets are output to each connection. It also relates to congestion control, and in particular to the regulation of a cell rate and to the basis for cancelling this regulation. This invention also relates to techniques for setting up virtual paths (VPs) and virtual channels (VCs).

2. Background of Related Art

In a conventional best effort type service in an ATM network, in order to acquire information relating to congestion or acceptable bandwidth in a given route, cells for acquiring information (resource management cells: hereinafter, "RM cells") are sent back and forth between source and destination terminals, with the network writing information in these RM cells and the source-side terminals referring to this information and on this basis controlling their cell output rate.

For example, a service based on the available bit rate (ABR) protocol (See ATM Forum ATMF 95-0013R2), which is a typical best effort type service on an ATM network, is configured so that it begins by operating on the basis of the ABR protocol at all the nodes between the source and destination terminals, and at those terminals.

A prior art example of this will be explained with reference to FIG. 52–FIG. 57. FIG. 52 shows the overall constitution of a prior art ATM network. FIG. 53 shows the constitution of an RM cell. FIG. 54 and FIG. 55 are flowcharts showing the operation of a source-side terminal. FIG. 56 is a flowchart showing the operation of source-side and destination-side subscriber switches, and of a transit switch. FIG. 57 is a flowchart showing the operation of a destination-side terminal. The ATM network illustrated in FIG. 52 is constituted on the basis of the ABR protocol. In FIG. 52, numeral 20 and 40 represent switches which serve terminals, numeral 30 represents a transit switch, numeral 5 represents a transmission link, numeral 50-1 is a source-side terminal, and numeral 60-1 is a destination-side terminal. As shown in FIG. 53, an RM cell comprises an ATM header, a protocol identifier (ID), a direction identifier (DIR), a backward congestion notification (BN), a congestion indication (CI), a no-increase bit (NI) for prohibiting increase in the allowed cell rate, a request/acknowledgement (RA), the explicit rate (ER), the current allowed cell rate (CCR), the minimum cell rate (MCR), the queue length (QL), and the sequential number (SN).

RM cells are transmitted periodically between each pair of source and destination terminals. For example, source-side terminal 50-1 periodically outputs RM cells; transit switch 30 writes in these cells information relating to congestion in, or the acceptable bandwidth of, the route in question; and destination-side terminal 60-1 returns the cells. In this way, source-side terminal 50-1 is notified of whether there is congestion in that route.

According to the rules of the ABR protocol, source-side terminal 50-1 must transmit using a cell rate that does not exceed the allowed cell rate, termed the ACR.

When source-side terminal 50-1 receives a notification of congestion by means of an RM cell, it decreases the ACR on the basis of the ABR protocol. Conversely, when it has been notified that there is no congestion, it raises the ACR on the basis of the ABR protocol.

When one of the acceptable bandwidths of the network as notified by RM cells is the smallest, source-side terminal 50-1 changes to a cell rate that does not exceed whichever of this smallest value and the newly-computed ACR is the smaller. When the acceptable bandwidths of the network do not have a minimum value, source-side terminal 50-1 changes to a cell rate that does not exceed the ACR.

When a new virtual channel (VC) starts to transmit data, after it has transmitted an initial RM cell, it is allowed to transmit at a rate not exceeding the cell rate stipulated for the start of transmissions, which is called the initial cell rate (ICR).

After the initial RM cell has been returned, the cell rate is controlled by the same procedure as described above. FIG. 54 and FIG. 55 show the operation of source-side terminal 50-1 on the basis of an ABR protocol in the ATM network illustrated in FIG. 52. FIG. 56 shows the operation of switches 20, 30 and 40, and FIG. 57 shows the operation of destination-side terminal 60-1. As shown in FIG. 54, source-side terminal 50-1 generates an RM cell (S1), initializes this cell (S2) and outputs it (S3). The RM cell is returned by way of switch 20→switch 30→switch 40→destination-side terminal 60-1, whereupon it is received by source-side terminal 50-1 as shown in FIG. 55 (S11). If there is a congestion indication in the RM cell (S12), the ACR is decreased (S14), but if there is no congestion indication, the ACR is increased (S13). As a result, terminal 50-1 changes its cell output rate (S15).

As shown in FIG. 56, when switch 20, 30 or 40 receives an RM cell that has been output from source-side terminal 50-1 (S21), it writes an acceptable cell rate in the ER field (S22). If the switch has decided that there is congestion (S23), it writes a congestion indication in the CI field (S24). The switch then forwards the RM cell (S25).

As shown in FIG. 57, when destination-side terminal 60-1 receives an RM cell that has been output from source-side terminal 50-1 (S21), it writes an acceptable cell rate in the ER field (S22), and if it has decided that there is congestion (S23), it writes a congestion indication in the Cl field (S24). Destination-side terminal 60-1 then returns the RM cell (S26).

In conventional ABR, when congestion occurs due to a new terminal starting to transmit or to an increase in cell rate, and when notification is given of this congestion, each terminal that is notified decreases its cell rate, with the result that spare capacity is created. If notification is received that the congestion has been cleared, each terminal raises its cell rate again. Repeating this procedure constitutes a mechanism whereby a fair cell rate is gradually approached.

The control of cell rate will be further explained with reference to FIG. 58, which serves to explain cell rate control in an ATM network according to the prior art. It is assumed here that terminals 50-1 to 50-3 are sources and that connections 70-1, 70-2 and 70-3 are set up between these sources and respective destination terminals 60-1 to 60-3 via switches 20-40. These connections 70-1, 70-2 and 70-3 share transmission links 5 between switches 20-40. Cell rate control is performed as follows. Namely, source terminals 50-1 to 50-3 generate and insert management cells at fixed cell intervals, and send these management cells to destination terminals 60-1 to 60-3 and back again. Switches 20-40 write information in these cells and source terminals 50-1 to 50-3 refer to this information and on this basis perform cell rate control.

For example, a service based on the available bit rate (ABR) protocol (See ATM Forum ATMF 95-0013R2), which is a typical best effort type service on an ATM network, is configured so that it begins by operating on the basis of the ABR protocol at all the nodes between the source and destination terminals, and at those terminals.

A prior art example of this will be explained with reference to FIG. 52–FIG. 57. FIG. 52 shows the overall constitution of a prior art ATM network. FIG. 53 shows the constitution of an RM cell. FIG. 54 and FIG. 55 are flowcharts showing the operation of a source-side terminal. FIG. 56 is a flowchart showing the operation of source-side and destination-side subscriber switches, and of a transit switch. FIG. 57 is a flowchart showing the operation of a destination-side terminal. The ATM network illustrated in FIG. 52 is constituted on the basis of the ABR protocol. In FIG. 52, 20 and 40 represent switches which serve terminals, 30 represents a transit switch, 5 represents a transmission link, 50-1 is a source-side terminal, and 60-1 is a destination-side terminal. As shown in FIG. 53, an RM cell comprises an ATM header, a protocol identifier (ID), a direction identifier (DIR), a backward congestion notification (BN), a congestion indication (CI), a no-increase bit (NI) for prohibiting increase in the allowed cell rate, a request/acknowledgement (RA), the explicit rate (ER), the current allowed cell rate (CCR), the minimum cell rate (MCR), the queue length (QL), and the sequential number (SN).

RM cells are transmitted periodically between each pair of source and destination terminals. For example, source-side terminal 50-1 periodically outputs RM cells; transit switch 30 writes in these cells information relating to congestion in, or the acceptable bandwidth of, the route in question; and destination-side terminal 60-1 returns the cells. In this way, source-side terminal 50-1 is notified of whether there is congestion in that route.

According to the rules of the ABR protocol, source-side terminal 50-1 must transmit using a cell rate that does not exceed the allowed cell rate, termed the ACR.

When source-side terminal 50-1 receives a notification of congestion by means of an RM cell, it decreases the ACR on the basis of the ABR protocol. Conversely, when it has been notified that there is no congestion, it raises the ACR on the basis of the ABR protocol.

When one of the acceptable bandwidths of the network as notified by RM cells is the smallest, source-side terminal 50-1 changes to a cell rate that does not exceed whichever of this smallest value and the newly-computed ACR is the smaller. When the acceptable bandwidths of the network do not have a minimum value, source-side terminal 50-1 changes to a cell rate that does not exceed the ACR.

When a new virtual channel (VC) starts to transmit data, after it has transmitted an initial RM cell, it is allowed to transmit at a rate not exceeding the cell rate stipulated for the start of transmissions, which is called the initial cell rate (ICR).

After the initial RM cell has been returned, the cell rate is controlled by the same procedure as described above. FIG. 54 and FIG. 55 show the operation of source-side terminal 50-1 on the basis of an ABR protocol in the ATM network illustrated in FIG. 52. FIG. 56 shows the operation of switches 20, 30 and 40, and FIG. 57 shows the operation of destination-side terminal 60-1. As shown in FIG. 54, source-side terminal 50-1 generates an RM cell (S1), initializes this cell (S2) and outputs it (S3). The RM cell is returned by way of switch 20→switch 30→switch 40→destination-side terminal 60-1, whereupon it is received by source-side terminal 50-1 as shown in FIG. 55 (S11). If there is a congestion indication in the RM cell (S12), the ACR is decreased (S14), but if there is no congestion indication, the ACR is increased (S13). As a result, terminal 50-1 changes its cell output rate (S15).

As shown in FIG. 56, when switch 20, 30 or 40 receives an RM cell that has been output from source-side terminal 50-1 (S21), it writes an acceptable cell rate in the ER field (S22). If the switch has decided that there is congestion (S23), it writes a congestion indication in the CI field (S24). The switch then forwards the RM cell (S25).

As shown in FIG. 57, when destination-side terminal 60-1 receives an RM cell that has been output from source-side terminal 50-1 (S21), it writes an acceptable cell rate in the ER field (S22), and if it has decided that there is congestion (S23), it writes a congestion indication in the CI field (S24). Destination-side terminal 60-1 then returns the RM cell (S26).

In conventional ABR, when congestion occurs due to a new terminal starting to transmit or to an increase in cell rate, and when notification is given of this congestion, each terminal that is notified decreases its cell rate, with the result that spare capacity is created. If notification is received that the congestion has been cleared, each terminal raises its cell rate again. Repeating this procedure constitutes a mechanism whereby a fair cell rate is gradually approached.

The control of cell rate will be further explained with reference to FIG. 58, which serves to explain cell rate control in an ATM network according to the prior art. It is assumed here that terminals 50-1 to 50-3 are sources and that connections 70-1, 70-2 and 70-3 are set up between these sources and respective destination terminals 60-1 to 60-3 via switches 20-40. These connections 70-1, 70-2 and 70-3 share transmission links 5 between switches 20-40. Cell rate control is performed as follows. Namely, source terminals 50-1 to 50-3 generate and insert management cells at fixed cell intervals, and send these management cells to destination terminals 60-1 to 60-3 and back again. Switches 20-40 write information in these cells and source terminals 50-1 to 50-3 refer to this information and on this basis perform cell rate control.

For example, in the cell rate control used in the ABR protocol according to ATM Forum specifications (95-0013R2, 94-0983, 95-0195, etc.), in order to control the cell rate of each connection in accordance with the residual bandwidth and the requested bandwidth of a shared route in such manner that the cell rates are fair and congestion does not occur, the source terminals transmit management cells at fixed cell intervals and each switch through which these management cells pass reads the allowed cell rate of the terminals from the management cell and calculates (i) information relating to congestion relevant to the switch itself, and (ii) the acceptable cell rate. When a source terminal transmits, the maximum value which the allowed cell rate can have (i.e., the peak cell rate: PCR) in each connection is written in the management cells as the initial value of the acceptable cell rate. Only when the acceptable cell rate calculated by a switch is smaller than the acceptable cell rate written in a returned management cell does the switch write that calculated rate in the management cell and thereby notify the source terminal. The source terminal then sets its own ACR equal to or less than the notified acceptable cell rate, and proceeds to transmit cells at a rate not exceeding this ACR.

FIG. 59–FIG. 61 show the control flow at the switches. FIG. 59 shows the control when it has been decided that there is congestion. FIG. 60 shows the control when a management cell has arrived from a source-side terminal. FIG. 61 shows the control when a management cell is returning from a destination-side terminal. Each switch observes the queue length in the transmission queue cell buffer, and if the queue exceeds a threshold the switch decides that there is congestion at itself. If the queue does not exceed the threshold, the switch decides that there is no congestion. If the switch decides that there is congestion, then as shown in FIG. 59, it calculates the current allowed cell rate reduced by a fixed proportion and takes this as the acceptable cell rate at that switch.

This will now be explained with regard to the $j^{th}$ connection ($j=1, 2, \ldots, n$). $ERQ_j$ is obtained by multiplying $MACR_j$, which relates to this $j^{th}$ connection, by ERD, which is a constant that is less than 1 (S31). $ERQ_j$ is then taken as the acceptable cell rate (S32). When a management cell from a source terminal arrives, then as shown in FIG. 60 the current allowed cell rate written in that management cell is taken as $ccr_j$ (S41). Next, the value of:

$$ccr_j \times \min(1, R_0/\text{rate}_j)$$

is obtained and set as the new allowed cell rate $ccr_j$, which is then used to obtain the value of:

$$MACR_j + (ccr_j - MACR_j) \times AVF$$

which is set as the new $MACR_j$ (S42). Here, $R_0$ and AVF are constants, and $\text{rate}_j$ is the actual cell rate obtained from the current observation of the $j^{th}$ connection. As shown in FIG. 61, when a returning management cell arrives at a switch, the switch refers to the field value $ER_c$ in the management cell, this value serving to give notification of the acceptable cell rate. If $ERQ_j < ER_c$ (S51), the switch replaces $ER_c$ in this management cell with $ERQ_j$ (S52). If $ERQ_j \geq ER_c$, the switch transfers this management cell towards the source terminal without modifying it (S53). Because the source terminal sets its ACR below the notified acceptable cell rate, its allowed cell rate (ACR) is decreased.

FIG. 62 shows the control flow at a switch when it has decided that there is no congestion. When a switch decides that there is no congestion, it makes its acceptable cell rate larger than the allowed cell rate. That is to say, it multiplies:

$$1 - \text{rate}_j/R_0$$

by a constant which will be termed "Gain", adds 1 to this product and takes the result as $ERX_j$. It also takes the product of this and $ERQ_j$ as the new $ERQ_j$; takes the smallest of this $ERQ_j$, $MACR_j \times ERU$, and $R_0$ as the new $ERQ_j$; and takes the larger of this $ERQ_j$ and $MACR_j \times ERD$ as the new $ERQ_j$ (S61). The same control procedure is applied whether the management cell has arrived from the source side or is being returned from the destination side, and the result of this control procedure is that the ACR of the source terminal increases.

Next, an explanation will be given of conventional usage/network parameter control (UPC/NPC). ATM transfers information through a network after splitting it up into fixed-length packets called cells, and manages traffic on the basis of cell interval. In order to manage traffic in this way, a cell interval is stipulated for each connection, and a utilization monitor such as UPC/NPC is generally installed in order to monitor compliance with this cell interval. UPC/NPC immediately discards or tags any cells which arrive at shorter intervals than the stipulated cell interval.

However, because cells are transmitted asynchronously in an ATM network, each cell may be subject to a different delay while being transferred through the network. As a result, even if a subscriber has output cells in compliance with the stipulated cell interval, it will sometimes be impossible to satisfy the prescribed cell interval at a point where UPC/NPC is implemented. Cell delay variation (CDV) is the term used to describe fluctuation in cell transfer delay, and this CDV creates problems for UPC/NPC and traffic management. It has been proposed that the occurrence of CDV in a network could be reduced by traffic shaping, which is a technique whereby, once cells have been stored in a cell buffer, they are read from the buffer in a controlled manner.

An ABR service which has been much discussed in recent years in the ATM Forum is one which performs flow control by employing RM cells to give end-to-end notification of residual bandwidth on a given route. In an ABR service, the control loop comprising RM cells is closed end-to-end and therefore even if RM cells are dropped due to congestion, a negative feedback mechanism operates to restrict the flow of cells. Nevertheless, if cell transfer delay becomes large, as can happen in a public network, the information obtained by the RM cells relating to residual bandwidth on a given route will already be out-of-date, with the resulting problem that it is impossible to obtain a good control effect.

In order to overcome this problem, studies have been made of deploying VD/VS (virtual destination/virtual source) for closing control loops by means of RM cells at suitable places in the public network. In VD/VS, cell buffers are provided and cells are stored for each connection. Reading of cells from the cell buffers is performed by traffic shaping. When an RM cell, output from a source-side switch, returns after having been transferred through the network, a cell transmission interval for the connection in question is decided on the basis of the contents of the RM cell, and cells for that connection are read from the cell buffer at this interval.

If a higher layer protocol than the cell transmission layer provides a retransmission function, then when cells are dropped in the network, the retransmission function will operate, with the result that the degree of congestion may increase. In order to prevent this sort of slide into catastrophically serious congestion, it is essential to regulate the volume of traffic entering the network when the network has become congested.

The following method has previously been proposed for this purpose. Namely, as found in Chaki, "An Examination of Cell Level Congestion Clearing Systems" (Preprints of the Switching Systems Technical Group of the IEICE Japan, SSE 94–97), it is proposed that the volume of traffic should be regulated by a fixed factor when congestion has occurred. According to this method, if congestion occurs, the volume of traffic is regulated by a prescribed factor, and if the congestion is not cleared within a prescribed time, continued attempts are made to overcome the congestion by progressively making the regulation factor more stringent. When the congestion is cleared, the regulation factor is successively relaxed and there is a shift to a normal state.

In multimedia communications implemented on an ATM network, the connections exhibit a wide range of peak rates and average rates. For this reason, the different peak rates and average rates are divided into what are called "call types", and the call admission control (CAC) is carried out so as to meet the requested call quality for each call type.

The symbols used in this specification will now be defined. $r_i$ and $a_i$ are respectively the peak rate and the average rate of call type i, and $a_{all}$ and C are respectively the sum of the average rates of all the VCs, and the VP bandwidth. $CLR_{AVE}$ is the average cell loss ratio for all call types.

Letting the cell rate probability density function for call type i be $f_i(x)$, and the cell rate probability density function for the other call types apart from call type i be $F_i(x)$, then the cell loss ratio for call type i, $CLR_i$, can be obtained by as:

$$CLR_i = \frac{\int_0^\infty (z-c) + \int_0^\infty \left(\frac{x}{z}\right) f_i(x) F_i(z-x) dx dz}{a_i} \quad (Eq. 1)$$

(see T. Murase, H. Suzuki, S. Sato and T. Takeuchi, "A call admission control scheme for ATM networks using a simple quality estimate". IEEE J. Select. Areas Commun., Vol.9 (No.9): pp.1461–1470, December 1991). In call admission control, a connection request is accepted if the largest of the cell loss ratios obtained for the different call types by means of Eq.1 satisfies a certain standard value.

FIG. 63 serves as a numerical example of the case where CAC is carried out with a stipulated value of $10^{-6}$ for cell loss ratio. It is assumed in FIG. 63 that call type 1 has peak rate $r_1$=10 Mb/s and average rate $a_1$=0.05 Mb/s, and that call type 2 has peak rate $r_2$=1.5 Mb/s and average rate $a_2$=0.15 Mb/s. FIG. 63 shows the cell loss ratio and the number of connections for each call type in a multiple access environment. The number of call type 1 connections is plotted along the horizontal axis, the number of call type 2 connection is plotted along the left-hand vertical axis, and cell loss ratio (CLR) is plotted along the right-hand vertical axis. From FIG. 63 it can be seen that:

1) Call type 1 has a higher cell loss ratio than call type 2. Under some circumstances there is more than an order of magnitude difference.
2) Even though the average cell loss ratio is more than an order of magnitude lower than the stipulated value, the cell loss ratio of call type 1 approaches the stipulated value.

Thus, in an ATM network intended for multimedia communications, because the connections exhibit a wide range of cell rates, and because any notified information relating to residual bandwidth on a given route will be out-of-date if the distance to the terminals is large, it is difficult to obtain a good control effect. For example, the transmission of RM cells takes time, and it takes time for a newly-transmitting terminal to control the ACR of a terminal which is already transmitting. Consequently, it takes time to converge to a fair allocation of bandwidth. Adequate tracking of cell rate and network conditions is also difficult, since these change from moment to moment.

To shorten the time required to raise the ACR, the ICR of each terminal can be set on the high side, but this still leaves the problem that an appreciable amount of time is taken to notify a terminal of congestion if the distance to the terminal is large. Various measures are then required to deal with the problem of congestion, such as ensuring that long buffers are employed in the network and decreasing the network utilization.

Even if the distance to terminals is short, it still takes a certain amount of time to converge to a cell rate which is fair, and so there is a potential need to reduce this time.

In the prior art, the acceptable cell rates of connections routed through the same switch are increased or decreased on the basis of the same congestion situation. This amounts to control which performs a uniform operation, i.e. making a uniform increase or decrease in the ACRs, and this will not always be fair.

When traffic shaping is carried out, for example in the case of the VD/VS scheme described above, cell buffer queues will be more frequent when the number of connections increases, and the increased memory etc. needed to deal with this means that the hardware scale expands. In traffic shaping, only one cell can be transferred per slot, and if a plurality of cells are scheduled for the same slot, some of them will not be transferred. This becomes an actual rather than a potential problem if the number of connections increases, since then there is a high probability that a plurality of cells will be scheduled for the same slot.

When there is severe congestion, it takes time for the congestion to clear. Because the increase in traffic immediately after cell rate regulation has been cancelled is not taken into account when relaxing the regulation, repetitions of relaxation followed immediately by more severe regulation occur, and it takes time to move to a steady state.

When there are many call types, CAC has to be performed with an awareness of the cell loss ratio of each call type. If cell loss ratio is calculated rigorously in accordance with Eq.1, convolution will be necessary for each call type, and therefore in a multimedia environment where there are a large number of call types, the computational requirements will be very high.

Because CAC involves deciding whether or not to accept a connection request when that connection is being set up, a high degree of responsiveness is needed in order to offer a real-time switching service.

The present invention has been made in the light of this technical background. The various objects of this invention include the following to provide a dynamic rate control system whereby the cell rates of a plurality of terminals in a best effort type service can be controlled fairly; (2) to provide a dynamic rate control system capable of causing the cell rates of a plurality of terminals to converge rapidly to fair values; (3) to provide a dynamic rate control system whereby even when the distances to a plurality of terminals are large, the cell rate of each terminal can be controlled fairly without causing transmission delays; (4) to provide a dynamic rate control system capable of changing the bandwidth that can be utilized by each connection so that it becomes as large as possible, while ensuring that the acceptable cell rates notified to the various connections are fair; (5) to provide a dynamic rate control system capable of implementing traffic shaping by means of comparatively modest hardware even when there are a large number of connections; (6) to provide a dynamic rate control system capable of transferring a plurality of cells scheduled for the same slot (i.e., for the same time); (7) to provide a dynamic rate control system capable of increasing the throughput of an ATM network; (8) to provide a dynamic rate control system capable of clearing congestion rapidly; (9) to provide a dynamic rate control system capable of improving the responsiveness of the CAC by calculating the cell loss ratio for each call type by means of a simple calculation even when there are a large number of call types; (10) and to provide a dynamic rate control system capable of performing smooth call admission control.

SUMMARY OF THE INVENTION

This invention is characterized in that a switch which serves a plurality of terminals that receive a best effort type service has a control system for causing the cell rates of the terminals to converge rapidly to a rate which is fair among those terminals.

In the prior art, cells for collecting information were sent back and forth between source and destination terminals, the ATM network wrote congestion information and information relating to acceptable bandwidth in these cells, destination-side terminals returned these cells, and source-side terminals controlled cell rate simply by referring to the information in these cells. The present invention differs from the prior art in respect of network constitution, the way in which the timing of the cell rate control is set, the cell rate control logic, and the speed with which cell rates converge.

Namely, this invention is a dynamic rate control system which serves a multiplicity of terminals, and which has means for setting a virtual path for one of these terminals on the basis of a request from that terminal. One feature of this invention is that it comprises: means for collecting route information which includes information relating to the residual bandwidth of the virtual path once the path has been set up after a cell rate has been specified for the terminal; means for holding the cell rate requested by the aforesaid terminal. The invention also includes and control means which, on the basis of the aforesaid route information, dynamically controls the cell rate of the virtual path once it has been set up, controlling it so that it is as large as possible, up to the cell rate requested by that terminal, and so that it is fair to the plurality of terminals from which there are connection requests. The aforesaid control means preferably has means which computes and sets the cell rate allowed at the aforesaid terminal.

A switch which serves a terminal collects VP information or route information irrespective of whether or not this terminal is transmitting cells. As a result, when the switch receives a request from the terminal to start transmission, it can rapidly compute the cell rate and reply to the terminal with either an acceptance or a rejection of the transmission start request.

The aforesaid residual bandwidth information is numerical information, and the aforesaid means which computes and sets the allowed cell rate can include means which computes the aforesaid allowed cell rate by multiplying the residual bandwidth information by a constant C ($0 < C \leq 1$). The value of the constant C can be set appropriately after consideration of the characteristics of the ATM network, the kinds of information, and other factors.

It is desirable to have means which, when the minimum cell rate included in the aforesaid transmission start request from a terminal is smaller than the aforesaid allowed cell rate, sets the initial cell rate of the terminal in question to the aforesaid allowed cell rate.

The present invention is characterized in that RM cells are not sent and received between switches that serve terminals, and the decision to accept or reject a transmission start request is made after the request has been sent from a terminal, with the result that less time is taken for the cell rate to be set. Therefore, if the minimum cell rate included in the transmission start request is smaller than the aforesaid allowed cell rate, the cell rate of the terminal is rapidly increased.

An increase in the allowed cell rate can be carried out stepwise in unit increments. The amount by which a terminal can be made to increase its cell rate at one time is set in advance, and this is taken as the unit increment. When the allowed cell rate is greater than this unit increment, the cell rate is increased by the unit increment. After the increase, the same procedure is carried out again. Namely, if the allowed cell rate is still greater than the unit increment, the cell rate is once again increased by the unit increment. The cell rate of a terminal can be increased rapidly by repeating this procedure. Rather than increasing the cell rate gradually while observing the state of the entire route, a unit increment is set in advance and the cell rate increased in one pass by that unit increment. The decision to make this increase is taken by the subscriber switch alone. As a result, the cell rate of a terminal can be increased rapidly in stepwise fashion.

The aforesaid route information is a quantity which shows, in stepwise manner, the residual bandwidth of the virtual paths contained in the route in question, and the aforesaid means which computes and sets the allowed cell rate can also include means which sets the allowed cell rate uniquely in accordance with this quantity. For example, the cell rate can be computed by setting a plurality of thresholds for the residual bandwidth and comparing with these thresholds. It is also possible to select the terminal which should be notified of congestion by setting thresholds for the cell rates of the terminals and by taking these into consideration along with the results derived from the residual bandwidth.

Alternatively, the aforesaid route information can be a quantity which shows, in stepwise manner, the queue lengths in the cell buffers provided at the nodes contained in that route; and the aforesaid means which computes and sets the allowed cell rate can include means which sets the allowed cell rate uniquely in accordance with this quantity. For example, the cell rate can be computed by providing a plurality of thresholds for the cell buffer queue length and comparing with these thresholds. It is also possible to select the terminal which should be notified of congestion by setting thresholds for the cell rate of the terminals as well, and by taking these into consideration along with the results derived from the cell buffer queue length.

When an ATM network according to this invention also has switches which transmit RM cells for notifying the aforesaid route information to other switches, it is desirable if the aforesaid means which computes and sets the allowed cell rate includes means which discards received RM cells.

For example, when a subscriber switch computes the cell rate and notifies a terminal by writing the results of the computation in an RM cell, if there is another RM cell that has arrived from elsewhere, the subscriber switch should recognize this other RM cell and discard it. In this way, malfunctioning of the terminal due to a plurality of different data can be avoided.

The invention can also be configured so that the aforesaid control means comprises: notifying means which notifies information relating to the acceptable cell rate to the source-side terminals of connections which it serves; means which collects and holds various information relating to the plurality of connections which it serves and which share a transmission link, said information comprises the allowed cell rate and the actual cell rate of each connection, the total bandwidth and the total input bandwidth of the shared transmission link, and the number of connections which share this transmission link. The control means further includes means which calculates for each connection, on the basis of the information held in this collecting and holding means, the acceptable cell rate which the aforesaid notifying means notifies to the source-side terminals.

In this way, rather than change the acceptable cell rate notified to the various connections so that all the cell rates increase or all the cell rates decrease, it is possible to give notification of acceptable cell rates which have been individually rewritten so as to provide results having improved fairness. It is also possible to rewrite and give notification of an acceptable cell rate for each connection so as to increase the bandwidth that each connection can utilize without resulting in congestion.

The invention can also be configured so that the aforesaid control means comprises: means which, when a terminal which it serves becomes a source terminal, provides notification to that terminal information relating to the acceptable cell rate; and means which collects and holds various information relating to the connection over which the terminal which it serves becomes a source terminal, and relating to the plurality of connections that share the route. The information comprises the allowed cell rate and the actual cell rate of each connection, the bandwidth and the total input bandwidth of the shared route, and the number of connections which share this route. The control means further includes means which calculates for each connection, on the basis of the information held in this collecting and holding means, the acceptable cell rate which the aforesaid notifying means provides notification. In this way, a terminal that becomes a source terminal can be notified of the acceptable cell rate simply by the switch that serves that terminal.

This reduces the load placed on switches in the network in generating and notifying management information. Moreover, when the cell rate of any connection changes, the time taken to calculate an acceptable cell rate in response to this change can be shortened and the source terminal can be notified more rapidly. Furthermore, the calculation only has to be performed by the switch which serves the terminal, without all the switches calculating acceptable cell rates. Finally, cell rate can be controlled promptly when transmission begins over a new connection.

The information which the aforesaid notifying means notifies to a terminal may be the cell rate data itself, or it may be information that indicates an increase or a decrease of the allowed cell rate. When the latter information is used, the allowed cell rate of a terminal is increased or decreased in accordance with a predefined calculation formula.

In the foregoing constitution, the calculating means may include computing means which uses the variance of the ratio of allowed cell rate to requested rate for each connection as an evaluative function, this variance being provided by:

$$V(\{ccr_1, ccr_2, \ldots, ccr_n\}, \{r_1, r_2, \ldots, r_n\}) = (1/n) \sum_j \left( ccr_j/r_j - (1/n) \sum_i ccr_i/r_i \right)^2$$

and obtains, for connection j (j=1, 2, . . . , n), the acceptable cell rate $ERQ_j$ at that switch by means of:

$$ERQ_j = ccr_j - \alpha_j \cdot \text{sign}\{n \cdot ccr_j/r_j - w \cdot \Sigma_i ccr_i/r_i\}$$

where $\Sigma_i$ and $\Sigma_j$ are respectively the sums from i=1 to i=n and from j=1 to j=n, $ccr_j$ and $r_j$ are respectively the allowed cell rate and the requested cell rate of connection j, and n is the number of connections transmitting data. $\alpha_j$ and w are weighting functions, and sign{ } is a function that indicates the sign of the value inside the curly brackets.

$\alpha_j$ may also be a positive constant, and may be taken as equal to the absolute value of:

$$\{n \cdot ccr_j/r_j - \Sigma_i ccr_i/r_i\}$$

When a constant is used as $\alpha_j$, $ERQ_j$ changes faster with larger values of $\alpha_j$, but any error becomes larger. Conversely, if $\alpha_j$ is small, the value of $ERQ_j$ obtained is accurate, but more time is taken for $ERQ_j$ to change. $\alpha_j$ should therefore be set with due regard to these considerations.

w is regarded as a decreasing function of the total input bandwidth of the transmission link or route shared by the connections. Specifically, w may be taken as a function of the total bandwidth $B_{all}$ and the total input bandwidth $B_{use}$ of the transmission link or route shared by the connections:

$$w = (B_{all} + p_1)/(B_{use} + p_2) \times p_3$$

where $p_2$ is a constant for preventing the denominator becoming zero, $p_1$ is a constant for correcting $p_2$, and $p_3$ is a constant for setting the allowable width. It is also possible for w to be taken as a function of the total input bandwidth $B_{use}$ of the transmission link or route shared by the connections:

$$w = -p_4 \cdot B_{use} + p_5$$

where $p_4$ is a positive constant for setting the allowable width and $p_5$ is a correction constant.

When the rate requested for a connection is not clear and the terminal is transmitting at or above a fixed proportion of the current allowed cell rate, the maximum value that can be taken by the allowed cell rate in that connection may be regarded as the requested rate. Otherwise, the minimum value that can be taken by the allowed cell rate may be regarded as the requested rate.

Terminals may sometimes transmit at a rate which, instead of conforming to the rate instructed by the $ERQ_j$, exceeds this. When this rate happens, in order to guarantee that transfer to the next switch will be carried out at the prescribed cell rate $ERQ_j$, i.e. at the prescribed cell interval, the following can be provided: (i) a connection table including addresses which are connection identifiers, and which comprises records such as tokens, cell intervals and pointers to the cell buffer; (ii) a cell buffer comprising records such as pointers indicating the order among the entries, and fields which hold the cells themselves; (iii) a simultaneous arrival connection list comprising records such as pointers which indicate the order among the entries, and connection identifiers; (iv) a scheduling table holding pairs of times and pointers to the simultaneous arrival connection list; (v) a timer which shows which entry in the scheduling table is to be processed; and (vi) a timer which shows the current time. With such a constitution, the following control can be performed. Namely, a list is formed in the cell buffer for each connection; the addresses of the heads and tails of these lists are entered in the connection table; every time a cell arrives, that cell is added to the list for the relevant connection; if there is a token, transfer scheduling is carried out at that time. In addition, a list of the connection identifiers of cells to be read at the same time is formed in the simultaneous arrival connection list, and this list is read in consecutive order starting from the address shown by the timer which indicates which entry in the scheduling table is to be processed, whereby cells of various connections are read in the order in which they were scheduled. After they have been read, they are scheduled at the cell intervals shown by the connection table, thereby guaranteeing the cell interval prescribed for each connection.

Because efficient use can be made of memory capacity by using a shared buffer as the cell buffer, it is possible to restrict the increase in hardware that would otherwise accompany an increase in the number of connections. Furthermore, because this control scheme ensures that cells which arrive simultaneously are read sequentially, the number of discarded cells can be reduced. A high throughput ATM network can therefore be achieved.

The invention can also be configured so that the aforesaid control means comprises: an input terminal at which the cell stream arrives; a cell buffer which temporarily stores the cells which have arrived; a traffic shaper which read cells from the cell buffer in accordance with indicated cell transmission intervals; and a connection table the addresses of which are connection identifiers (VPINVCI) and which holds connection information that includes information relating to the aforesaid cell transmission intervals (Int). The aforesaid cell buffer comprises a plurality of memory regions each accommodating a single cell, and pointer regions which show pointer values (Ptr) that map these memory regions to the aforesaid connection table.

The aforesaid connection information may include the pointers of the aforesaid memory regions. These pointers accommodate the head and tail addresses of cells which have the same connection identifier as the corresponding connection identifier in the connection table.

The plurality of cells stored in the aforesaid cell buffer may be formed into chains by the aforesaid pointers. The cells will then be read from the cell buffer in the order in which they have been linked by these chains, and in accordance with the indicated cell transmission intervals.

The aforesaid connection information may include a token (Tk) indicating whether or not cell output scheduling is allowed after the arrival of the tail cell of the connection in question.

It is desirable to provide means for holding the head pointer and the tail pointer of a free memory region of the aforesaid cell buffer.

The invention can also be configured with a timer which counts the current time, and scheduling means which schedules cell output in accordance with this timer.

The aforesaid scheduling means can also comprise scheduling means which, when a plurality of cells arrive at practically the same time and the scheduled output times of this plurality of cells overlap, causes cells to be output after their overlapping scheduled cell output times are successively shifted. As a result, a plurality of cells which have arrived at approximately the same time in an overlapping manner, and which have overlapping scheduled cell output times, can all be output with any being discarded, by adjusting the scheduled cell output times. Accordingly, cell loss ratio can be decreased.

The invention can also be configured so that the aforesaid scheduling means comprises, in addition to the aforesaid timer, a virtual timer which, for the aforesaid plurality of cells with overlapping scheduled cell output times, stops counting until all the cells have been output.

The invention can also be configured so as to comprise: a simultaneous arrival connection list which includes (i) memory regions in which are accommodated the connection identifier information for the plurality of connections in which the aforesaid scheduled cell output times overlap, (ii) pointer regions which correspond with these memory regions, and which show the pointers that have been assigned to these memory regions; and means for holding the head pointer and the tail pointer of a free memory region of the simultaneous arrival connection list.

The invention can also be configured so that the aforesaid scheduling means includes means which indicates in advance the plurality of scheduled cell output times.

The aforesaid memory regions of the cell buffer may have an upper limit for the number of cells stored for each connection.

The aforesaid connection information may contain priority information concerning the cell output order.

An alternative control method is to clear congestion rapidly when it occurs by setting a regulation factor adaptively in accordance with the congestion, and by taking into account the traffic increase that occurs when the regulation is cancelled.

The invention can also be configured so that the aforesaid control means includes: means which measures the cell flow; means which compares this measured cell flow with a threshold; means which, in accordance with the result of this comparison, sends regulation information to the terminal constituting the source of the cells, said regulation information including a cell flow regulation factor; and means which, when regulation is being applied to a source terminal, maintains this regulation until the measured cell flow from that source terminal reaches a preset value below the aforesaid threshold.

It is desirable to set the aforesaid regulation factor R to $R=1/\lambda$ where $\lambda$ is the normalized cell flow and the normalized threshold $\Lambda$ is 1. It is desirable to set the regulation factor R to R=1 when $\lambda<1/R$.

The invention may also comprise a table which holds the cell output rates of a plurality of cell generators, and a multiplier which multiplies these cell output rates by the aforesaid regulation factor. The aforesaid means which sends regulation information to a terminal that constitutes a source terminal sends, as the regulation information, the value of the regulated cell output rate. As a result, because a source terminal can receive the cell output rate as the regulation information, there is no need to calculate the cell output rate from the regulation factor at the terminal side.

The invention can also be configured so as to have a cell buffer which temporarily stores cells, and so that the aforesaid measuring means measures the cell flow from the number of cells stored in this cell buffer.

The invention can also be configured so that the aforesaid comparison means has means which observes the variation in the results of the comparison over a set time.

With this constitution, it is also possible to set a plurality of the aforesaid regulation factors (R, R', R"), and to apply these plurality of regulation factors stepwise in accordance with the observation results of the means which observes the aforesaid changes.

For example, the aforesaid plurality of regulation factors R, R' and R" may be respectively taken as:

$R=1/\lambda 0 (X \lambda 0 > 1)$ $R'=R/\lambda 1 (\lambda 1 > \lambda 0 > 1)$ $R''=R/\lambda 2 (R < \lambda 2 < 1)$ where $\lambda 0$, $\lambda 1$ and $\lambda 2$ are the cell flows at different measurement times, and threshold $\Lambda$ is taken as 1.

Still more precise cell flow control can be performed by controlling in this stepwise manner.

The following control may also be performed. Namely, the average cell loss ratio is obtained from the peak rate and the average rate of all the connections that are set. The result of dividing the sum of the average rates of all the connections by the link capacity is taken as a first safety factor. The result of dividing the peak rates of each connection by the average rate is taken as a second safety factor. The result of multiplying the first safety factor and the second safety factor by the average cell loss ratio is taken as the cell loss ratio of each connection. A connection request is accepted only when the largest cell loss ratio of the connections satisfies a certain standard value.

For example, the cell loss ratio CLRI for call type i is provided rigorously by Eq. 1. In Eq.1, the term x/z indicates the proportion of the overflow accounted for by call type i when the cell rate from all connections exceeds the VP bandwidth. The smallest denominator of this term x/z will be C, and the numerator will be largest when the connection in question is outputting cells at its maximum rate. In other words, the largest numerator will be ri. Accordingly, $x/z \leq r_i/C$. It follows that:

$$CLR_i = \frac{\int_0^\infty (z-c) + \int_0^\infty \left(\frac{x}{z}\right) f_i(x) F_i(z-x) dx\, dz}{a_i} \quad \text{(Eq. 2)}$$

$$\leq \frac{\left(\frac{r_i}{c}\right) \int_0^\infty (z-c) + \int_0^\infty f_i(x) F_i(z-x) dx\, dz}{a_i}$$

$$= \left(\frac{r_i}{c}\right)\left(\frac{a_{all}}{a_i}\right) \int_0^\infty (z-c) + \frac{\int_0^\infty f_i(x) F_i(z-x) dx\, dz}{a_{all}}$$

$$= \frac{a_{all}}{c} \frac{r_i}{a_i} CLR_{AVE}$$

In other words, Eq.2 is a formula which gives a safe assessment of the cell loss ratio.

The distinguishing feature of this control means is that Eq.2 has been derived as a safe approximation for the cell loss ratio of call type i. An exact solution of Eq.1 requires convolution for each call type, and if there are many call types an enormous amount of calculation would be required in the call admission control to obtain the cell loss ratio for each call type. By using a scheme based on Eq.2, convolution has to be performed only once in order to obtain the average cell loss ratio $CLR_{AVE}$, and because the cell loss ratio for each call type can be found simply by multiplying the average cell loss ratio by a safety factor, the amount of calculation required can be cut drastically compared with the prior art scheme. The effect of this control scheme really becomes pronounced in a multimedia environment when there are a large number of call types.

In other words, the invention can also be constituted so that the aforesaid control means includes means which decides whether or not to accept a connection request from a terminal in accordance with the cell loss ratio. This decision means comprises: means which computes the cell loss ratio $CLR_i$ of the $i^{th}$ group; and means which permits the connection of a group which satisfies this cell loss ratio $CLR_i$.

It is desirable if the aforesaid means which computes the cell loss ratio $CLR_i$ classifies the plurality of connection requests into i groups in accordance with their peak rate and average rate, and computes the cell loss ratio $CLR_i$ of the $i^{th}$ group as:

$$CLR_i \leq (a_{all}/c) \cdot (r_i/a_i) \cdot CLR_{AVE} \quad \text{(Eq.2)}$$

where, for all this plurality of connection requests, $CLR_{AVE}$ is the average cell loss ratio, $a_{all}$ is the sum of the average rates, c is the VP bandwidth, $r_i$ is the peak rate of group i, and $a_i$ is the average rate of group i.

As has been explained above, the present invention enables the cell rates of a plurality of terminals in a best effort type service to be controlled fairly. It can also make the cell rates of a plurality of terminals converge rapidly to fair values. Even when the distances to a plurality of terminals are large, this invention enables the cell rate of each terminal to be controlled fairly without making transmission delay a problem. It can change the bandwidth that can be utilized by each connection so that it becomes as large as possible, while ensuring that the acceptable cell rates notified to the various connections are fair. Even when there are a large number of connections, it can implement traffic shaping through comparatively modest hardware. It can transfer a plurality of cells that have been scheduled for the same slot (i.e. for the same time). It can increase the throughput of an ATM network, clear congestion rapidly, and improve the responsiveness of the CAC by calculating the cell loss ratio for each call type by means of a simple calculation, even when there are a large number of call types. It can also perform smooth call admission control.

BRIEF DESCRIPTION OF THE DRAWINGS

FIG. 14 shows the relations among residual bandwidth, the cell rate of the terminals, and the contents of the corresponding congestion notification.

FIG. 18 shows the relations among the largest buffer utilization, the cell rate of the source-side terminals, and the contents of the corresponding congestion notification.

FIG. 26 shows how the connection list is rearranged.

FIG. 51 shows a call type management table.

FIG. 52 shows the overall constitution of a prior art ATM network.

FIG. 53 shows the constitution of an RM cell.

DETAILED DESCRIPTION OF THE PREFERRED EMBODIMENTS (First embodiment)

Figure 1:
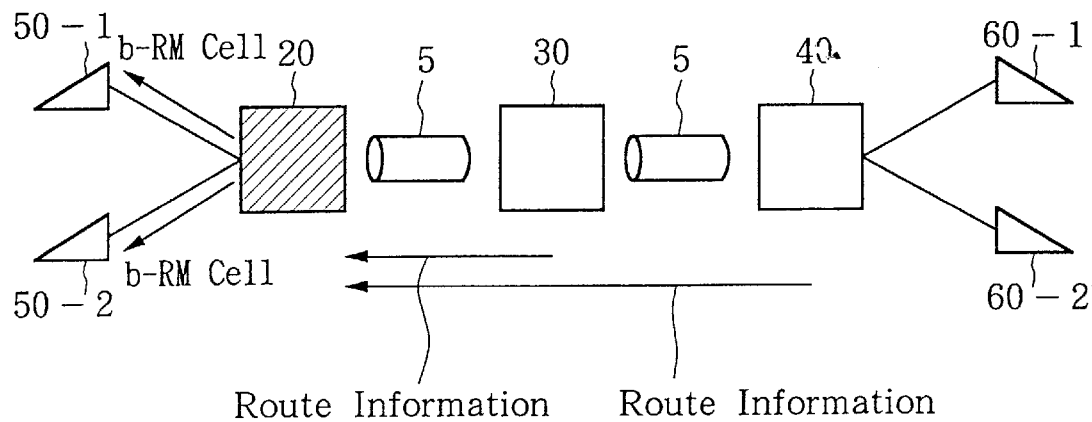
FIG. 1 shows the overall constitution of a first embodiment of this invention.
Figure 2:
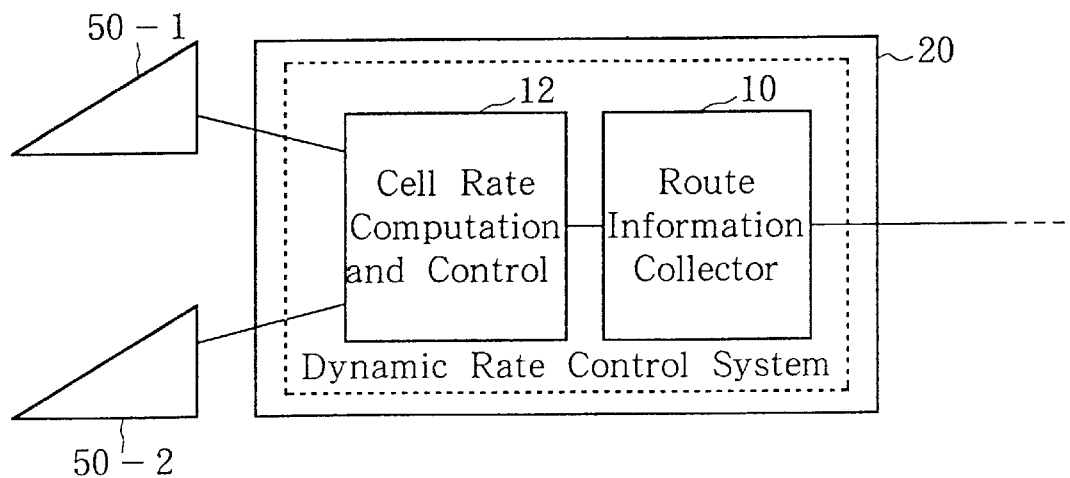
FIG. 2 is a block diagram of the essential parts of the switch that serves the source-side terminals.
Figure 3:
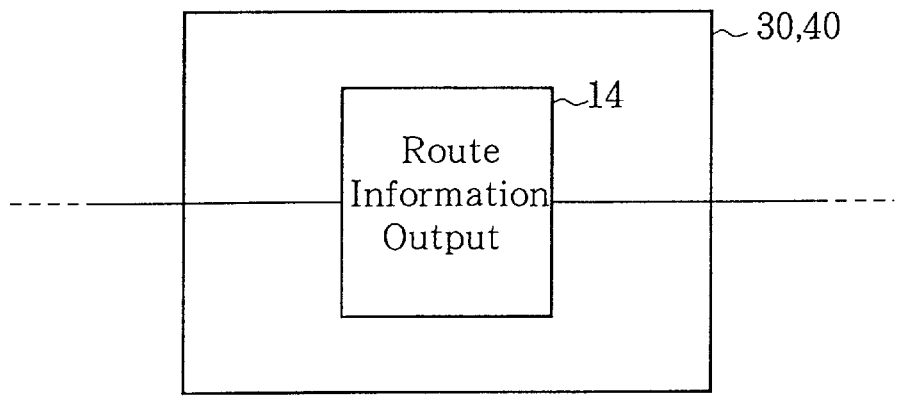
FIG. 3 is a block diagram of the transit switch and the switch that serves the destination-side terminals.
Figure 50:
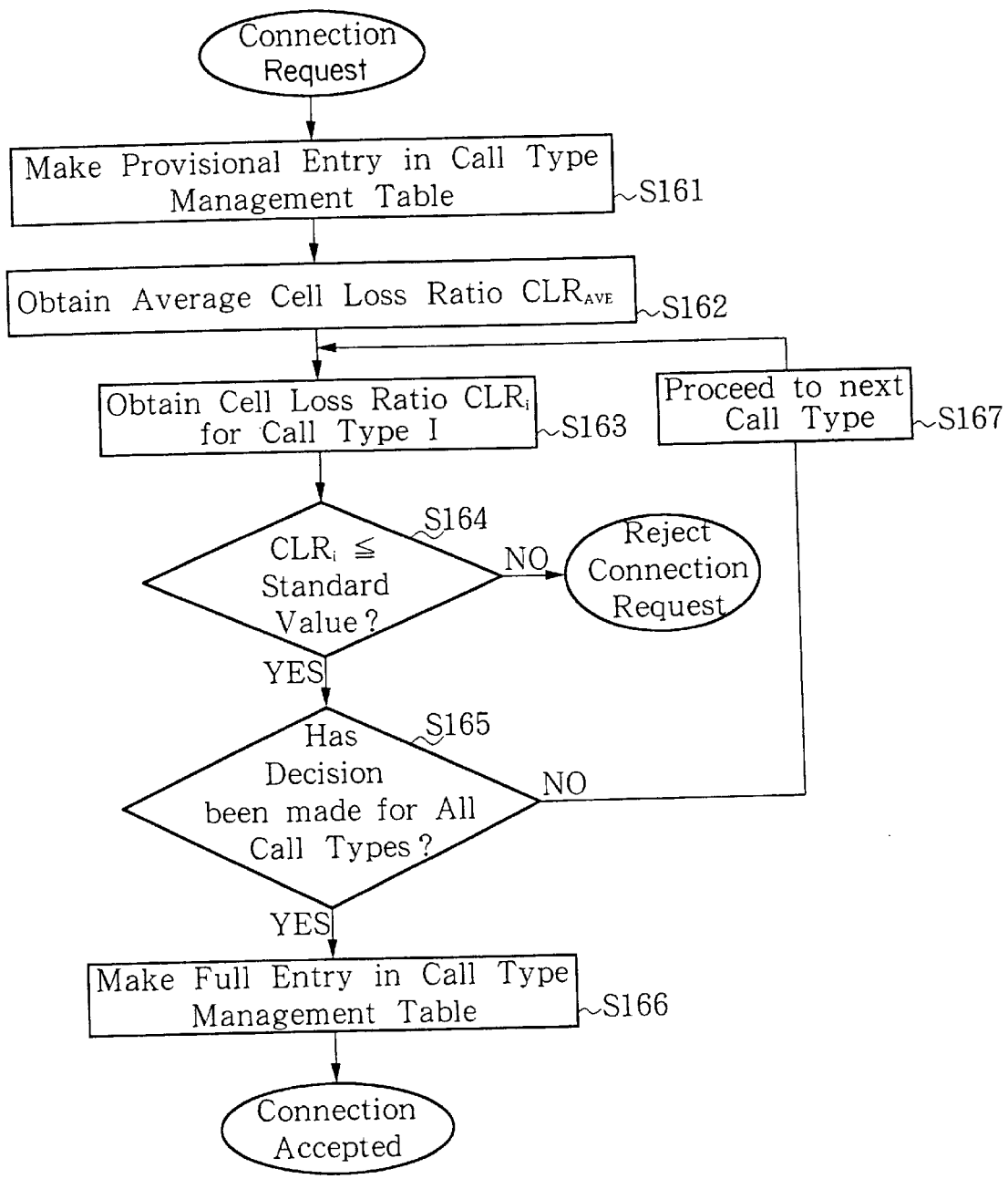
FIG. 50 is a flowchart showing the operation of a dynamic rate control system according to a twentieth embodiment of this invention.
Figure 54:
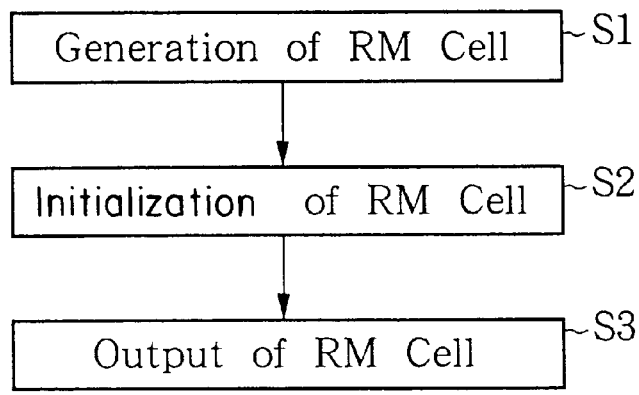
FIG. 54 is a flowchart showing the operation of a source-side terminal.
Figure 55:
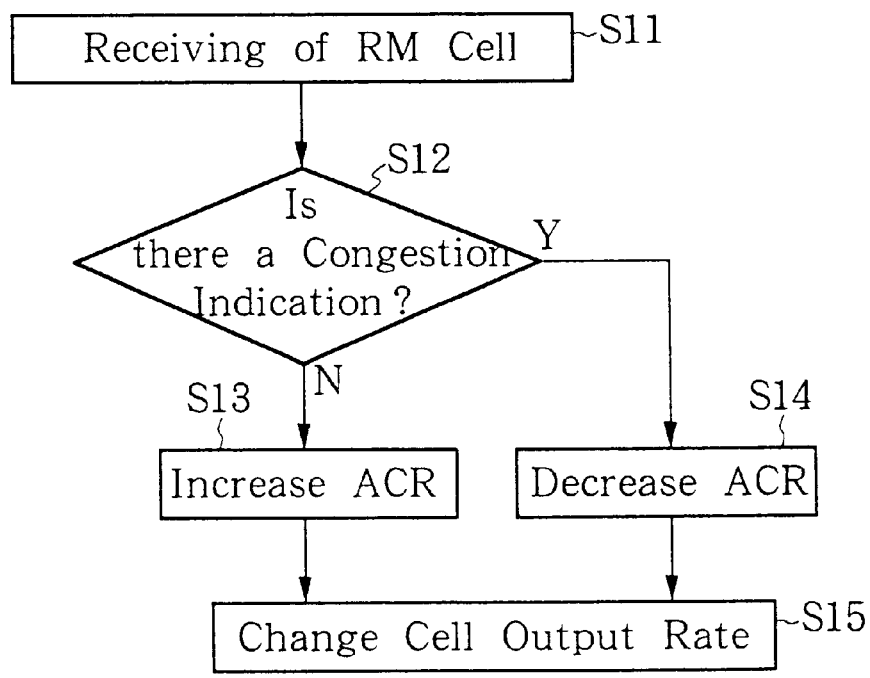
FIG. 55 is a flowchart showing the operation of a source-side terminal.
Figure 56:
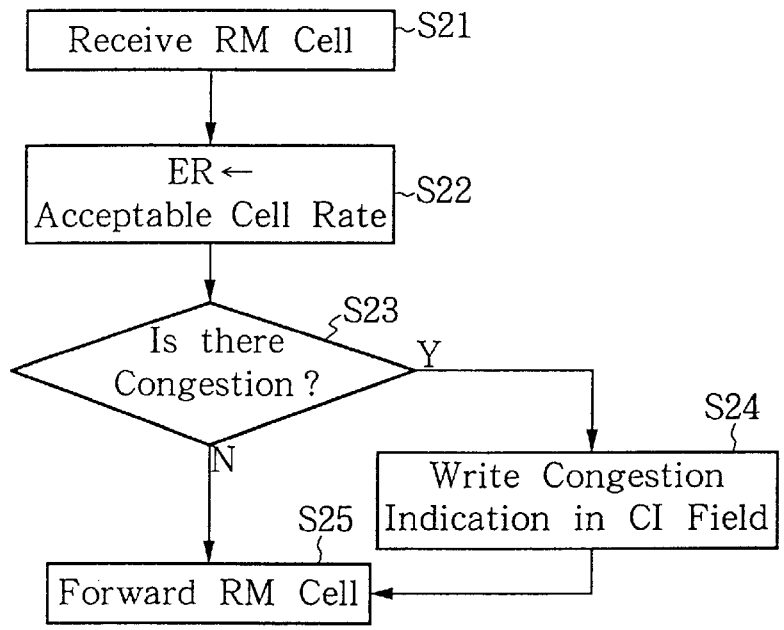
FIG. 56 is a flowchart showing the operation of source-side and destination-side subscriber switches and of a transit switch.
Figure 57:
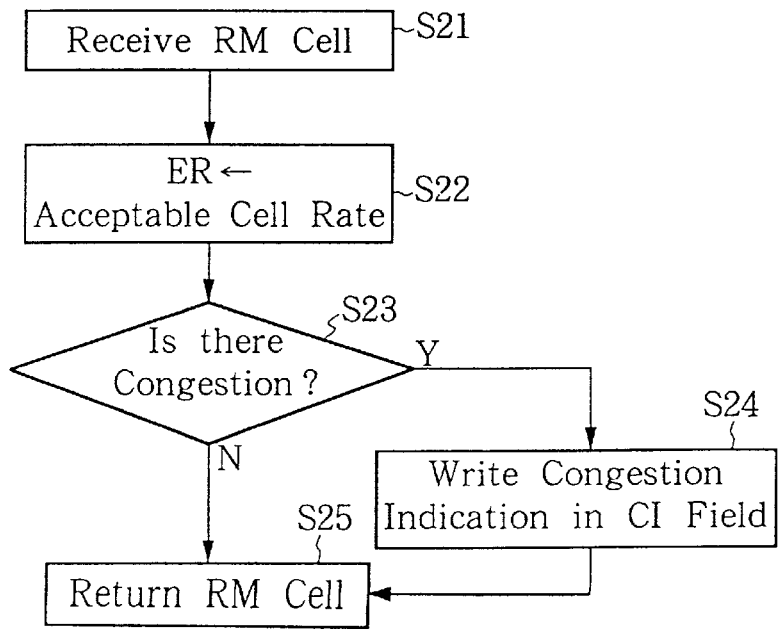
FIG. 57 is a flowchart showing the operation of a destination-side terminal.
Figure 58:
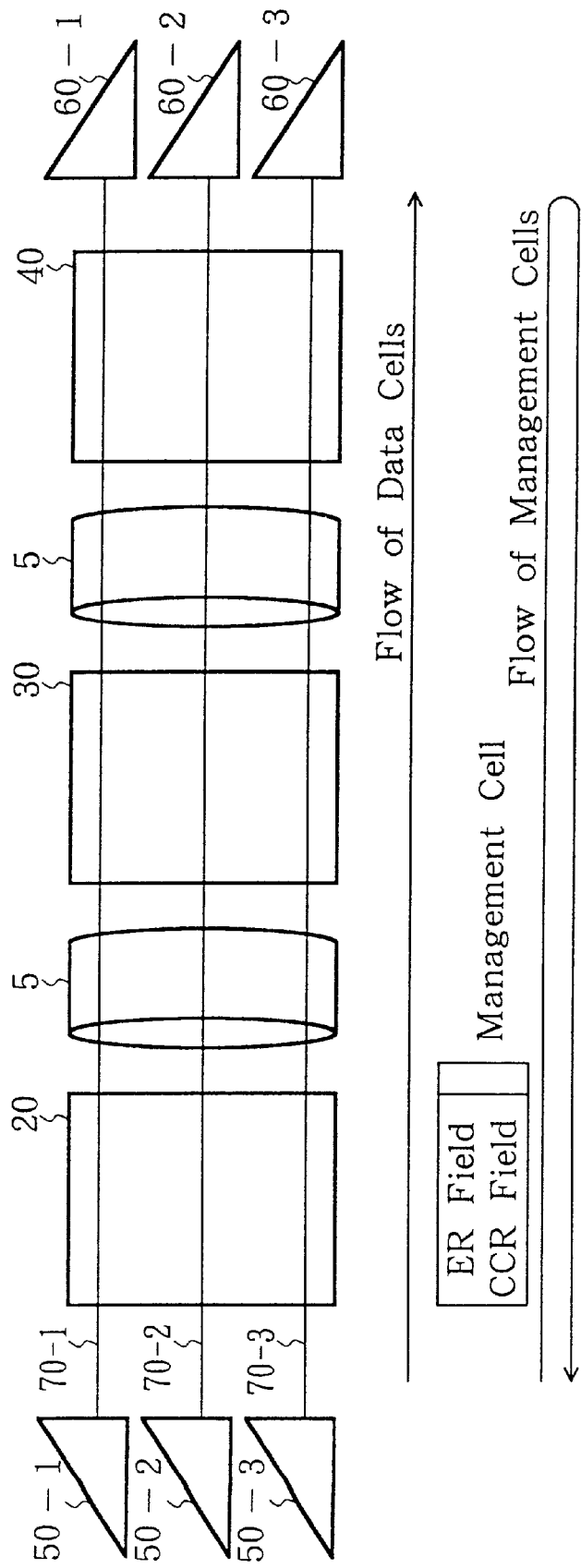
FIG. 58 serves to explain cell rate control in an ATM network according to the prior art.
Figure 59:
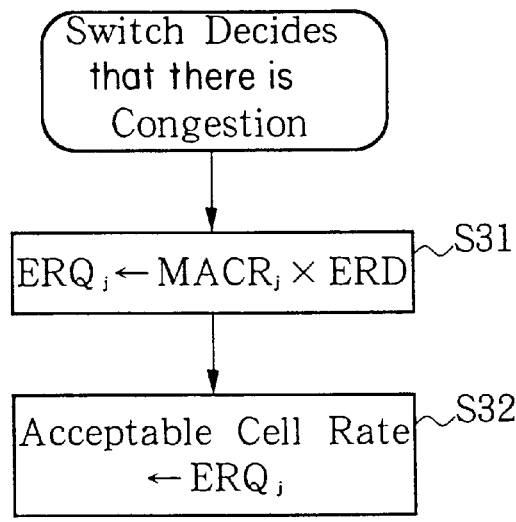
FIG. 59 shows the control flow at a switch.
Figure 60:
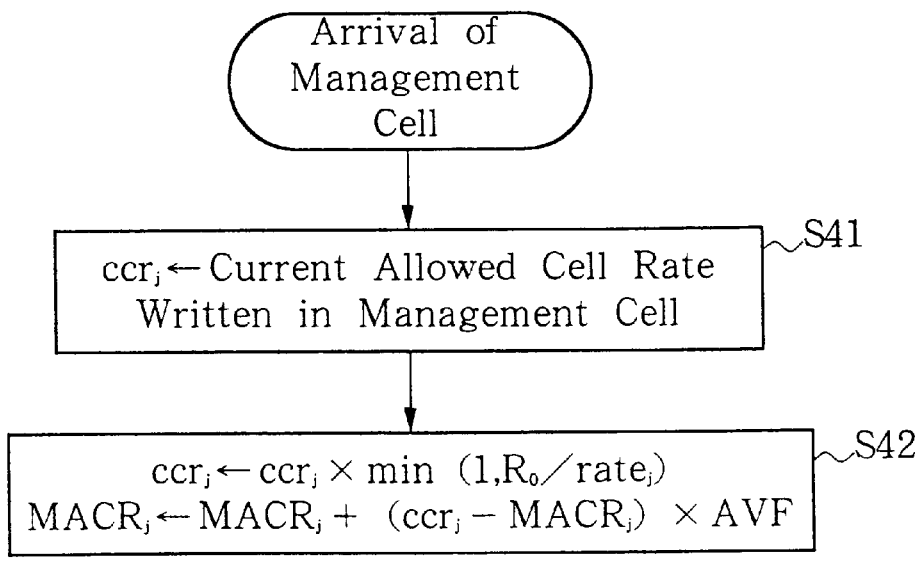
FIG. 60 shows the control flow at a switch.
Figure 61:
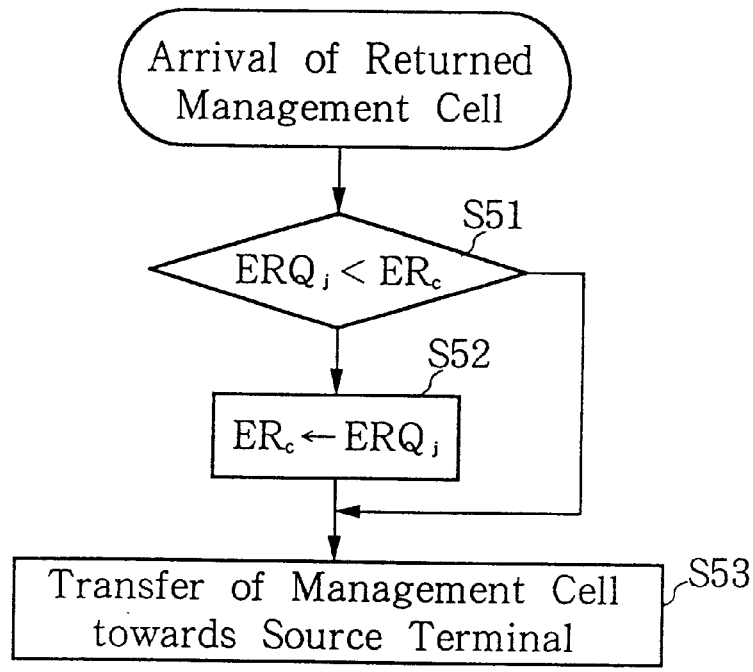
FIG. 61 shows the control flow at a switch.
Figure 62:
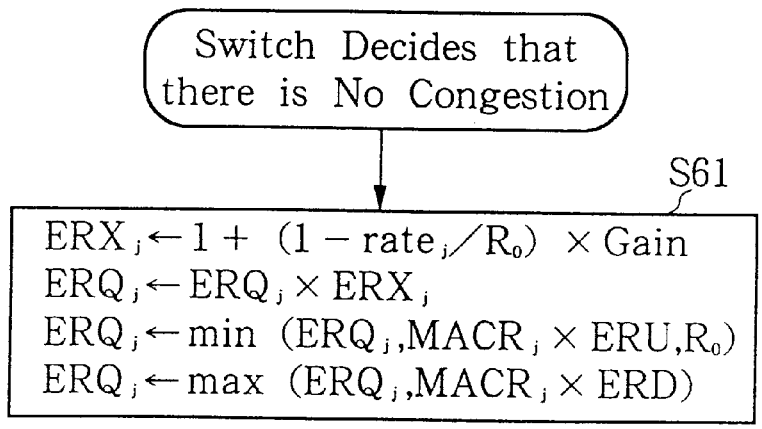
FIG. 62 shows the control flow at a switch when it has been decided that there is no congestion.
Figure 63:
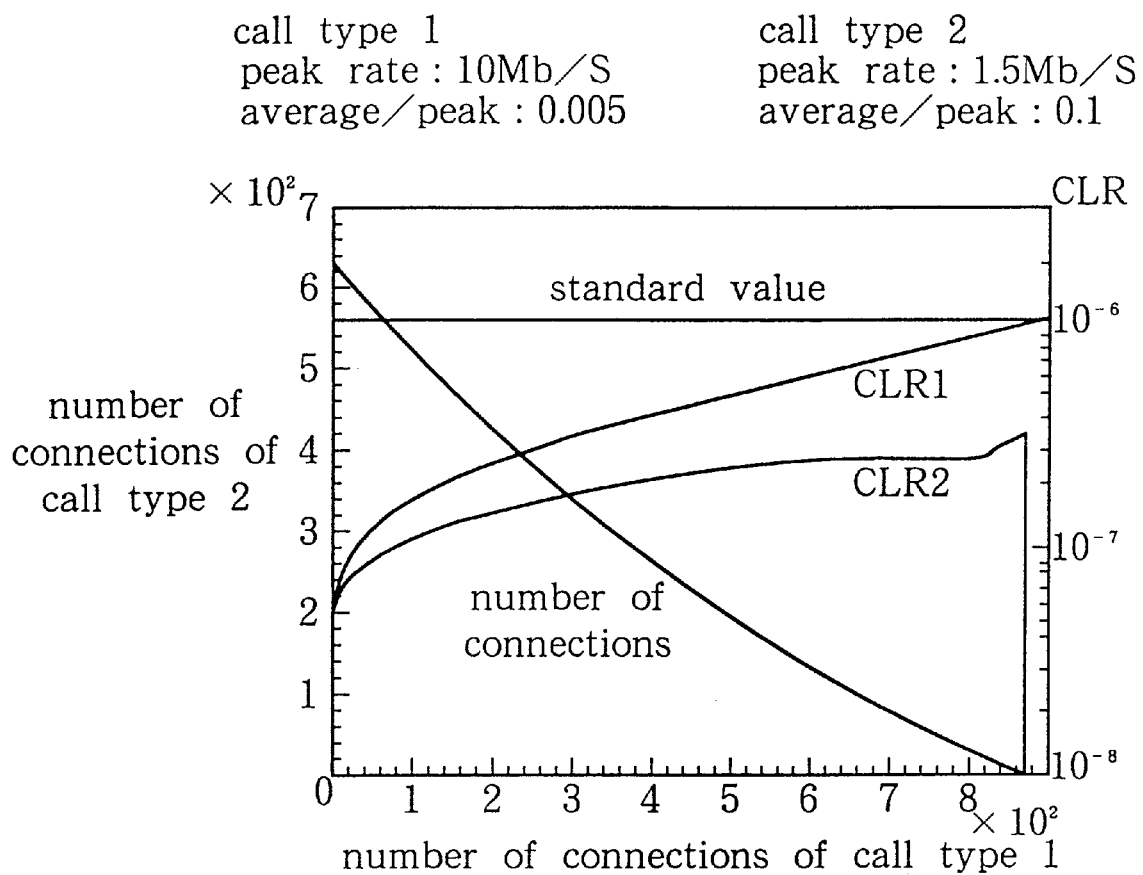
FIG. 63 shows the relation between cell loss ratio and the number of connections for each call type in a multiple access environment.

The constitution of a first embodiment of this invention will be explained with reference to FIG. 1–FIG. 3. FIG. 1 shows the overall constitution of this first embodiment. FIG. 2 is a block diagram of the essential parts of the switch that serves the source-side terminals. FIG. 3 is a block diagram of the transit switch and the switch that serves the destination-side terminals. In FIG. 1, 50-1 and 50-2 are source-side terminals, block 20 is the switch that serves source-side terminals 50-1 and 50-2, 30 is a transit switch, block 40 is the switch that serves the destination-side terminals, 5 is a transmission link and 60-1 and 60-2 are the destination-side terminals. In FIG. 2, block 10 is a route information collector and 12 is a cell rate computation and block control part. In FIG. 3, block 14 is a route information output part.

This first embodiment of the invention is a dynamic rate control system which serves terminals 50-1 and 50-2, wherein switches 20, 30 and 40 have means for setting up a VP for one of these terminals 50-1 or 50-2 on the basis of a request from the terminal. Means for setting up this VP are provided in each of switches 20, 30 and 40 and in each of terminals 50-1, 50-2, 60-1 and 60-2, but because this is not an essential part of this invention, it is not illustrated.

The first embodiment of the invention comprises: route information collector 10 as means for collecting route information which includes information relating to the residual bandwidth of the VP once this has been set up after a cell rate has been specified for a terminal 50-1 or 50-2; and cell rate computation and control part 12 which serves for holding the cell rate requested by a terminal 50-1 or 50-2, and as a control means which, on the basis of the aforesaid route information, dynamically controls the cell rate of the virtual path once this has been set up. The control means controls the cell rate so that it is as large as possible, up to the cell rate requested by that terminal, and so that it is fair to the plurality of terminals from which there are connection requests. Cell rate computation and control part 12 has means which computes and sets the allowed cell rate for terminals 50-1 and 50-2.

Source-side terminals 50-1 and 50-2 make calls on the basis of the ABR protocol. Switch 20 enables connections to be established by emulating the ABR protocol for source-side terminals 50-1 and 50-2. It is not essential for switches 30 and 40 and destination-side terminals 60-1 and 60-2 to operate on the basis of the ABR protocol. However, periodically, or when there has been a state change, switches 30 and 40 must notify switch 20 of the state of utilization of the route in question, this state serving as route information. The current unutilized bandwidth is calculated on the basis of the state of utilization notified to switch 20, or on the basis of cell output from terminals 50-1 and 50-2, or on the basis of both these data.

Figure 4:
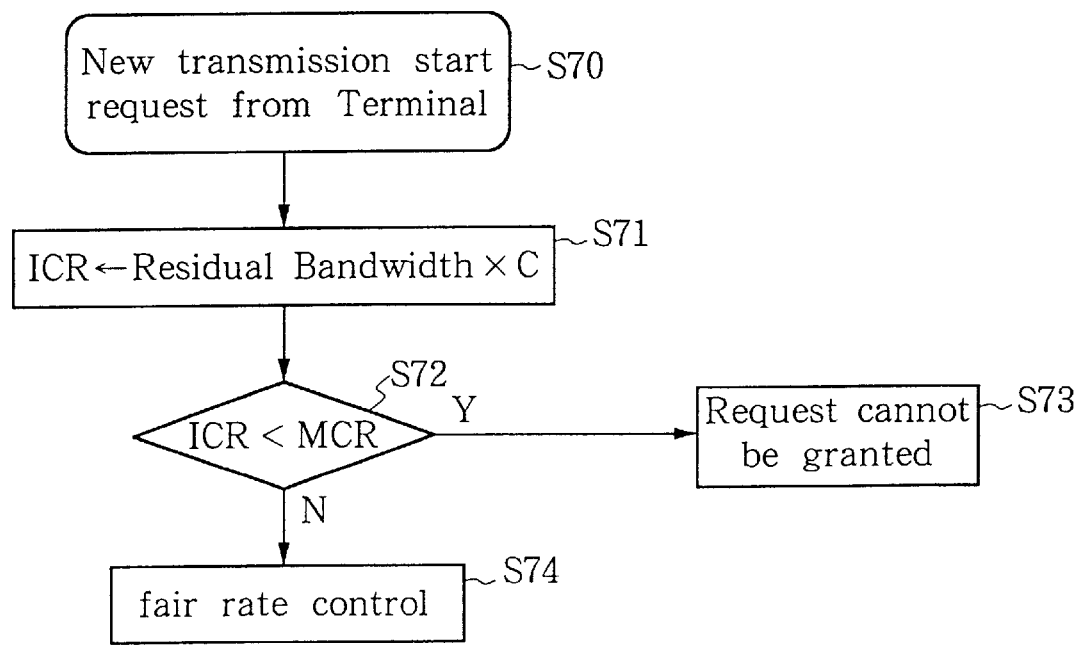
FIG. 4 is a flowchart showing the operation of a switch serving source-side terminals.

The operation of switch 20 when there has been a request from terminal 50-1 or 50-2 to start a new transmission via a given route, will be explained by means of FIG. 4, which is a flowchart showing the operation of switch 20 which serves source-side terminals 50-1 and 50-2. When a request to start transmission has newly arrived from terminal 50-1 or 50-2 (S70), the value obtained by multiplying the residual bandwidth by a constant C ($0<C\leq 1$) is taken as the initial cell rate ICR of the transmission (S71). Constant C is a parameter determined so as to avoid the situation in which the wrong cell rate is set because the information pertaining to the time at which the transmission start request was accepted deviates from the current situation. If the ICR is smaller than the minimum cell rate (MCR) requested by source-side terminal 50-1 or 50-2 (S72), it would be dangerous to accept the transmission start request at this cell rate, and it is therefore necessary to re-negotiate with source-side terminal 50-1 or 50-2. Until this is done, the transmission start request cannot be granted (S73). If the ICR is larger than the MCR (S72), transmission at the ICR is allowed (S74). This first embodiment of the invention makes it possible to decide immediately whether to accept or reject a new transmission start request from source-side terminal 50-1 or 50-2, whereupon transmission at the ICR from accepted source-side terminals 50-1 and 50-2 can be allowed.

(Second embodiment)

Figure 5:
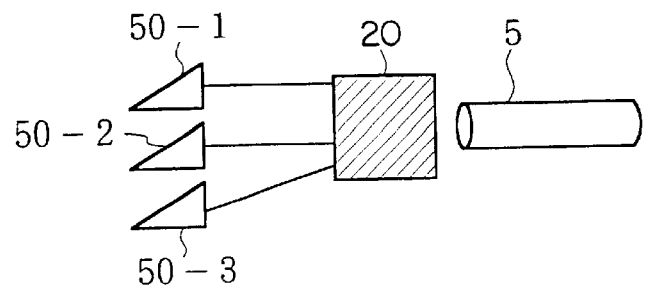
FIG. 5 shows the essential parts of an ATM network according to a second embodiment of this invention.
Figure 6:
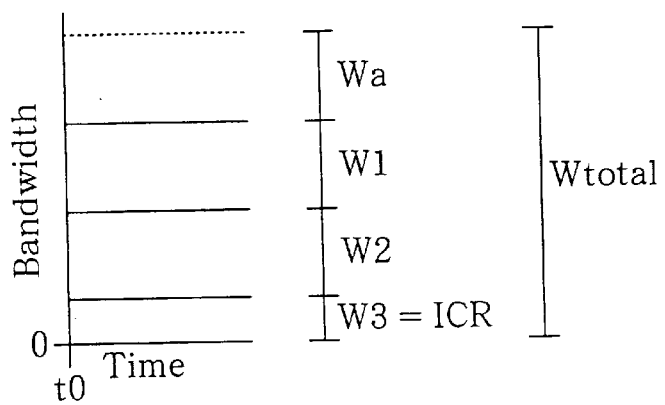
FIG. 6 represents the state of bandwidth utilization in an ATM network prior to the application of control according to the second embodiment of this invention.

A second embodiment of this invention will be explained with reference to FIG. 5–FIG. 8. FIG. 5, shows the essential parts of an ATM network according to this second embodiment, wherein blocks 50-1, 50-2 and 50-3 are source-side terminals which make calls in accordance with the ABR protocol; 20 is the switch serving the source-side terminals, the switch emulating the ABR protocol for each terminal; and block 5 is part of a route shared by source-side terminals 50-1, 50-2 and 50-3. FIG. 6 represents the state of bandwidth utilization in the ATM network of FIG. 5 prior to the application of control according to this second embodiment of the invention. In FIG. 6, $W_{total}$ is the total bandwidth of the route in question, Wa is the residual bandwidth of this route, W1 is the utilized bandwidth of source-side terminal 50-1, W2 is the utilized bandwidth of source-side terminal 50-2, and W3 is the utilized bandwidth of source-side terminal 50-3. In FIG. 6, immediately after source-side terminal 50-3 has transmitted an initial RM cell at time t0, it starts to transmit data at the initial cell rate ICR shown by W3.

Figure 7:
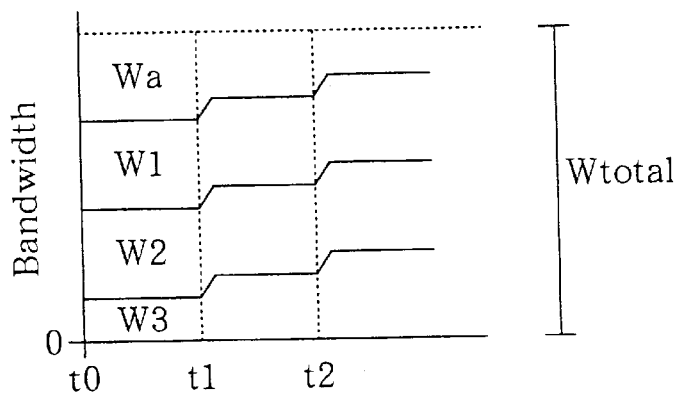
FIG. 7 represents the operation of the second embodiment and the resulting changes in utilized bandwidth.
Figure 8:
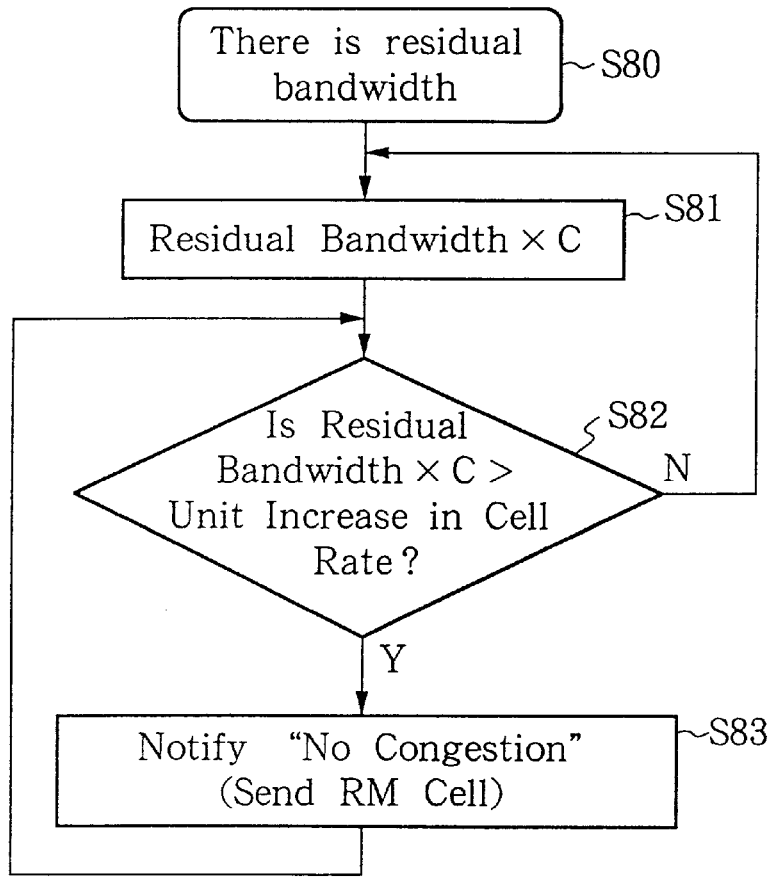
FIG. 8 is a flowchart representing the operation of a source-side switch in this second embodiment of the invention.

FIG. 7 represents the operation of this second embodiment and the resulting changes in utilized bandwidth. When the value obtained by multiplying the residual bandwidth Wa by the constant C ($0<C\leq 1$) is larger than the unit increase in unit time of the cell rate of source-side terminal 50-3, which began transmitting at cell rate ICR at t0, an RM cell serves to notify that there is no congestion is generated at switch 20. This RM cell is transmitted to source-side terminal 50-3, thereby allowing an increase in the cell rate. In FIG. 7, source-side terminal 50-3 receives the RM cell at time t1 and increases its cell rate. Thereafter, if the value obtained by multiplying the residual bandwidth Wa by the constant C is still the larger, switch 20 generates and transmits another RM cell. FIG. 8 is a flowchart representing the operation of switch 20 in this second embodiment of the invention. If there is residual bandwidth (S80), the product of this residual bandwidth and constant C is computed (S81). When the value obtained by multiplying the residual bandwidth by the constant C is greater than the unit increase in cell rate (S82), switch 20 notifies source-side terminals 50-1, 50-2 and 50-3 that there is no congestion (S83), whereupon these source-side terminals increase their cell rate by the unit increase. According to this second embodiment of the invention, rather than increasing the cell rate gradually while observing the state of the entire route, a unit increase is set in advance and the cell rate is increased in one pass by that unit increase, by a decision of switch 20 alone. As a result, the cell rate of source-side terminals 50-1, 50-2 and 50-3 can be increased rapidly in stepwise fashion.

(Third embodiment)

Figure 9:
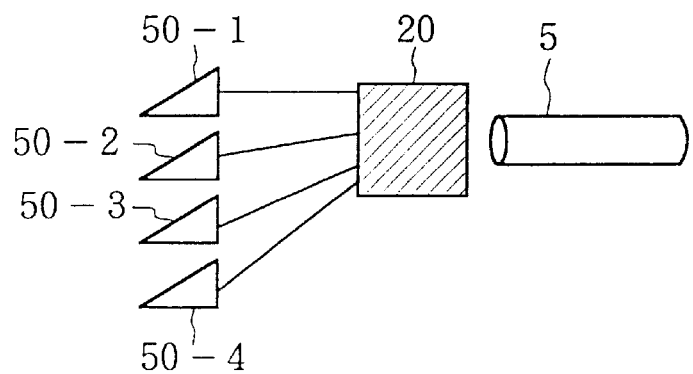
FIG. 9 shows the essential parts of an ATM network according to a third embodiment of this invention.
Figure 10:
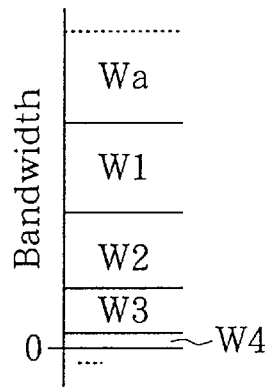
FIG. 10 represents the bandwidth utilized by each terminal at a certain point in time.
Figure 11:
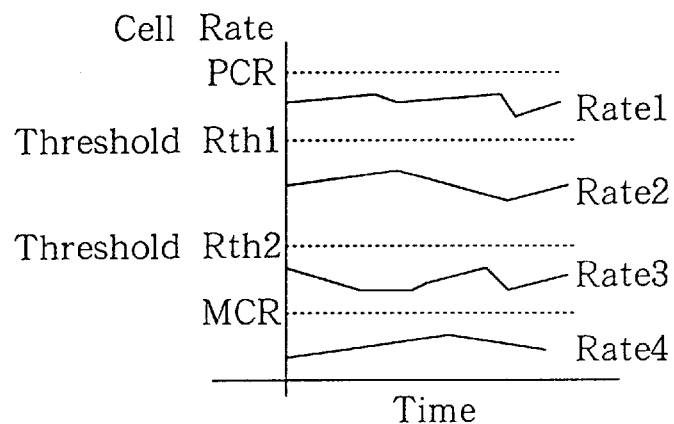
FIG. 11 represents the relation between thresholds in the third embodiment of the invention, and the peak cell rate and minimum cell rate of the source-side terminals.
Figure 12:
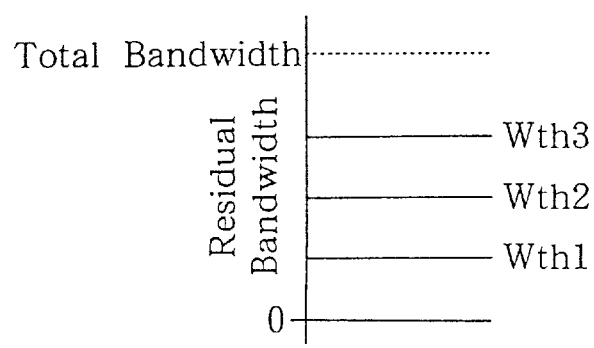
FIG. 12 represents the relation between residual bandwidth and various thresholds in the third embodiment of the invention.

A third embodiment of this invention will be explained with reference to FIG. 9–FIG. 14. FIG. 9, shows the essential parts of an ATM network according to this third embodiment, wherein source-side terminals 50-1 to 50-4 are source-side terminals which make calls in accordance with the ABR protocol; block 20 is a switch which emulates the ABR protocol for each terminal; and block 5 is part of a route shared by the terminals. In FIG. 10, which represents the bandwidth utilized by each terminal at a given time, Wa represents the residual bandwidth of the route in question, and W1, W2, W3 and W4 represent respectively the bandwidths utilized by source-side terminals 50-1 to 50-4. In FIG. 10, there is a large spread in the bandwidths being used, with the result that there is a possibility of unfair cell rates in the various terminals. FIG. 11 represents the relation between thresholds Rth1 and Rth2 in this third embodiment of the invention, and the peak cell rate (PCR) and minimum cell rate (MCR) of source-side terminals 50-1 to 50-4, for the same situation as in FIG. 10. FIG. 12 represents the relation between residual bandwidth and thresholds Wth1, Wth2 and Wth3 in this third embodiment of the invention.

Figure 13:
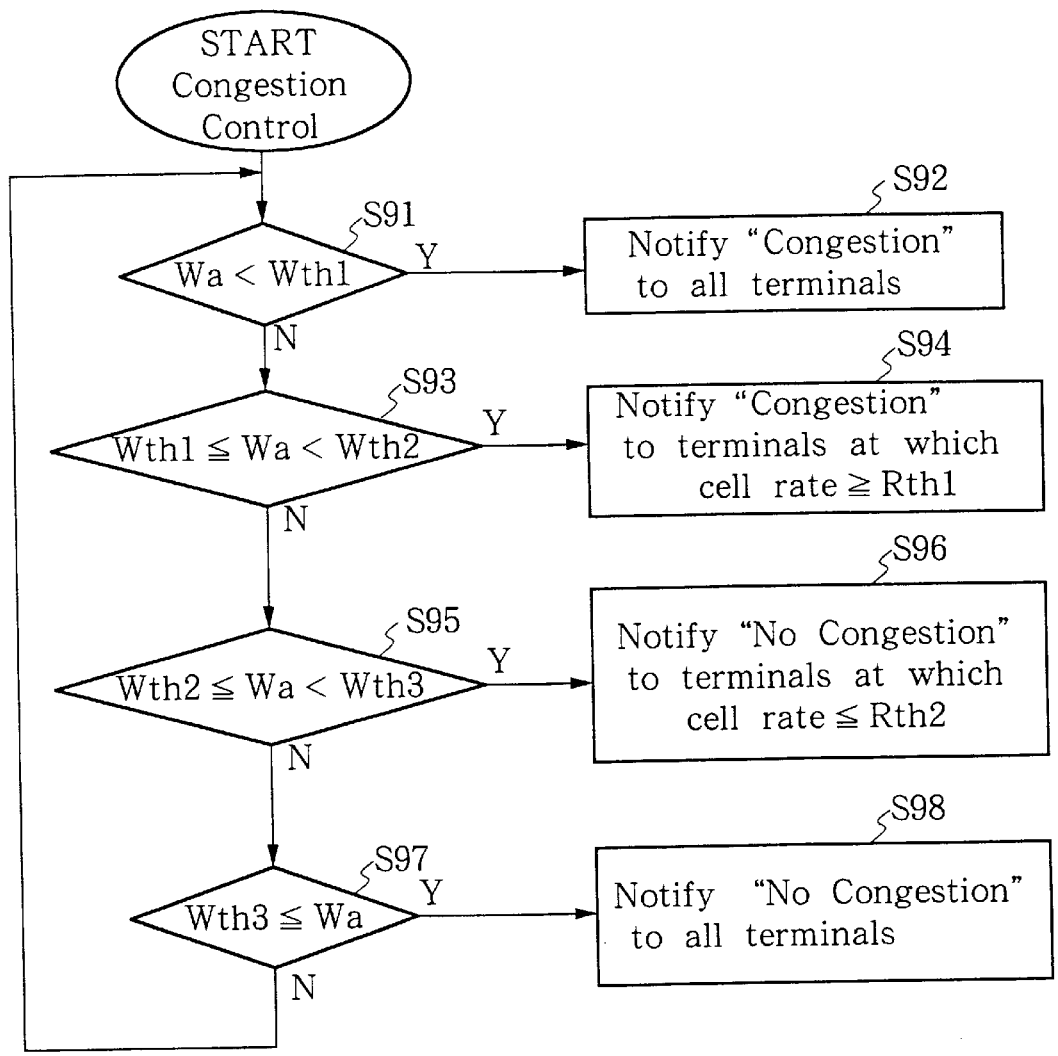
FIG. 13 is a flowchart of the algorithm used by a switch to notify terminals of congestion.

The control algorithm in this third embodiment of the invention will be explained with reference to FIG. 13 and FIG. 14. FIG. 13 is a flowchart of the algorithm used by switch 20 for notifying terminals of congestion. FIG. 14 shows the relations among residual bandwidth, the cell rate of the terminals, and the contents of the corresponding congestion notification. Switch 20 monitors the residual bandwidth and compares its value with thresholds Wth1, Wth2 and Wth3. When residual bandwidth Wa is less than threshold Wth1 (S91), a congestion notification is sent to all source-side terminals 50-1 to 50-4 (S92). If the residual bandwidth Wa is equal to or greater than threshold Wth1 but smaller than threshold Wth2 (S93), a congestion notification is sent to any terminal at which the cell rate is equal to or greater than threshold Rth1 (S94). If the residual bandwidth Wa is equal to or greater than Wth2 but smaller than threshold Wth3 (S95), a "no congestion" notification is sent to any terminal 50-1 to 50-4 at which the cell rate is equal to or less than Rth2 (S96). If the residual bandwidth Wa is equal to or greater than threshold Wth3 (S97), a "no congestion" notification is sent to all source-side terminals 50-1 to 50-4 (S98). Congestion information is sent to each source-side terminal 50-1 to 50-4 by generating RM cells on the basis of these comparison results along the lines shown in FIG. 14, and transmitting them to these terminals. In accordance with the ABR protocol, when source-side terminals 50-1 to 50-4 receive a "no congestion" notification, they get a chance to increase their cell rate. Conversely, when they receive notification that there is congestion, they decrease their cell rate.

In this third embodiment of the invention, the timing at which a congestion notification is sent to source-side terminals 50-1 to 50-4 varies in accordance with the cell rate prior to the change and the residual bandwidth. As a result, when there is spare bandwidth, this third embodiment has the following effects. Namely, all the terminals are shifted to higher cell rates; the spread in cell rates is reduced, thereby giving greater fairness among the terminals; and the cell rate of a terminal with a low cell rate is increased rapidly. Conversely, if the bandwidth begins to be insufficient, the effect is that the cell rate of terminals with a high rate is reduced. If the bandwidth becomes even more insufficient, the effect is that all the cell rates are shifted downwards. In all of these cases, the control function can be implemented without RM cells being sent back and forth between source and destination terminals.

(Fourth embodiment)

Figure 15:
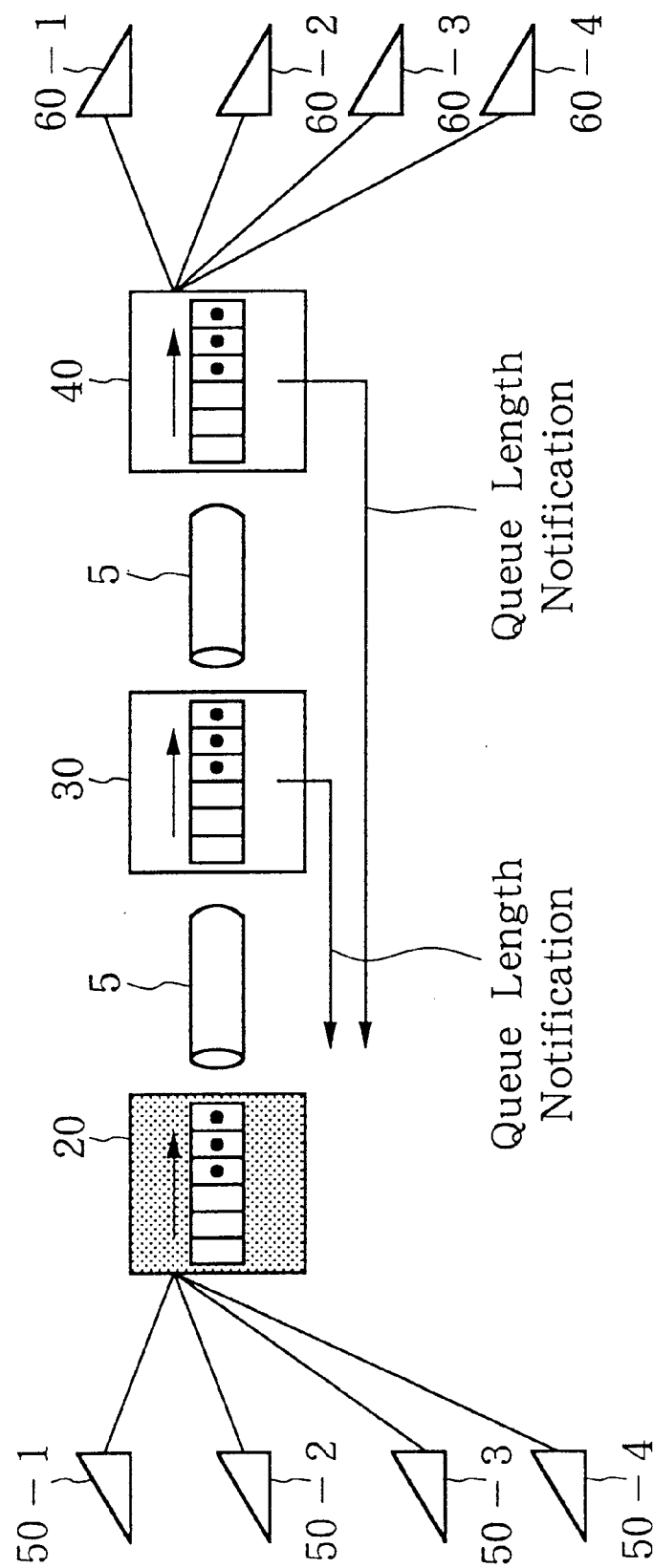
FIG. 15 shows the overall constitution of an ATM network according to a fourth embodiment of this invention.

A fourth embodiment of this invention will be explained with reference to FIG. 15–FIG. 18. FIG. 15, shows the overall constitution of an ATM network according to this fourth embodiment, wherein blocks 50-1 to 50-4 are source-side terminals, block 20 is a switch serving these source-side terminals, block 30 is a transit switch, block 40 is a switch serving destination-side terminals, 5 is a transmission link, and 60-1 to 60-4 are destination-side terminals. The constitution of this fourth embodiment will be explained with reference to FIG. 15.

Source-side terminals 50-1 to 50-4 make calls on the basis of the ABR protocol. Switch 20 enables connections to be established by emulating the ABR protocol for source-side terminals 50-1 to 50-4. It is not essential for switches 30 and 40 and destination-side terminals 60-1 to 60-4 to operate on the basis of the ABR protocol. Periodically, or when there has been a state change, switches 30 and 40 notify source-side switch 20 of the number of cells stored in their respective buffers. Switch 20 then judges the current state of utilization on the basis of the notified queue lengths and the number of cells stored in its own buffer.

Figure 16:
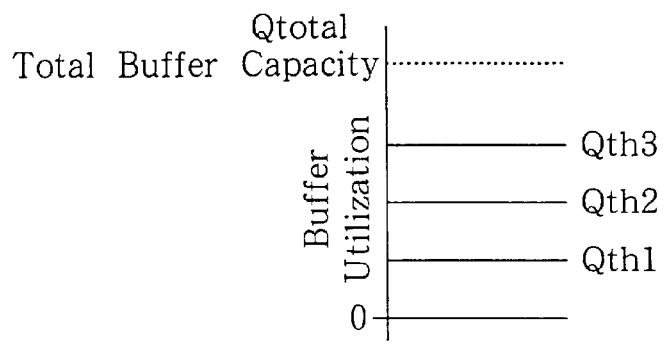
FIG. 16 represents the relation between residual bandwidth and various thresholds in the fourth embodiment.

The diagram shown in FIG. 11 in connection with the third embodiment of this invention also represents the relations among peak cell rate (PCR), minimum cell rate (MCR), thresholds Rth1 and Rth2, and the cell rate of each terminal in this fourth embodiment of the invention. Rate 1 to Rate 4 in FIG. 11 are the respective cell rates of source-side terminals 50-1 to 50-4. There is a large spread in the cell rates shown in FIG. 11, with the result that there is a possibility of unfairness in the cell rates of source-side terminals 50-1 to 50-4. FIG. 16 represents the relation between residual bandwidth and thresholds Qth1, Qth2 and Qth3 in this fourth embodiment of the invention.

Figure 17:
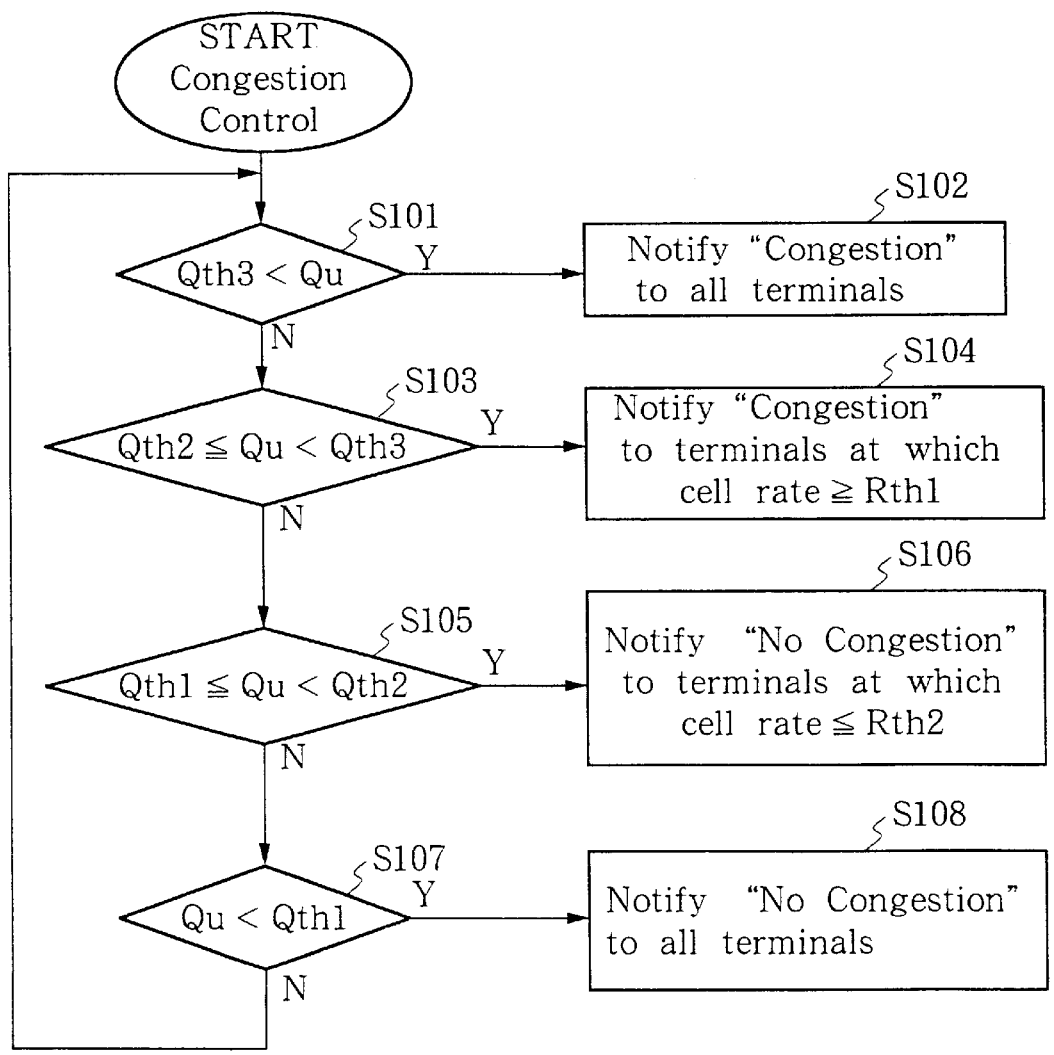
FIG. 17 is a flowchart of an algorithm that enables a switch to control the cell rates of the source-side terminals.

FIG. 17 is a flowchart of the algorithm used by switch 20 for controlling the cell rates of source-side terminals 50-1 to 50-4. In FIG. 17, Qu is the value of the largest of the buffer utilizations notified to switch 20. Switch 20 compares thresholds Qth1, Qth2 and Qth3 with Qu. If the largest buffer utilization Qu is equal to or greater than threshold Qth3 (S101), a congestion notification is sent to all source-side terminals 50-1 to 50-4 (S102). If the largest buffer utilization Qu is equal to or greater than threshold Qth2 but smaller than threshold Qth3 (S103), a congestion notification is sent to any of source-side terminals 50-1 to 50-4 with a cell rate equal to or greater than threshold Rth1 (S104). If the largest buffer utilization Qu is equal to or greater than threshold Qth1 but smaller than Qth2 (S105), a "no congestion" notification is sent to any of source-side terminals 50-1 to 50-4 where the cell rate does not exceed threshold Rth2 (S106). If the largest buffer utilization Qu is smaller than threshold Qth1 (S107), a "no congestion" notification is sent to all source-side terminals 50-1 to 50-4 (S108). FIG. 18 shows the relations among largest buffer utilization Qu, cell rate of source-side terminals 50-1 to 50-4, and the contents of the corresponding congestion notification. RM cells are generated on the basis of comparison results along the lines shown in FIG. 18, and congestion information is notified by transmitting these RM cells to source-side terminals 50-1 to 50-4. In accordance with the ABR protocol, when source-side terminals 50-1 to 50-4 receive a "no congestion" notification, they get a chance to increase their cell rate. Conversely, when they receive notification that there is congestion, they decrease their cell rate.

In this fourth embodiment of the invention, the timing at which a congestion notification is sent to source-side terminals 50-1 to 50-4 varies in accordance with the cell rate prior to the change and the shared buffer length. As a result, when there is spare bandwidth or spare buffer capacity, this fourth embodiment has the following effects. Namely, all the terminals are shifted to higher cell rates; the spread in cell rates is reduced, thereby providing greater fairness among source-side terminals 50-1 to 50-4; and especially, the cell rate of a terminal with a low cell rate is increased rapidly. Conversely, if the bandwidth or buffer length begins to be insufficient, the effect is that the cell rate of terminals with a high rate is reduced. If the bandwidth or buffer length becomes even more insufficient, the effect is that all the cell rates are shifted down-wards. In all of these cases, the control function can be implemented without RM cells being sent back and forth between source and destination terminals.

(Fifth embodiment)

When another scheme is present in part of an ATM network, switches 30 and 40 and destination-side terminals 60-1 to 60-4 may sometimes transmit RM cells independently. In such a case, if "no congestion" has been entered in such an RM cell, then even though switch 20 may be acting to decrease the cell rate of source-side terminals 50-1 to 50-4, the opposite action to this will be requested by the returned RM cell. Accordingly, in this fifth embodiment of the invention, if an RM cell for source-side terminals 50-1 to 50-4 has arrived from elsewhere, it is discarded at switch 20. In this way, erroneous cell rate control resulting from RM cells with erroneous congestion information can be avoided.

(Sixth embodiment)

Figure 19:
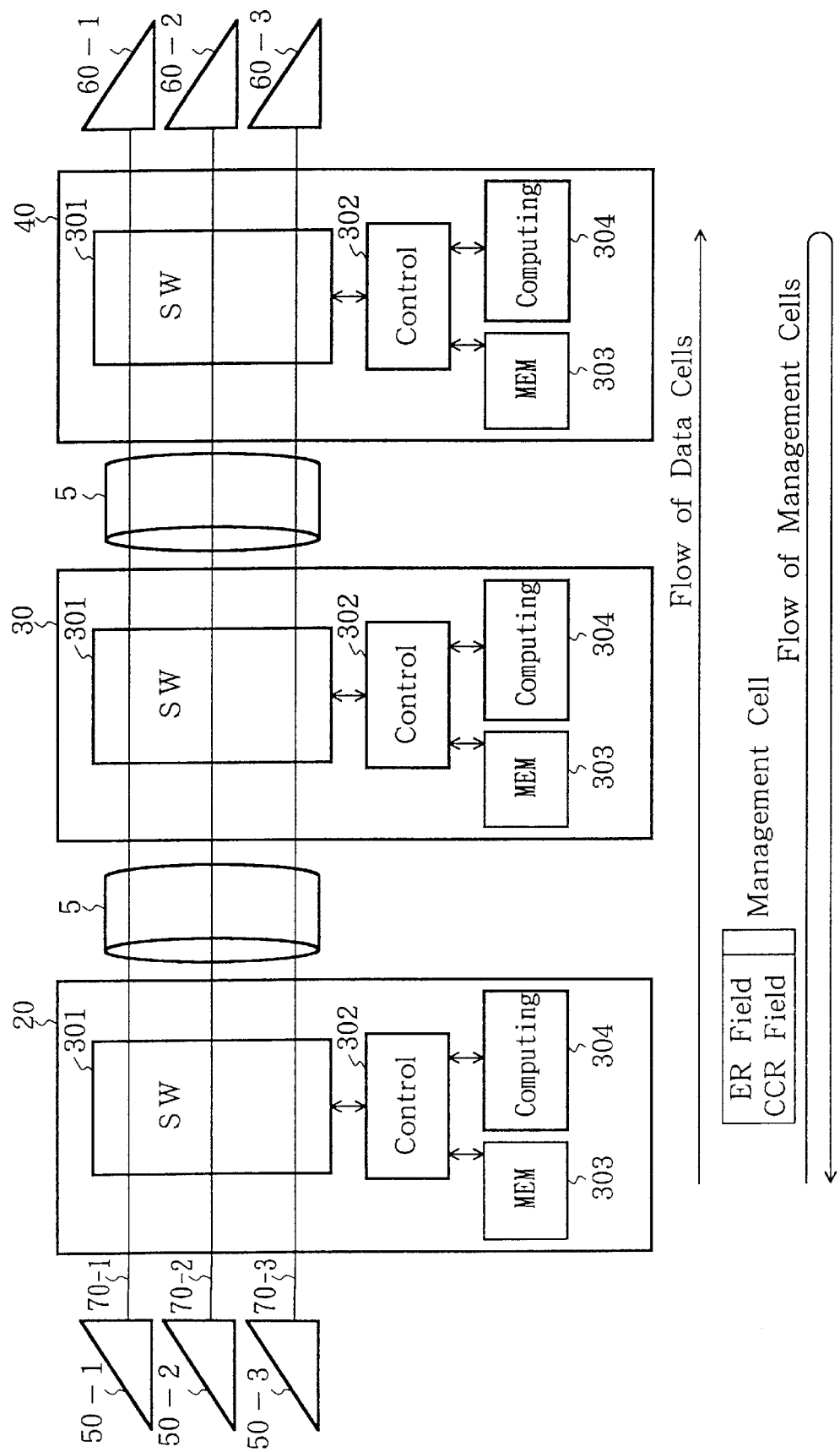
FIG. 19 shows the overall constitution of a sixth embodiment of this invention.

The constitution of a sixth embodiment of this invention will be explained with reference to FIG. 19, which shows the overall constitution of this sixth embodiment. Here, the explanation will focus on connections 70-1 to 70-3 between terminals 50-1 to 50-3 and terminals 60-1 to 60-3, the connections all sharing transmission link 5. In other words, terminals 50-1 and 60-1, terminals 50-2 and 60-2, and terminals 50-3 and 60-3 are respectively connected to each other by connections 70-1 to 70-3, said connections passing through switches 20-40 which are connected to each other via transmission links 5. Said terminals send and receive information at variable cell rates. Switches 20-40 each comprise: switching part 301 which performs circuit switching; control part 302 which as well as controlling this switching part 301, sends information relating to acceptable cell rates to source-side terminals 50-1 to 50-3 of connections 70-1 to 70-3 served by the control part, and collects the following information: the allowed cell rate and actual cell rate of connections 70-1 to 70-3, the total bandwidth and the total input bandwidth of shared transmission link 5, and the number of connections that share this transmission link 5; memory part 303 for holding the information collected by control part 302; and computing part 304 which, on the basis of the information held in memory part 303, calculates for each connection the acceptable cell rate for notification to source-side terminals 50-1 to 50-3.

In this constitution, source-side terminals 50-1 to 50-3 generate management cells at fixed cell number intervals, and transmit these management cells to destination-side terminals 60-1 to 60-3. The management cells have a CCR field for giving notification of the allowed cell rate of connections 70-1 to 70-3, and an ER field for giving notification of the acceptable cell rate. When a source-side terminal 50-1 to 50-3 transmits a management cell, its writes the current allowed cell rate $ACR_j$ (j=1, 2, . . . , n) of a connection 70-1 to 70-3 in the CCR field.

Each control part 302 of switches 20-40 measures the number of connections n which pass through the switch, the total bandwidth $B_{all}$ and the total input bandwidth $B_{use}$ of the output link, and the current cell rate $rate_j$ of each connection (j=1, 2, . . . , n), and holds this information in memory part 303 of the switch. Control part 302 of switches 20-40 also reads the allowed cell rate information for each connection, this information having been written in the CCR field of the management cell that passes through the switch, and holds this information in memory part 303 of the switch as $ccr_j$ (j=1, 2, . . . , n).

Figure 20:
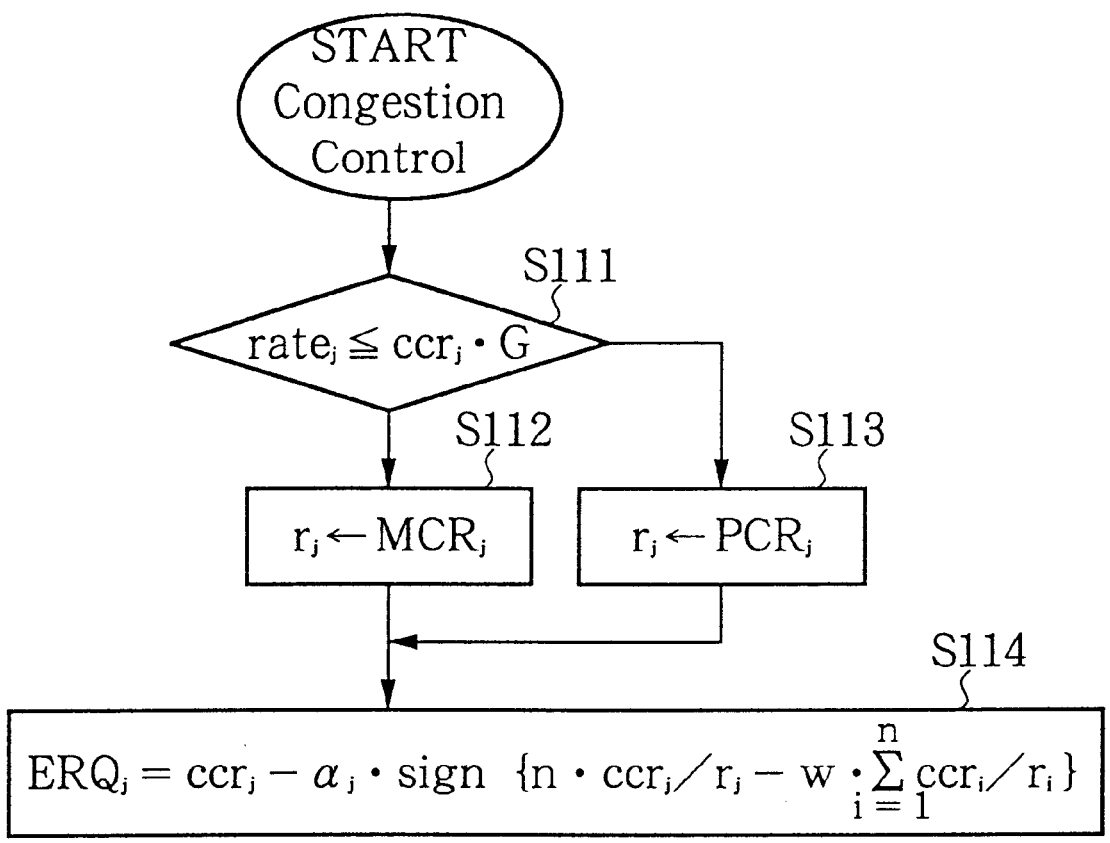
FIG. 20 shows the control flow of a switch.

FIG. 20 shows the control flow of the switches, illustrating the calculation of the acceptable cell rate. Here, by way of example, an explanation will be given of switch 30. For each connections (j=1, 2, . . . , n), the maximum and minimum values that can be taken by the allowed cell rate are determined at call connection by negotiation with the network. This maximum value will be written as $PCR_j$ (peak cell rate), and the minimum value will be written as $MCR_j$ (minimum cell rate).

Switch 30 holds the following data in memory part 303: the number of connections n, the total bandwidth $B_{all}$, the total input bandwidth $B_{use}$, the current cell rate $rate_j$, and the allowed cell rate $ccr_j$ (j=1, 2, . . . , n).

As shown in FIG. 20, for each connection 70-1 to 70-3 switch 30 compares the allowed cell rate and the actual cell rate, i.e. it compares $ccr_1$ and $rate_1$, $ccr_2$ and $rate_2$, $ccr_3$ and $rate_3$. If an actual cell rate $rate_j$ is greater than a fixed proportion of the allowed cell rate, i.e. if $rate_j > ccr_j \cdot G$ (where G is a constant such that $0 < G \leq 1$) (S111), then the requested cell rate $r_j$ (j=1, 2, . . . , n) for that connection j is taken as the $PCR_j$ (S113). Conversely, if an actual cell rate $rate_j$ is less than a fixed proportion of the allowed cell rate, then the cell rate requested for that connection is taken as the $MCR_j$ (S112). An updating equation for $ERQ_j$ can be determined by taking the variance of the ratio of allowed cell rate to requested rate for connections 70-1 to 70-3 as an evaluative function, said variance being given by:

$$V(\{ccr_1, ccr_2, \ldots, ccr_n\}, \{r_1, r_2, \ldots, r_n\}) = $$
$$(1/n)\sum_j (ccr_j/r_j - (1/n)\sum_i ccr_i/r_i)^2$$

Computing part 304 then obtains the acceptable cell rate $ERQ_j$ at switch 30 for connection j (j=1, 2, . . . , n) by computing the following (S114):

$$ERQ_j = ccr_j - \alpha_j \cdot \text{sign}\{n \cdot ccr_j/r_j - w \cdot \Sigma_i ccr_i/r_i\}$$

where $\Sigma_i$ and $\Sigma_j$ are respectively the sums from i=1 to n and from j=1 to n, $ccr_j$ and $r_j$ are respectively the allowed cell rate and the requested cell rate of connection j, n is the number of connections 70-1 to 70-3 which are transmitting data, $\alpha_j$ and w are weighting functions, and sign{ } is a function that expresses the sign of the value inside the curly brackets.

$\alpha_j$ is a positive constant which differs for each connection 70-1 to 70-3. w is a decreasing function of the total input bandwidth of the transmission link shared by connections 70-1 to 70-3. For example, w may be taken as a function of the total bandwidth $B_{all}$ and the total input bandwidth $B_{use}$ of the transmission link shared by connections 70-1 to 70-3, namely:

$$w = (B_{all} + p_1)/(B_{use} + p_2) \times p_3$$

where $p_2$ is a constant for preventing the denominator from becoming zero, $p_1$ is a constant for correcting $p_2$, and $p_3$ is a constant for setting the allowable width.

A value equal to the absolute value of:

$$\{n \cdot ccr_j/r_j - w \cdot \Sigma_i ccr_i/r_i\}$$

may be set as $\alpha_j$. w can also be taken as the following function of the total input bandwidth $B_{use}$ of transmission link 5 shared by the connections:

$$w = -p_4 \cdot B_{use} + p_5$$

where $p_4$ is a positive constant for setting the allowable width and $p_5$ is a correction constant.

When the newly calculated acceptable cell rate is smaller than the acceptable cell rate written in the ER field of a management cell returned by a destination terminal 60-1, 60-2 or 60-3, switch 30 rewrites the ER field to the newly calculated value. If the newly calculated acceptable cell rate is not smaller than the acceptable cell rate written in the ER field of the returned management cell, switch 30 does not rewrite. In either case, switch 30 relays the management cell and thereby notifies a source-side terminal 50-1 to 50-3. It is assumed that when a source-side terminal of connection j generates a management cell, it is the $PCR_j$ of connection j that is written in the ER field.

(Seventh embodiment)

Figure 21:
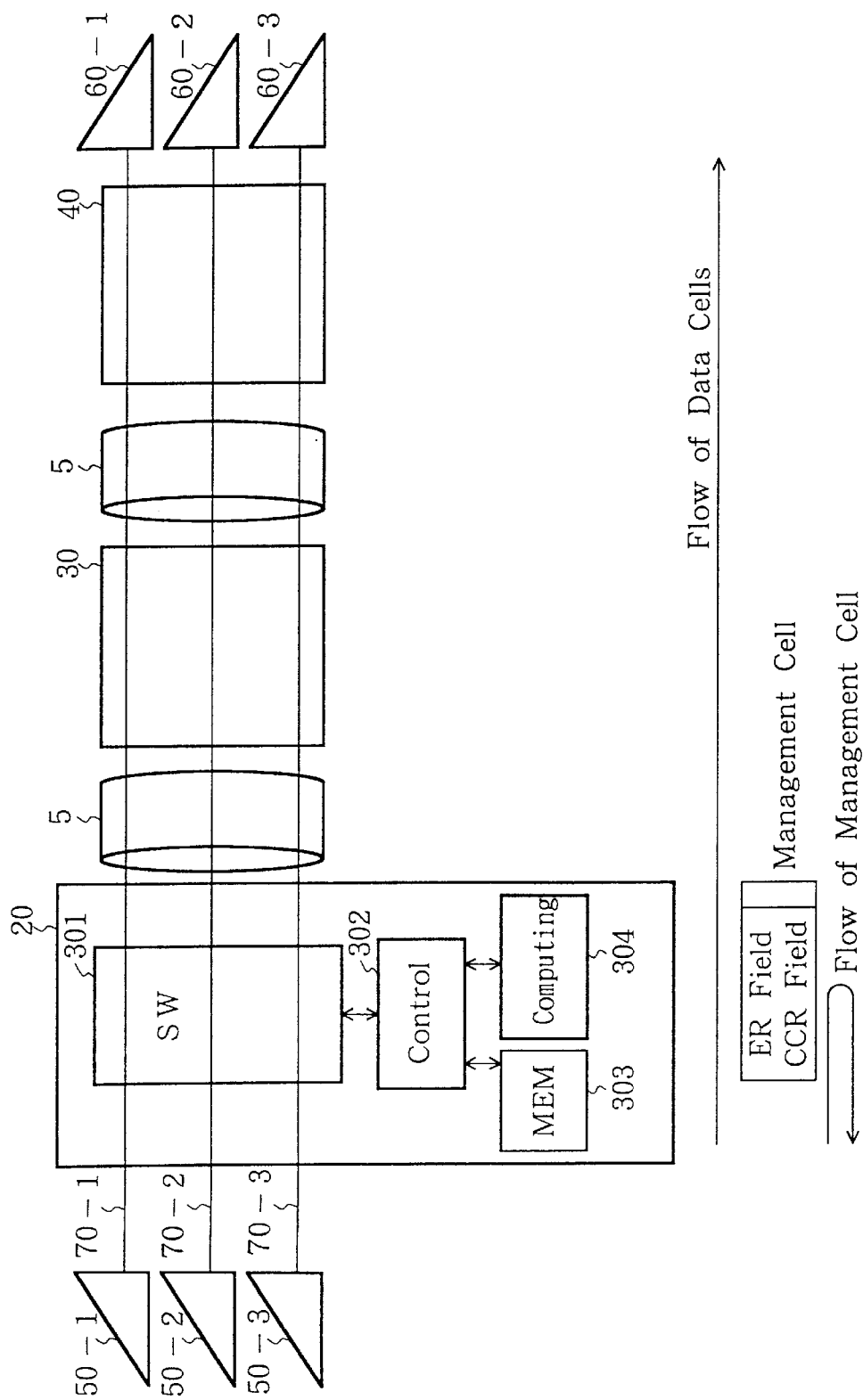
FIG. 21 shows the overall constitution of a seventh embodiment of this invention.

A seventh embodiment of this invention will be explained with reference to FIG. 21, which shows the overall constitution of this embodiment. In this seventh embodiment, only switch 20 performs the calculation of the acceptable cell rate. This constitution comprises: switches 20-40 which are mutually connected via transmission links 5; and terminals 50-1 to 50-3 and 60-1 to 60-3 which are mutually connected by connections 70-1 to 70-3, which pass through these switches 20-40. The terminals send and receive information at variable cell rates. Switch 20 directly serves terminals 50-1 to 50-3 has control part 302 which, when terminals 50-1 to 50-3 served by switch 20 act as sources, sends to these terminals 50-1 to 50-3 and information relating to acceptable cell rates. Switch 20 also has memory part 303 and calculating part 304. Memory part 303 collects and holds the following information relating to the plurality of connections which share the route, i.e. relating to connections 70-1 to 70-3 for which terminals 50-1 to 50-3 constitute sources. Namely, memory part 303 collects and holds the allowed cell rate and the actual cell rate of each connection, the allowed bandwidth and the total input bandwidth of the route, and the number of connections that share this route. Computing part 304 calculates, for each connection and on the basis of the information held in this memory part 303, the acceptable cell rate to be notified to a terminal.

In other words, switch 20 rewrites management cells that have arrived from terminals 50-1 to 50-3 with acceptable cell rates which have been newly calculated by the switch, and returns the management cells to their originating terminals 50-1 to 50-3. In this way, source-side terminals 50-1 to 50-3 are notified of acceptable cell rates.

In the sixth and seventh embodiments of this invention, terminals 50-1 to 50-3 were notified of the acceptable cell rate. However, it is also possible for said terminals to be notified of information indicating a rise or fall in the allowed cell rate, and for these terminals to increase or decrease their own allowed cell rates in accordance with a predefined calculation formula. For example, when the acceptable cell rate newly calculated at the switch has become smaller than the current allowed cell rate used for the calculation, the fact that there is congestion is written in a management cell that has been returned by the destination-side terminal, and this is used to notify the source-side terminal. The allowed cell rate should be automatically decreased at the source-side terminal when a congestion notification is received.

(Eighth embodiment)

Figure 22:
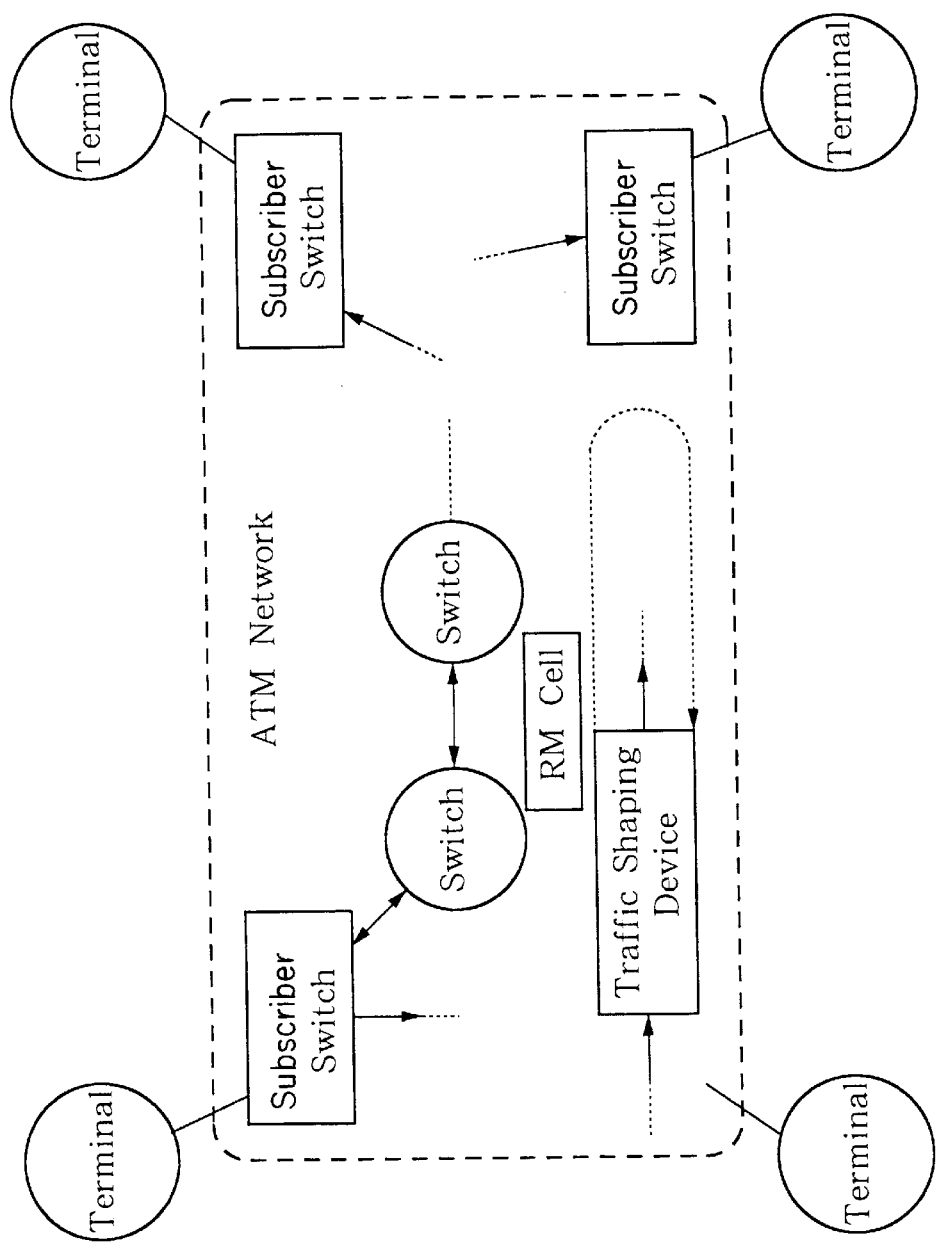
FIG. 22 shows the overall constitution of an ATM network according to an eighth embodiment of this invention.
Figure 23:
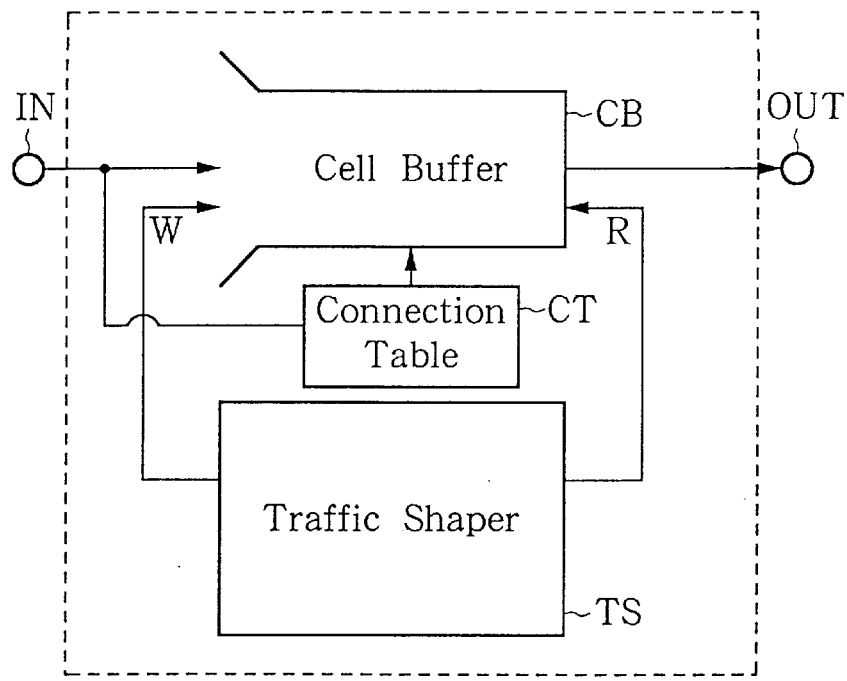
FIG. 23 is a block diagram of a dynamic rate control system according to the eighth embodiment of this invention.

The constitution of an eighth embodiment of this invention will be explained with reference to FIG. 22–FIG. 24. FIG. 22 shows the overall constitution of an ATM network according to this eighth embodiment. FIG. 23 is a block diagram of a dynamic rate control system according to this eighth embodiment, and FIG. 24 shows the essential parts of this eighth embodiment.

The eighth embodiment of this invention is provided in an ATM network in the manner shown in FIG. 22. As illustrated in FIG. 23, the eight embodiment is a dynamic rate control system comprising: input terminal IN at which a cell stream arrives; cell buffer CB which temporarily stores cells which have arrived; and traffic shaper TS which reads cells from this cell buffer CB in accordance with the indicated cell transmission interval.

Figure 24:
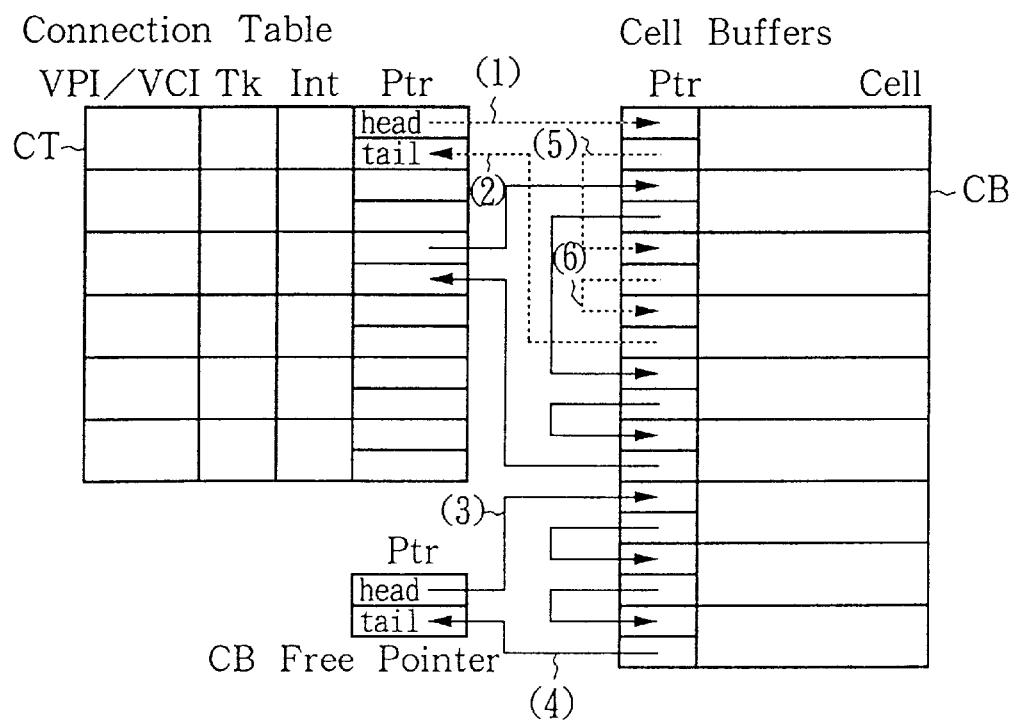
FIG. 24 shows the essential parts of the eighth embodiment of this invention.

As shown in FIG. 24, the eight embodiment includes connection table CT the addresses of which are connection identifiers (VPI/VCI) and which holds connection information that includes the aforesaid cell transmission interval Int. Cell buffer CB includes a plurality of memory regions Cell each accommodating a single cell, and pointer regions Ptr which show pointers that map these memory regions Cell and the connection table CT.

This eighth embodiment of the invention comprises shared cell buffer CB which stores cells from all the connections, and connection table CT which holds, for each connection stored in cell buffer CB, the cell transmission interval Int and the head and tail addresses of the chain of cells in cell buffer CB in their arrival order. Cells of each connection are read from cell buffer CB in accordance with a prescribed scheduling rule.

Connection table CT is a table which holds information relating to each connection. This connection table holds, for each connection, a token Tk, a cell transmission interval Int, a head pointer, and a tail pointer. A token Tk indicates that the cell that arrives next on the connection in question has the right to be transferred when it arrives. A cell transmission interval Int indicates the minimum cell transmission interval which the connection in question has to maintain. The head pointer and the tail pointer indicate linking relations to the cell buffer CB (see arrows (1) and (2) in FIG. 24), and respectively hold the address at which the head cell of the connection in question is held (arrow (1)) and at which the tail cell of that connection is held (arrow (2)).

Figure 25:
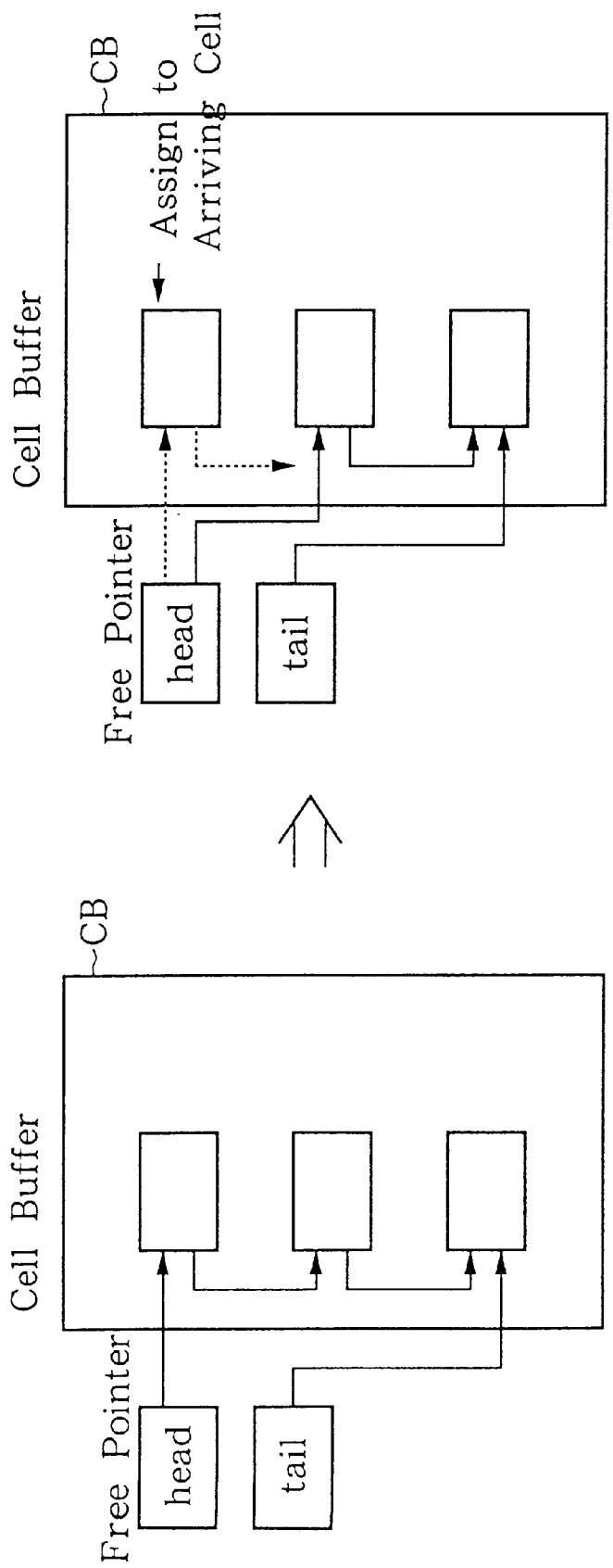
FIG. 25 shows how cells are written to the cell buffer.
Figure 27:
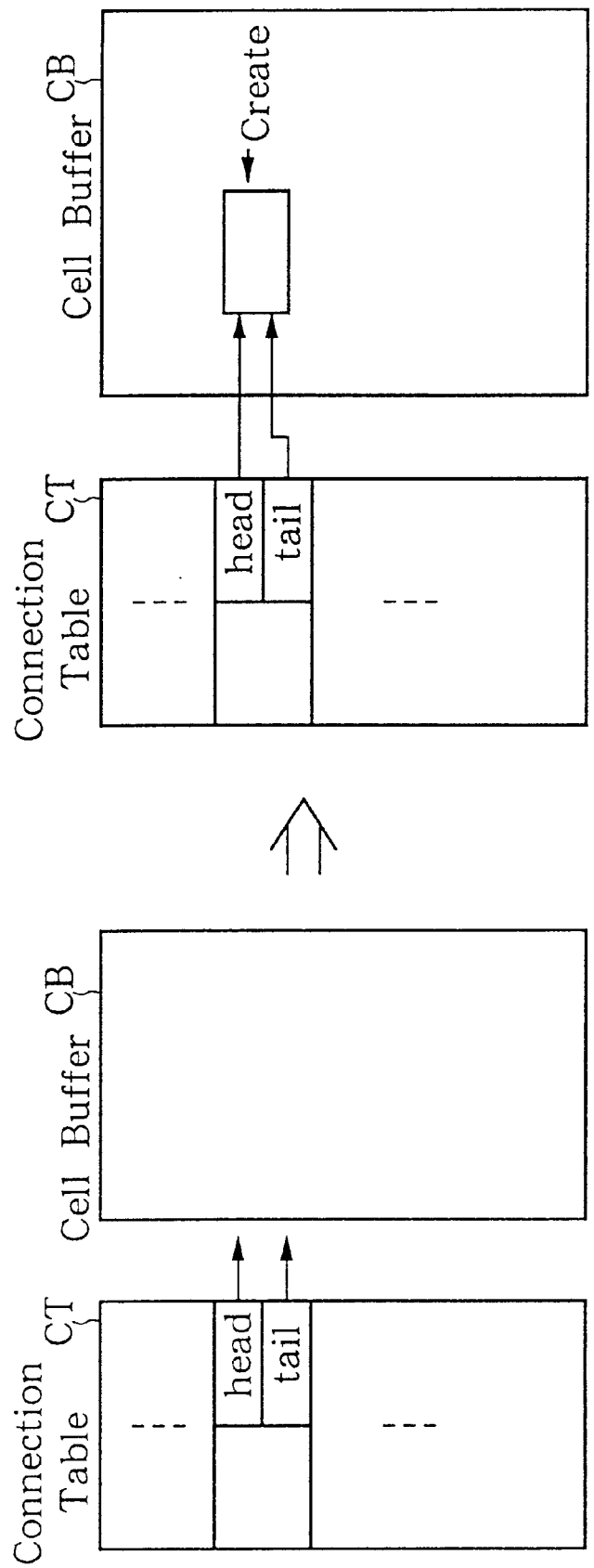
FIG. 27 shows how the connection list is rearranged.

When a cell from a given connection is written in cell buffer CB, the cell is written in a free region of cell buffer CB. An example of this writing operation is given in FIG. 25, which shows how cells are written to cell buffer CB. FIG. 25 shows a chain of free memory regions in the cell buffer. The address of the head of the chain of free memory regions is assigned to an arriving cell by changing the CB free pointer. In FIG. 25, a cell which has arrived has simply been written in cell buffer CB, and it is still necessary to establish the correspondence between that cell and a connection. The list for the connection in question is therefore rearranged. This process of rearranging the list for the connection is illustrated in FIG. 26 and FIG. 27. In FIG. 26, an address for a cell that has arrived is added to the tail of the chain of cells of the connection in question in cell buffer CB. If there is no chain in the cell buffer, a new chain is created as shown in FIG. 27.

Figure 28:
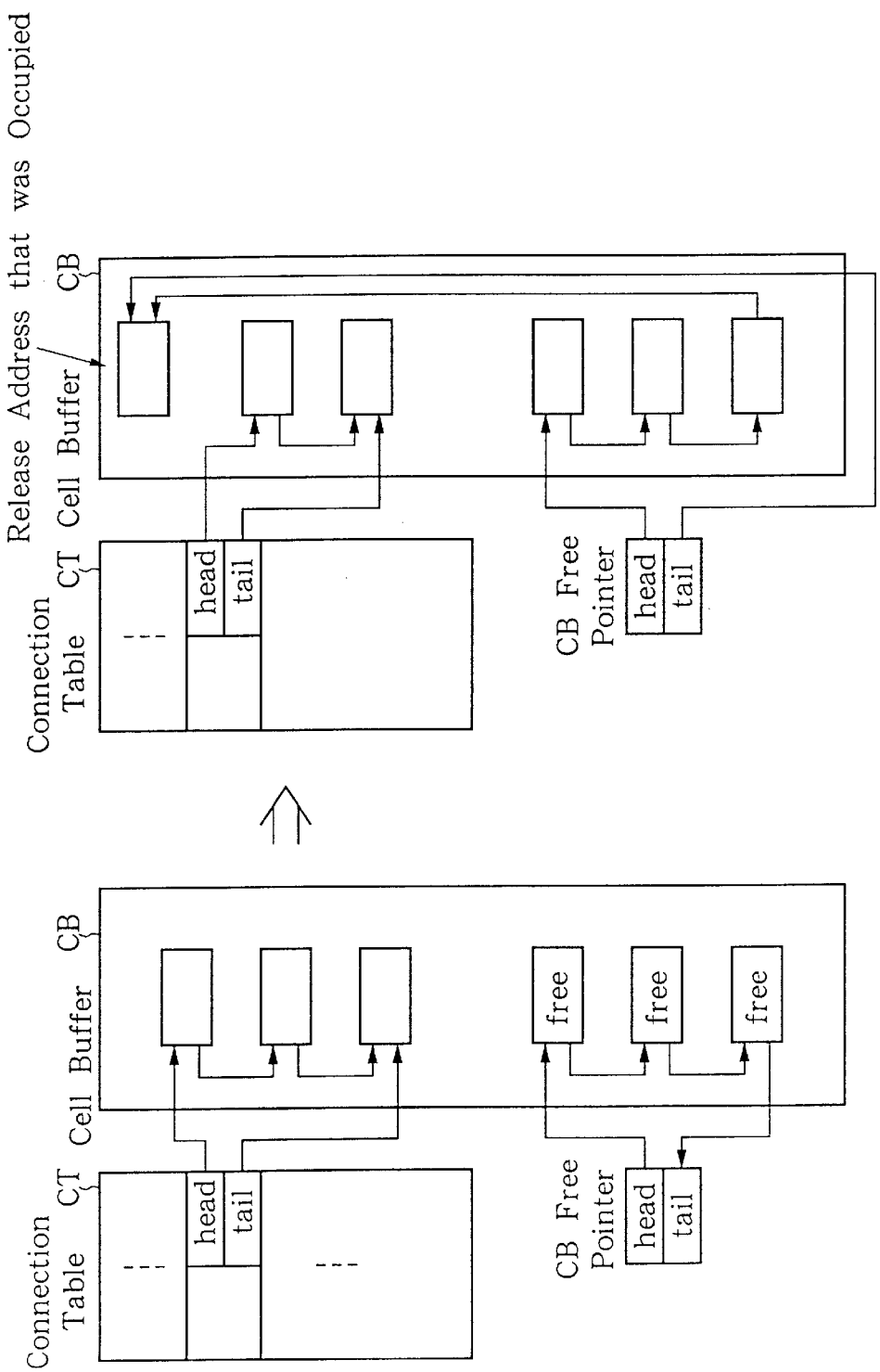
FIG. 28 shows how cells are fetched from the cell buffer.

FIG. 28 shows how a cell of a given connection is fetched from cell buffer CB. In FIG. 28, the cell at the head of the cell chain of the connection in question in cell buffer CB is fetched and its head pointer changed.

Cell buffer CB is thus a shared buffer for cells from all connections and logically constitutes a FIFO queue for each connection. In FIG. 24, the CB free pointer holds the addresses of the head (arrow (3)) and the tail (arrow (4)) of a free region in cell buffer CB. Cell buffer CB and the CB free pointer are used in combination. One entry in cell buffer CB comprises a memory region Cell which holds the contents of a cell, and a pointer field Ptr for indicating the reading order of that cell within its connection. In cell buffer CB, lists of cells for each connection are formed logically in terms of the reading order relation shown by the pointers. In other words, for a particular connection, the cells of that connection can be accessed in their reading order by addressing cell buffer CB at the address shown by the head pointer of that connection in connection table CT (see arrow (1)), and then successively running through the list always using the address shown by the pointer at the previous address in cell buffer CB (see arrows (5) and (6)). Connection table CT holds, as linking information in the tail pointer, the address of the tail of the list in cell buffer CB for that connection (arrow (2)). Just as for each connection, free regions are formed logically into a list. The addresses of the head and tail of free regions in cell buffer CB are held respectively in the head pointer (arrow (3)) and the tail pointer (arrow (4)) of the CB free pointer. In other words, the head pointer shows the address to be used next as a free region (arrow (3)) and the address to be used as the next free region after that is given in the pointer of that address in cell buffer CB. The CB free pointer holds in its tail pointer, as linking information, the address of the tail of the list of free regions which are held in cell buffer CB (arrow (4)).

(Ninth embodiment)

Figure 29:
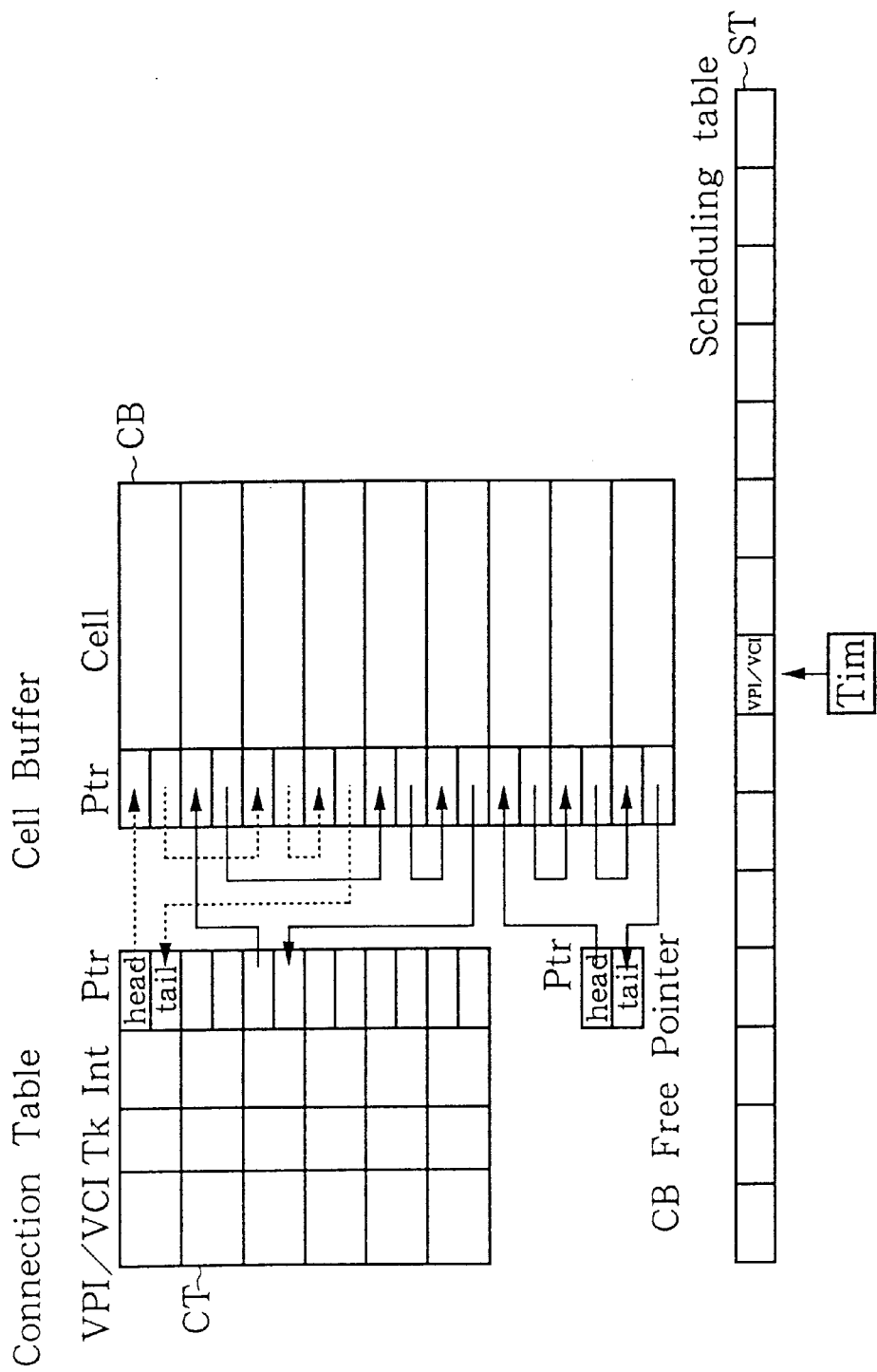
FIG. 29 shows the essential parts of a ninth embodiment of this invention.

A ninth embodiment of this invention will be explained with reference to FIG. 29, which shows the essential parts of the ninth embodiment. This ninth embodiment of the invention comprises, in addition to the constitution of the eighth embodiment, scheduling table ST which holds the mapping between times and connections, and timer Tim, which is a timer that shows the current time. A cell of the connection noted in scheduling table ST is read at the time shown by timer Tim. At the same time as this cell is read, the time at which the next cell of that connection is to be read is scheduled. Namely, the connection in question is written as an entry in scheduling table ST corresponding to a time later than the current time shown by timer Tim by the cell interval of that connection (this cell interval being noted in the cell transmission interval Int field of connection table CT).

(Tenth embodiment)

Figure 30:
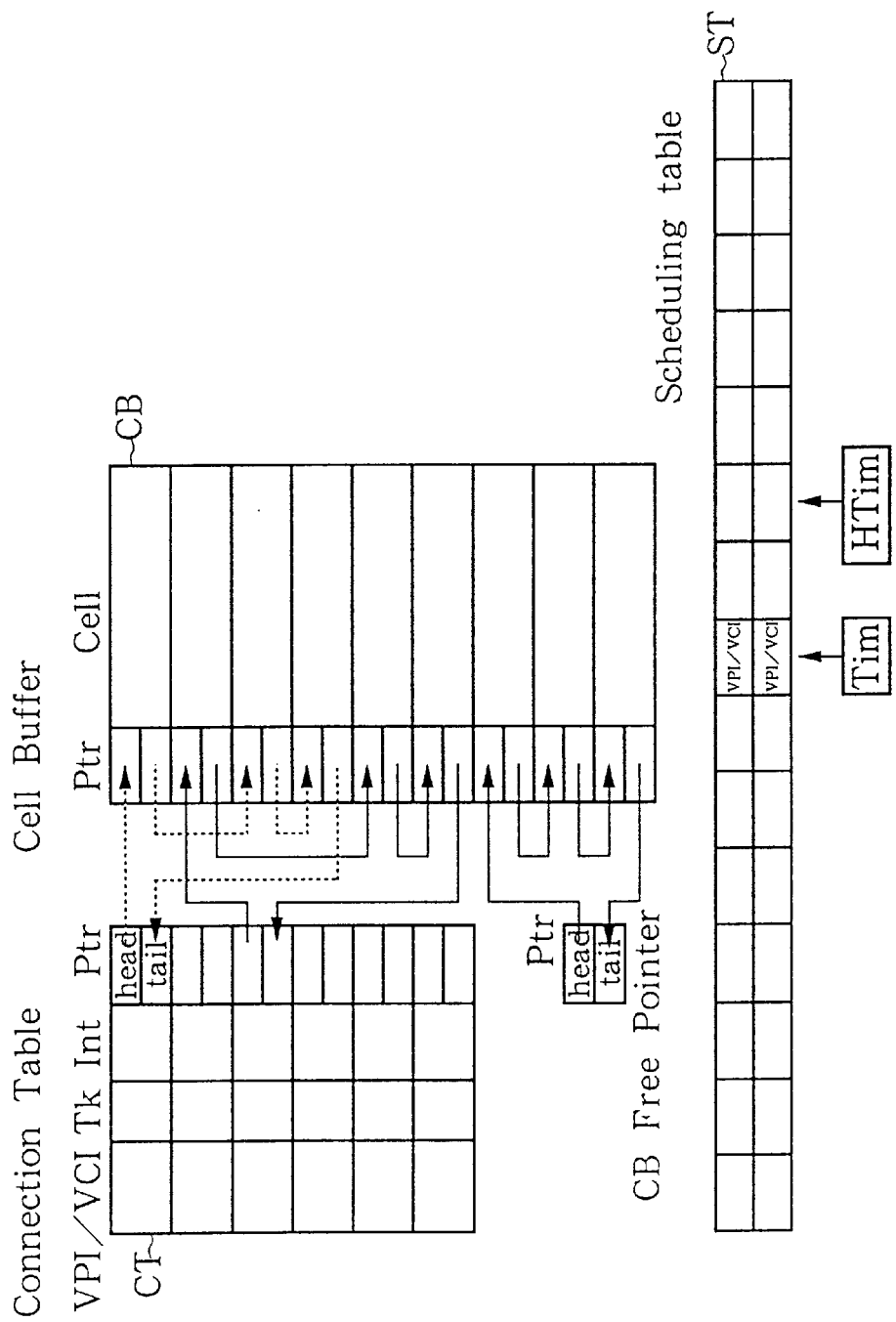
FIG. 30 shows the essential parts of a tenth embodiment of this invention.

A tenth embodiment of this invention will be explained with reference to FIG. 30, which shows the essential parts of said tenth embodiment. In this tenth embodiment of the invention the scheduling table ST according to the ninth embodiment has a plurality of fields so that a plurality of connections can be assigned to the scheduling table simultaneously. This tenth embodiment also has, in addition to timer Tim which shows the current time, a virtual timer HTim which shows a virtual time.

In the ninth embodiment of this invention only one of the connections scheduled for the same time can actually be scheduled, whereas in this tenth embodiment a plurality of connections can be scheduled for the same time.

The value given by virtual timer HTim is used to indicate a prescribed address in scheduling table ST. Whereas timer Tim always shows the current time accurately, virtual timer HTim keeps showing the same time while scheduling table ST is reading from cell buffer CB the plurality of cells that have been scheduled to be read at the same time.

(Eleventh embodiment)

Figure 31:
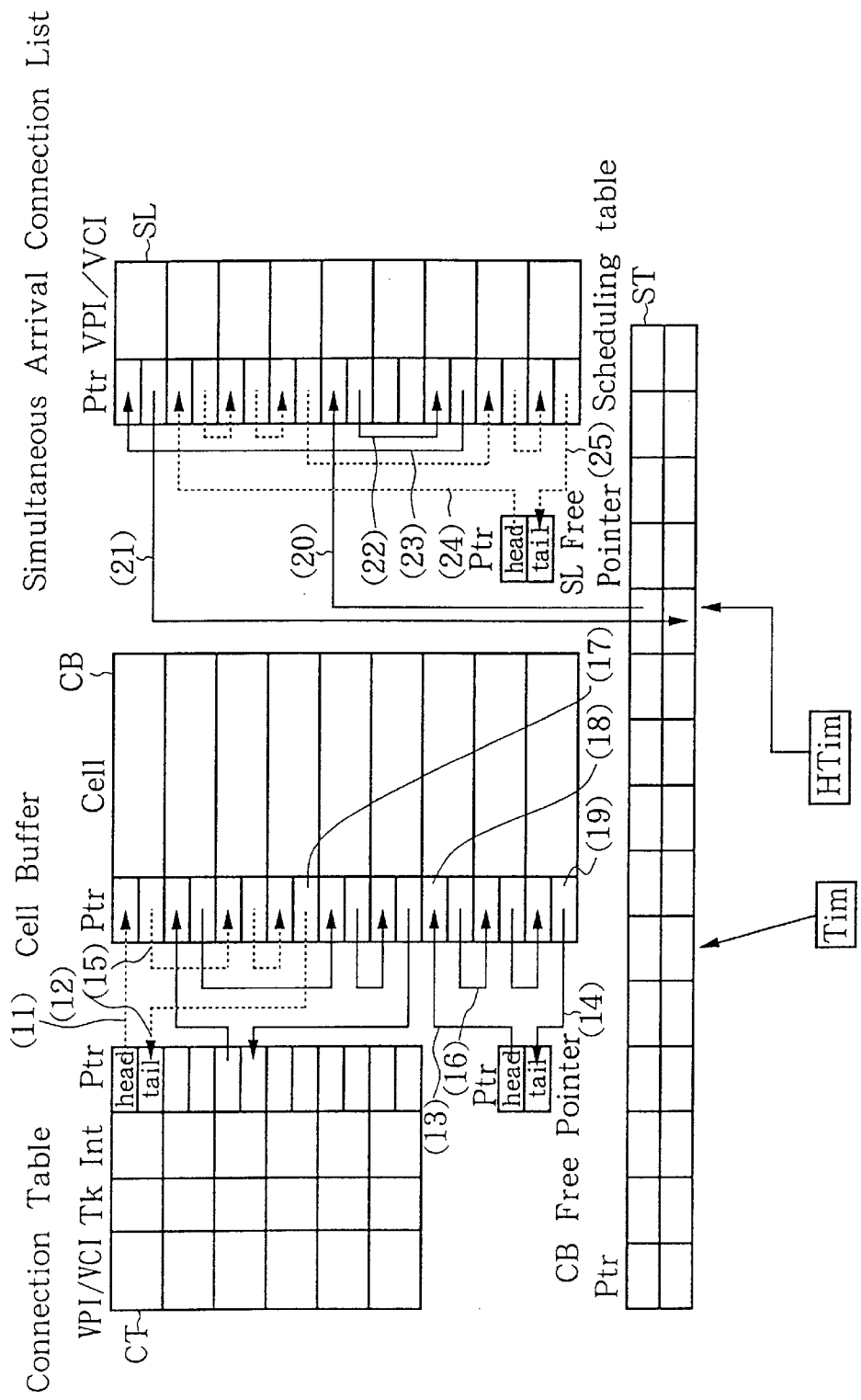
FIG. 31 shows the essential parts of an eleventh embodiment of this invention.

An eleventh embodiment of this invention will be explained with reference to FIG. 31, which shows the essential parts of said eleventh embodiment. The eleventh embodiment of the invention comprises: connection table CT, cell buffer CB, a CB free pointer which holds the head address and the tail address of the list of free addresses in cell buffer CB, scheduling table ST, timer Tim which shows the current time, virtual timer HTim which shows the virtual time, simultaneous arrival connection list SL, and an SL free pointer which holds the head address and the tail address of the list of free addresses in simultaneous arrival connection list SL.

Scheduling table ST is a table which schedules the reading of cells. It achieves its management function by pairing times with head and tail pointers which point to the simultaneous arrival connection list SL. This simultaneous arrival connection list SL is a list which holds the identifiers of connections that are scheduled to be read from cell buffer CB at the same time. The head pointer and the tail pointer of scheduling table ST show the linking relation to simultaneous arrival connection list SL (see arrows (20) and (21) in FIG. 31) and respectively hold the identifier of a head cell and a tail cell to be read from cell buffer CB at that time.

This eleventh embodiment has, in addition to timer Tim which shows the current time, a virtual timer HTim which shows a virtual time. The value given by virtual timer HTim is used to indicate a prescribed address in scheduling table ST.

Whereas timer Tim always shows the current time accurately, virtual timer HTim keeps showing the same time while simultaneous arrival connection list SL is reading from cell buffer CB the plurality of cells that have been scheduled to be read at the same time.

Simultaneous arrival connection list SL forms a chain of the connections that are scheduled to be read from cell buffer CB at the same time, and this enables the number of connections scheduled for the same time to be increased flexibly. The chain is formed by the same method used to form the FIFO queue of each connection in shared cell buffer CB. Namely, an SL free pointer holds the head and tail addresses of a free region of simultaneous arrival connection list SL. Simultaneous arrival connection list SL and the SL free pointer are used in combination. Simultaneous arrival connection list SL is a list which holds connection identifiers of cells, and each entry in this list comprises a connection identifier and a pointer for indicating the order in which that connection identifier is to be read (see arrows (22) and (23) in FIG. 31). In simultaneous arrival connection list SL, lists of connection identifiers of cells that have been scheduled to be read at the same time are formed logically in terms of the reading order relation indicated by the pointers. In other words, to take a particular time as an example, the connection identifiers of cells scheduled to be read at that time can be accessed in their reading order by addressing simultaneous arrival connection list SL at the address shown by the head pointer of virtual timer HTim (see arrow (20) in FIG. 31), and then successively running through the list always using the address given by the pointer at the previous address in simultaneous arrival connection list SL (see arrows (22) and (23) in FIG. 31). Virtual timer HTim holds in its tail pointer, as linking information, the address of the tail of the list in simultaneous arrival connection list SL for that time (see arrow (21) in FIG. 31). Just as for the various times, free regions are formed logically into a list. The addresses of the head and tail of free regions in simultaneous arrival connection list SL are held respectively in the head pointer (see (24) in FIG. 31) and the tail pointer (see (25) in FIG. 31) of the SL free pointer. In other words, the head pointer gives the address to be used next as a free region, and the address to be used as the next free region after this is given in the pointer with that address in simultaneous arrival connection list SL. The SL free pointer holds in its tail pointer (see (25) in FIG. 31), as linking information, the address of the tail of the list of free regions held in simultaneous arrival connection list SL.

Figure 32:
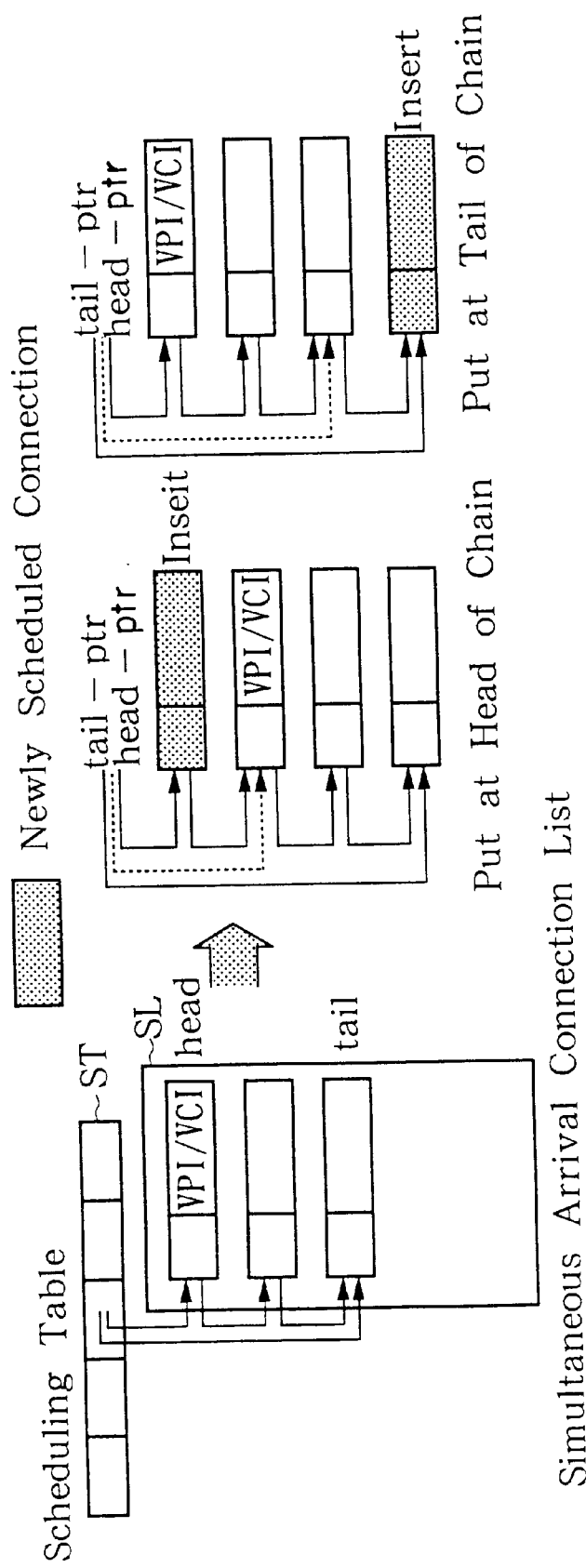
FIG. 32 shows how connection identifiers are written to the simultaneous arrival connection list.
Figure 33:
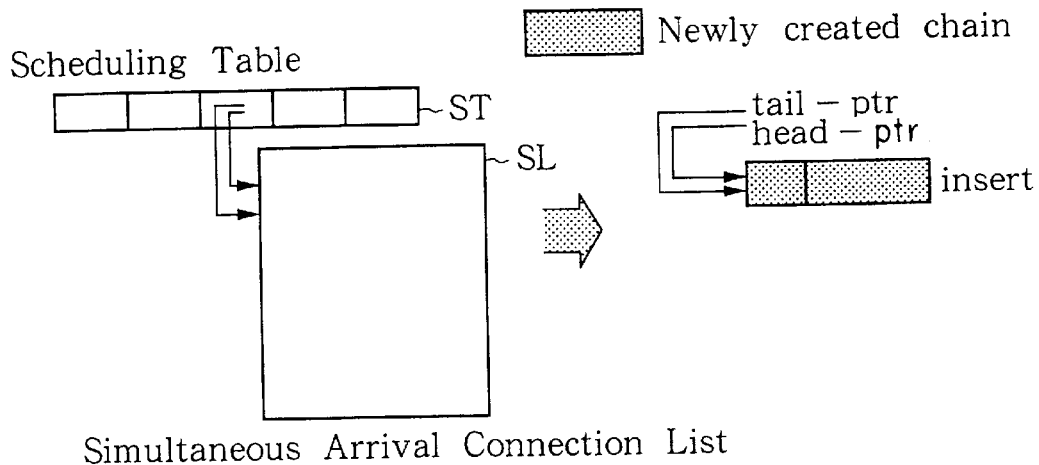
FIG. 33 shows how connection identifiers are written to the simultaneous arrival connection list.

FIG. 32 and FIG. 33 show how the connection identifiers of cells scheduled for a certain time are written in the simultaneous arrival connection list SL. FIG. 32 shows both the case where a newly scheduled connection is put at the head of a chain, and the case where it is put at the tail of the chain. As shown in FIG. 33, when there is no chain in the simultaneous arrival connection list SL, a new chain is created.

Figure 34:
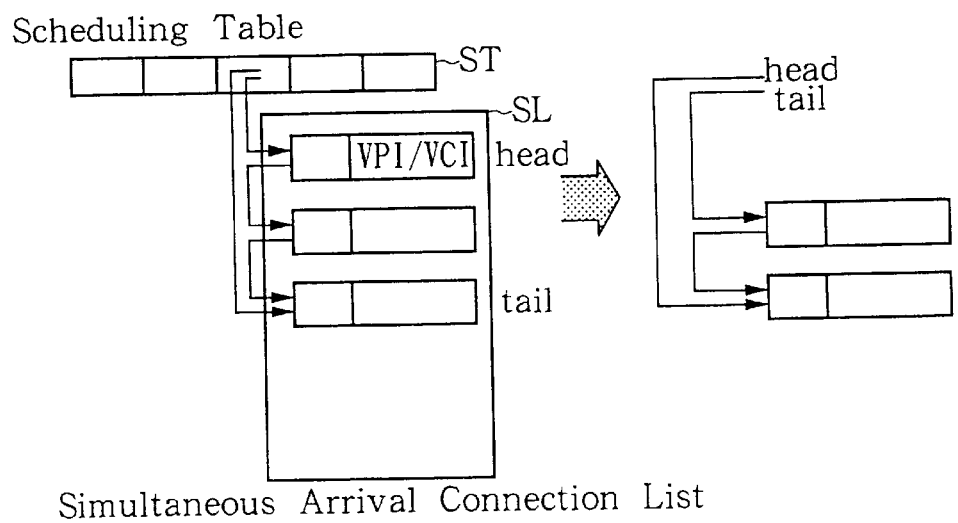
FIG. 34 shows how connection identifiers are fetched from the simultaneous arrival connection list.

FIG. 34 shows how a connection identifier scheduled for a certain time is fetched from the simultaneous arrival connection list SL. In FIG. 34, the connection identifier is shown being fetched from the head of the chain.

In the foregoing explanation, the position at which a connection identifier is inserted was the tail pointer of the list of connection identifiers scheduled for the same time, and the position at which a connection identifier is read was the head pointer of the list of connection identifiers scheduled for the same time. In other words, connection identifiers scheduled for the same time are read in FIFO order. Moreover, connection identifiers scheduled for the same time are inserted further back in the list the shorter their cell interval, and therefore the shorter the cell interval. In otherwords the faster the cell rate, the later the scheduling. If the position at which a connection identifier is inserted is the head pointer of the list of connection identifiers scheduled for the same time, then connection identifiers scheduled for the same time will be read in LIFO order. The result of this is that the faster the cell rate of the connection, the sooner the connection identifier will be read. Furthermore, by deciding for each connection whether the position at which the connection identifier is inserted is the tail pointer or the head pointer of the list of connection identifiers scheduled for the same time, the connections can be divided into two classes. In other words, it will be possible to create two classes of connections scheduled for the same time: those that are scheduled sooner, and those that are scheduled later.

Figure 35:
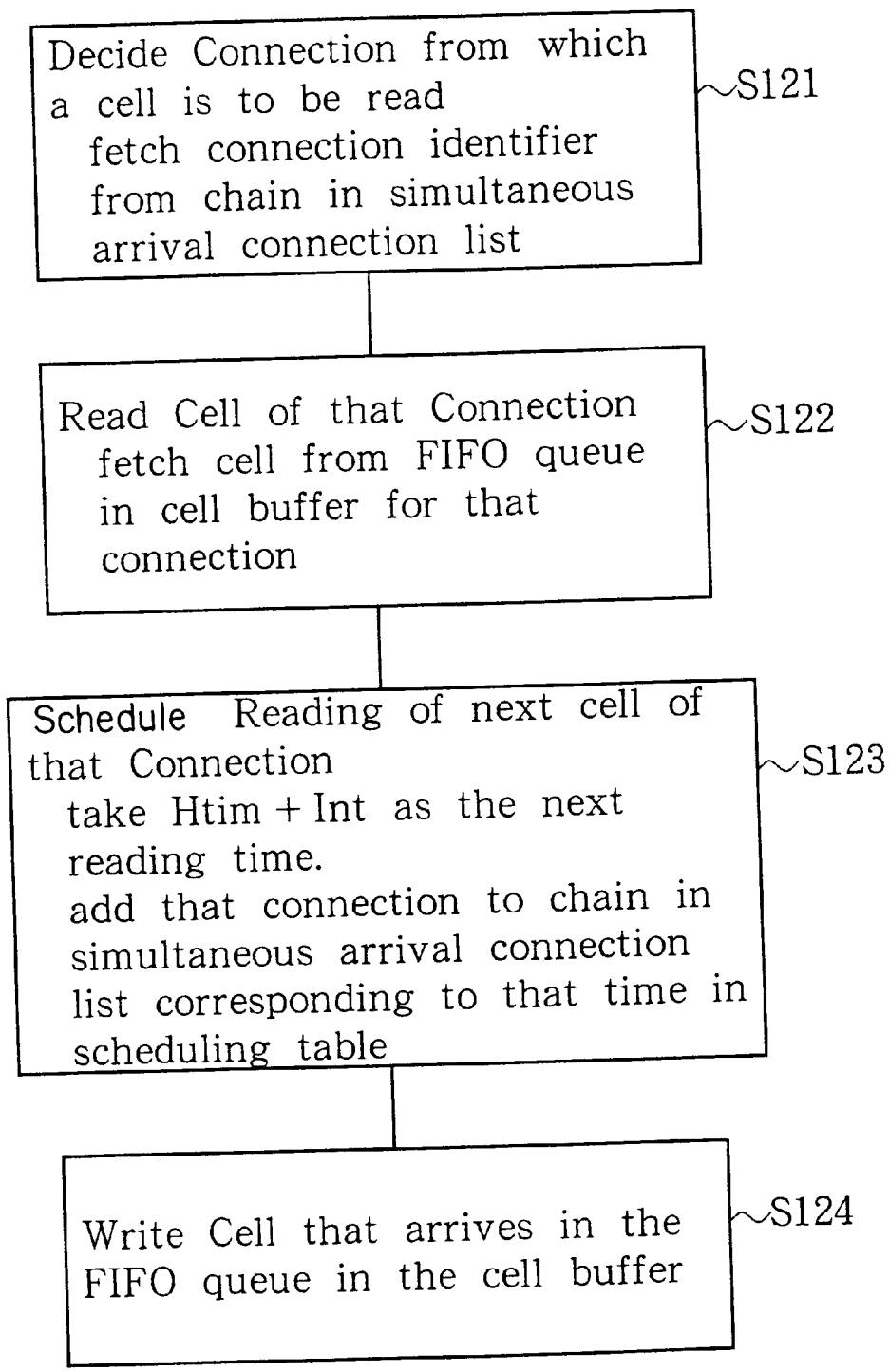
FIG. 35 is a flowchart showing the operation of the eleventh embodiment of this invention.

In the foregoing, the function of each block was described separately. An explanation will now be given of how the blocks interact to achieve the desired object. The relevant flow is shown in FIG. 35, which is a flowchart showing the operation of this eleventh embodiment of the invention. Processing is carried out in the following order: deciding the connection from which a cell is to be read (S121), reading a cell from that connection (S122), scheduling the reading of the next cell of that connection (S123), and writing a cell that has arrived to the FIFO queue in cell buffer CB (S124).

The processing required when a cell arrives is (a) the writing of that cell to cell buffer CB, and (b) the decision as regards whether or not that cell is scheduled for transfer. The processing involved in writing the cell to cell buffer CB differs according to whether or not there is already a list in cell buffer CB for the connection to which that cell belongs. If there is no such list, a list for that connection is first of all newly created in cell buffer CB. The cell is then written to a free region of cell buffer CB. This procedure has already been described in detail with reference to FIG. 25. Next, the logical relations in the list for that connection are newly created in cell buffer CB. This procedure has already been described in detail with reference to FIG. 26 and FIG. 27.

If there is already a list for that connection in cell buffer CB, the list is changed by carrying out the following processing. First of all, the cell is written to a free region of cell buffer CB. This procedure has already been described in detail with reference to FIG. 25. Next, the logical relations in the list for that connection are changed. This procedure has already been described in detail with reference to FIG. 26 and FIG. 27.

Whether or not a cell is scheduled for transfer is determined by whether or not the connection to which that cell belongs has a token Tk. When a cell arrives, connection table CT is looked up on the basis of the connection identifier carried in the cell header.

If no token Tk has been set, transfer scheduling of that cell is not carried out at that point in time. Instead, it is scheduled when the tail cell of that connection at that time is transferred. This will be explained detail in the subsequent section on the processing involved in reading cells.

If token Tk has been set, the scheduling table is looked up, with addressing being carried out by timer Tim which shows the current time. Subsequent processing varies according to whether or not there is a connection which has already been scheduled for that time.

If there is no previously scheduled connection, processing is performed as follows. Namely, lists of cells to be transferred at the current time shown by timer Tim are newly created in simultaneous arrival connection list SL. Firstly, the connection identifier in question is written in a free region of simultaneous arrival connection list SL. Next, the logical relations of the lists of cells to be transferred at the current time shown by timer Tim are newly created in simultaneous arrival connection list SL. These procedures have already been described in detail with reference to FIG. 32 and FIG. 33.

If there is previously scheduled connection, processing is performed as follows. Namely, the lists of cells to be transferred at the current time shown by timer Tim are changed in simultaneous arrival connection list SL. Firstly, the connection identifier in question is written in a free region of simultaneous arrival connection list SL. Next, the logical relations of the lists of cells to be transferred at the current time shown by timer Tim are changed in simultaneous arrival connection list SL. These procedures have already been described in detail with reference to FIG. 32 and FIG. 33.

As has been explained in the foregoing, if a token Tk has been set, the cell in question is scheduled for the current time shown by timer Tim. However, it will sometimes be desired to transfer the cell in question when the virtual time shown by virtual timer HTim has lagged behind during the processing of scheduling table ST. In this case, scheduling table ST is addressed at the time shown by virtual timer HTim, and the connection identifier of the cell in question is added to the head of the list indicated by the head pointer with this address.

The processing required when a cell is read is (a) determining the connection from which a cell is to be read, (b) reading the cell, and (c) scheduling the next cell. Determining the connection differs according to whether or not there is a cell to be transferred at the virtual time shown by virtual timer HTim. If there is no cell to transfer, virtual timer HTim is advanced one unit of time, and each time it does so a check is made to see whether or not there is a cell to be transferred at that time. Virtual timer HTim is advanced faster than the usual rate until a cell for transfer is found. If no cell has been found after the time has been advanced by a prescribed amount, the reading of cells is abandoned. To perform this processing more efficiently, the concept of a list may be introduced for scheduling table ST as well. This will be explained in a section dealing with the processing that is performed within one unit of time. When a cell to be transferred has been found within the prescribed time, the subsequent processing is the same as when there is a cell to be transferred.

If there is a cell to be transferred, the connection to be read at this time is determined. That is to say, the connection identifier scheduled for this time is fetched from simultaneous arrival connection list SL. This procedure has already been described in detail with reference to FIG. 34.

Next, a cell of that connection is read from cell buffer CB. The processing involved in reading a cell from cell buffer CB differs according to whether or not there is a cell of that connection in cell buffer CB. Connection table CT is accessed on the basis of the previously determined connection identifier.

If there is no cell of that connection in cell buffer CB, a token Tk is simply set in connection table CT, and no cell is read from cell buffer CB.

If there is a cell of that connection in cell buffer CB, the cell is fetched. This processing has already been described in detail in the section dealing with cell buffer CB.

The processing involved in scheduling the next cell differs according to whether or not a token Tk has been set for the connection in question. Connection table CT is accessed on the basis of the previously determined connection identifier.

If a token Tk has been set in connection table CT, the scheduling of that connection is carried out when a cell of that connection next arrives. This has been described in detail in the section dealing with the cell arrival processing.

If a token Tk has not been set in connection table CT, the minimum cell interval Int of that connection, said cell interval being given in connection table CT, is added to the current time being counted by timer Tim, the result taken as the transfer time of the next cell, and the connection in question scheduled on this basis. In other words, scheduling table ST is addressed at Int+Tim, and the connection identifier in question is appended to the list of connection identifiers in simultaneous arrival connection list SL that have been scheduled for time Int+Tim, this list being indicated by the head pointer of scheduling table ST. The processing involved in appending a connection identifier has previously been described in detail in the section where the simultaneous arrival connection list SL was explained, and therefore no further details will be given here. It should be noted that because the cell transfer scheduling uses timer Tim which shows the current time, rather than virtual timer HTim, the cell transmission interval Int of the connection in question strictly speaking does not become smaller than the prescribed cell transmission interval Int. If fluctuation of cells scheduled for the same time is allowed, the connection in question can be transferred sooner if it is scheduled for time Int+HTim. The processing involved in making an entry in scheduling table ST is approximately the same as when no token Tk has been set (see the section on cell arrival processing).

(Twelfth embodiment)

A twelfth embodiment of this invention will be explained with reference to FIG. 36, which shows the essential parts of the embodiment. One unit of time is the time required to transfer a cell onto an output line. Cell arrival processing and cell reading processing are carried out in that order in one unit of time. This twelfth embodiment of the invention is designed to make virtual timer HTim, which shows the address in scheduling table ST that is to be processed, catch up efficiently with timer Tim which shows the current time. As mentioned previously, whereas timer Tim always shows the current time accurately, virtual timer HTim keeps showing the same time while simultaneous arrival connection list SL is reading from cell buffer CB the plurality of cells that have been scheduled to be read at the same time. When a large number of connections are scheduled for the same time, there will be a large time difference between virtual timer HTim and timer Tim, and it will take time to catch up with timer Tim after the processing involved in reading cells scheduled for the time shown by virtual timer HTim has been completed.

Accordingly, in this twelfth embodiment of the invention, in order to catch up efficiently with timer Tim, a pointer field is introduced in each time entry in scheduling table ST and a list of the times at which cells should be output is constructed.

Figure 36:
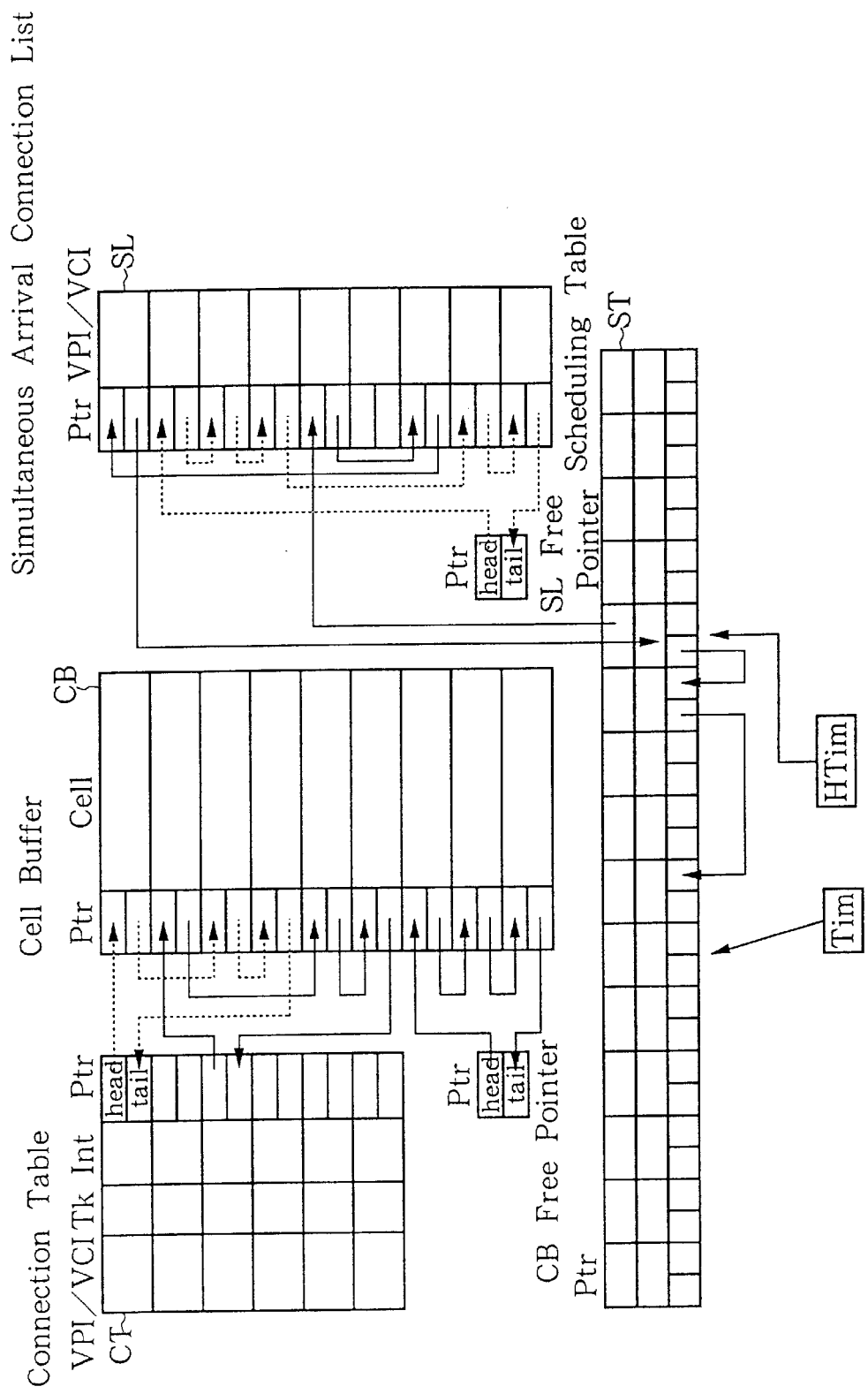
FIG. 36 shows the essential parts of a twelfth embodiment of this invention.

In FIG. 36, a list of times at which cells should be output is formed in scheduling table ST. The head of the list is the address shown by virtual timer HTim, while the tail of the list is the address shown by tracking timer TTim. This list of times at which cells should be output is formed logically by the relations indicated by the pointers. In other words, the times at which cells are to be read out can be successively accessed by addressing scheduling table ST at the address shown by virtual timer HTim, and then successively running through the list always using the address shown by the pointer at the previous address.

Initially, virtual timer HTim, tracking timer TTim and timer Tim all show the same time, but if at a certain time there are a plurality of cells scheduled for the same time, then virtual timer HTim will lag behind and timer Tim will be relatively ahead. If virtual timer HTim and timer Tim are not synchronized but no new cells arrive and timer Tim does not show a time at which a cell has been scheduled, then while this is the case, tracking timer TTim will show the same time as virtual timer HTim.

When a cell newly arrives, the address shown by timer Tim is written in the pointer of the address in scheduling table ST shown by tracking timer TTim, so that this address is shown by tracking timer TTim as well. The same processing is also performed when timer Tim has indicated a time at which a cell is scheduled, with the current time being added to the list of times at which cells are to be read.

(Thirteenth embodiment)

Figure 37:
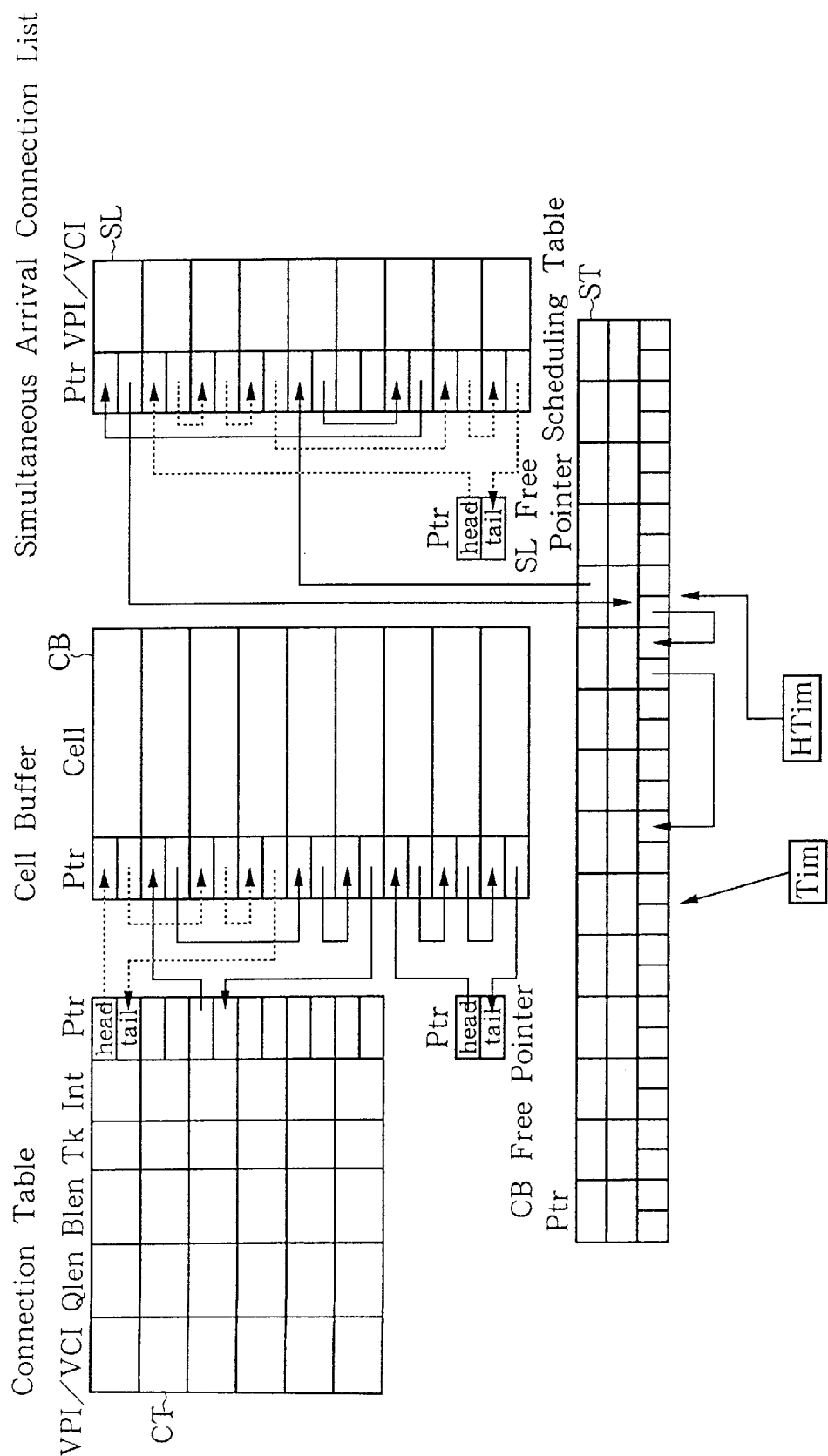
FIG. 37 shows the essential parts of a thirteenth embodiment of this invention.

Next, a thirteenth embodiment of this invention will be explained with reference to FIG. 37, which shows the essential parts of said thirteenth embodiment. This thirteenth embodiment restricts the number of cells in cell buffer CB for each connection, thereby reducing the adverse effects that inter-connection competition for buffer space can have on quality. In this invention, because cell buffer CB is a shared buffer, if an excessive number of cells arrive from a specific connection they end up taldng possession of cell buffer CB, with the result that there is a danger that they will have an adverse effect on the quality of other connections. This thirteenth embodiment of the invention restricts the number of cells that can enter cell buffer CB from any one connection, so that a specific connection cannot take over possession of cell buffer CB in this way.

Before a cell is written to cell buffer CB, a comparison is made between the Q1en field and the B1en field in connection table CT. If the Q1en field is smaller, the cell is written to cell buffer CB and at the same time Q1en is incremented by 1. If the Q1en field is not smaller, writing of the cell to cell buffer CB is prohibited. In addition, when a cell is read from cell buffer CB, the value of the Q1en field is decremented by 1. The Q1en field shows the number of cells in cell buffer CB from a given connection, while the B1en field shows the number of cells which that connection is allowed to have in cell buffer CB.

(Fourteenth embodiment)

Figure 38:
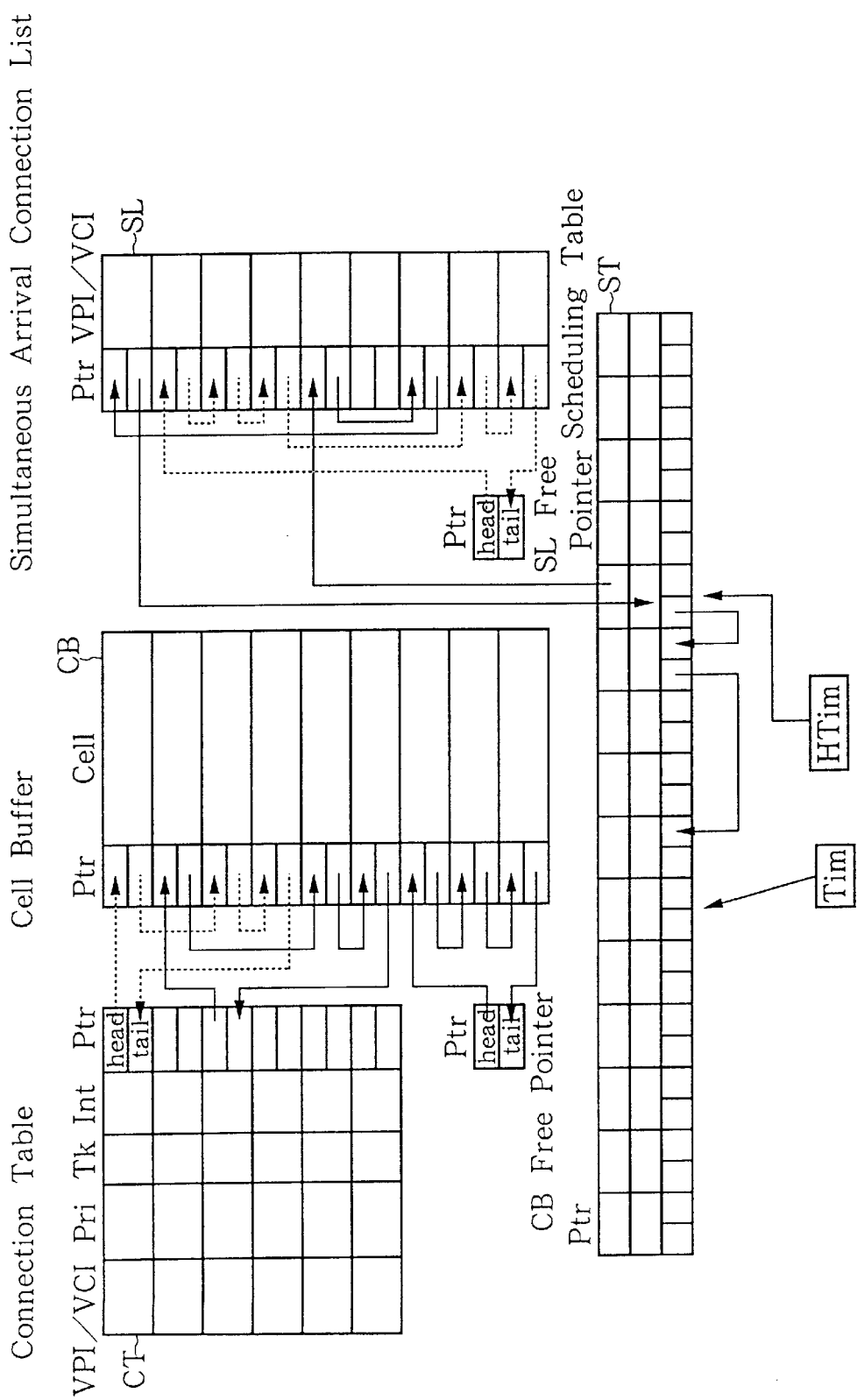
FIG. 38 shows the essential parts of a fourteenth embodiment of this invention.

A fourteenth embodiment of this invention will be explained with reference to FIG. 38, which shows the essential parts of said embodiment. This fourteenth embodiment introduces the concept of priority into the connection scheduling. As described previously, connection identifiers scheduled for the same time are read in FIFO order. Moreover, if connection identifiers scheduled for the same time are inserted further back in the list, the shorter their cell transmission interval Int, and therefore the shorter the cell transmission interval Int. In other words, the faster the cell rate, the later the scheduling. If the position at which a connection identifier is inserted is the head pointer of the list of connection identifiers scheduled for the same time, then connection identifiers scheduled for the same time will be read in LIFO order. The result of this is that the faster the cell rate of the connection, the sooner the connection identifier will be read. Furthermore, by deciding for each connection whether the position at which the connection identifier is inserted is the tail pointer or the head pointer of the list of connection identifiers scheduled for the same time, the connections can be divided into two classes. In other words, it will be possible to create two classes of connections scheduled for the same time: those that are scheduled sooner, and those that are scheduled later.

A field Pri for expressing the priority ranking of each connection is provided in connection table CT. When an element is to be added to the list of connection identifiers scheduled for the same time in simultaneous arrival connection list SL, if connection table CT shows a high priority in field Pri corresponding to the connection identifier of this element, the new element is added at the position indicated by the head pointer of scheduling table ST, whereas if field Pri shows a low priority, the new element is added at the position indicated by the tail pointer of scheduling table ST.

In all the embodiments explained so far, connection identifiers were entered in simultaneous arrival connection list SL. However, as an alternative, it would also be feasible to enter connection table addresses.

(Fifteenth embodiment)

Figure 39:
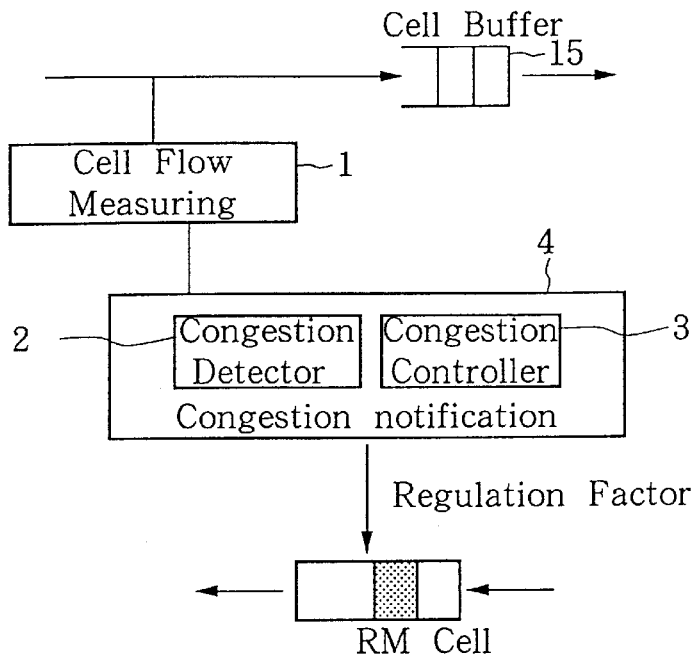
FIG. 39 is a block diagram of a dynamic rate control system according to a fifteenth embodiment of this invention.

A fifteenth embodiment of this invention will be explained with reference to FIG. 39 and FIG. 40. FIG. 39 is a block diagram of a dynamic rate control system according to this fifteenth embodiment, while FIG. 40 is a flowchart showing the operation of this dynamic rate control system.

A dynamic rate control system according to this fifteenth embodiment of the invention comprises: cell flow measuring part 1 as means for measuring cell flow; congestion detector 2 as means for comparing this measured cell flow with a threshold; and congestion notification part 4 as means which, in accordance with the result of this comparison, sends regulation information that includes a cell flow regulation factor to the cell generator.

The dynamic rate control system according to this fifteenth embodiment of the invention includes congestion controller 3 as means which, when regulation is being applied to one cell generator, maintains this regulation until the measured cell flow from that cell generator reaches a preset value below the aforesaid threshold.

Figure 40:
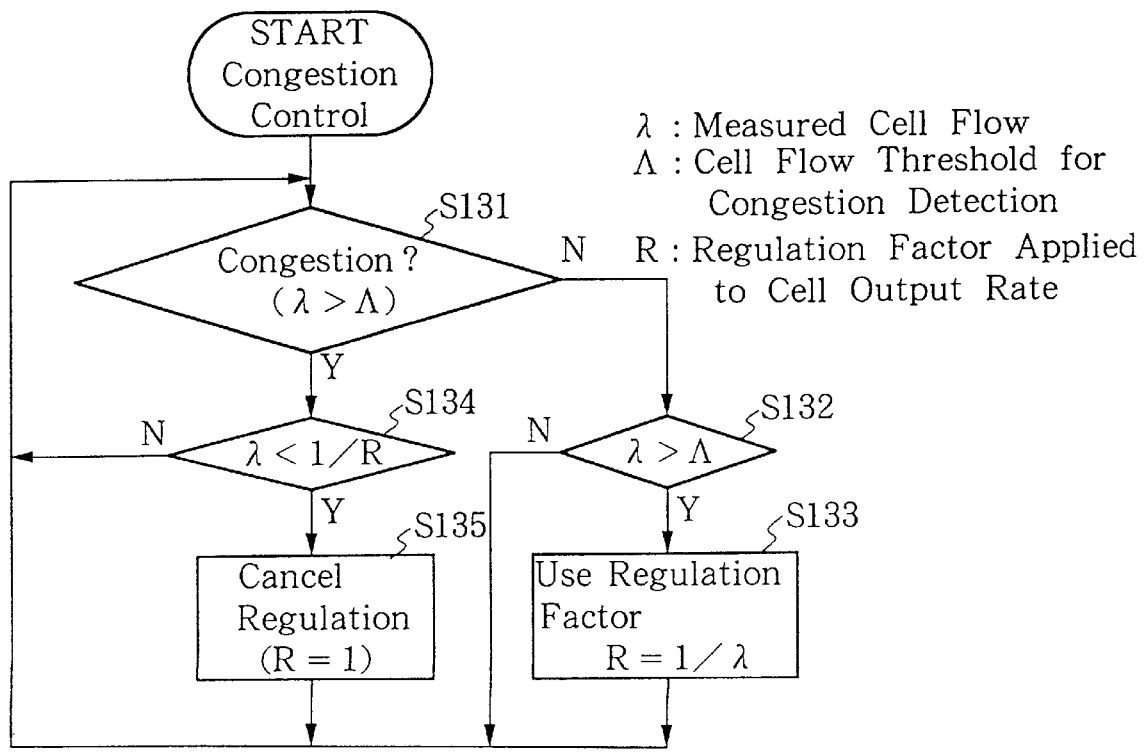
FIG. 40 is a flowchart showing the operation of the dynamic rate control system according to the fifteenth embodiment of this invention.

As shown in FIG. 40, the aforesaid regulation factor R is set to $R=1/\lambda$ (S133) where $\lambda$ is the normalized cell flow and the normalized threshold $\Lambda$ is 1. The regulation factor R is set to R=1 (S135) when $\lambda<1/R$ (S134).

In other words, a dynamic rate control system according to this fifteenth embodiment of the invention comprises cell buffer 15, cell flow measuring part 1, and congestion notification part 4 which consists of congestion detector 2 and congestion controller 3. This dynamic rate control system operates as follows. Namely, congestion is detected by congestion detector 2 in accordance with the cell flow obtained by cell flow measuring part 1; the start and cancellation of regulation is determined by congestion controller 3; and congestion notification part 4 informs cell-generating terminals of the regulation factor R using RM cells that flow in the opposite direction to the direction in which congestion is experienced.

FIG. 40 is a flowchart of the operation of congestion detector 2 and congestion controller 3. If there is no current congestion (S131), the measured cell flow $\lambda$ obtained by cell flow measuring part 1 is compared with a cell flow threshold $\Lambda$ used to detect congestion (S132). For this comparison, all quantities relating to cell flow are normalized by taking the transmission link capacity as 1. If cell flow $\lambda$ has exceeded threshold $\Lambda$, it is judged that there is congestion, whereupon the regulation factor R applied to the cell output rate from a cell generator is set to $1/\lambda$ (S133). In other words, by regulating by $1/\lambda$ or less of the current cell rate of a cell generator, the cell flow from the cell generator is restricted to "1" or less, and the congestion is cleared.

If there is currently congestion (S131), the cell flow $\lambda$ is compared with the reciprocal 1/R of the current regulation factor R (S134), and if cell flow $\lambda$ is the smaller, it is decided that the congestion has cleared and the regulation is cancelled (S135). As a result of cancelling the regulation, the cell flow $\lambda$ will increase R times. However, because the cell flow from the cell generator prior to cancellation of the regulation was 1/R or less, the cell flow from the cell generator will not exceed 1.

Figure 41:
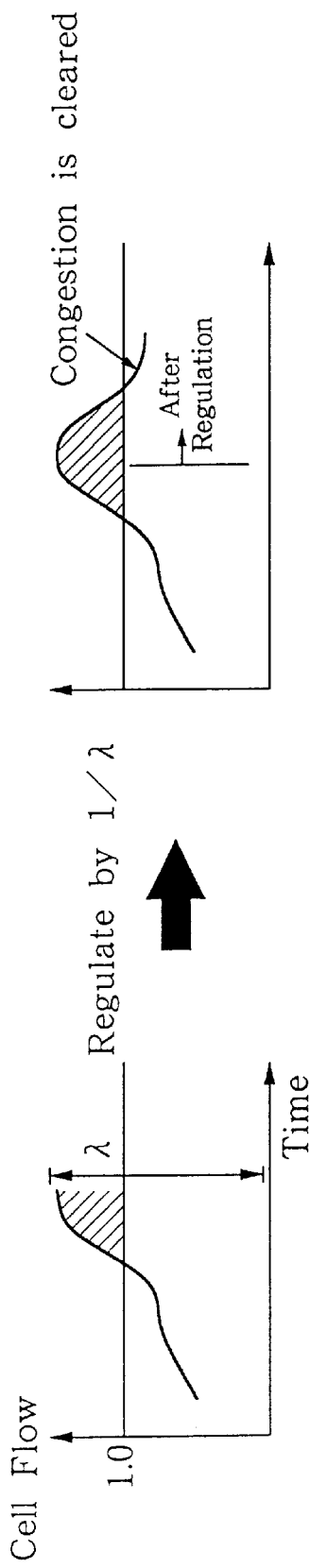
FIG. 41 shows the operation of the fifteenth embodiment of this invention in terms of the relation between cell flow λ and time.
Figure 42:
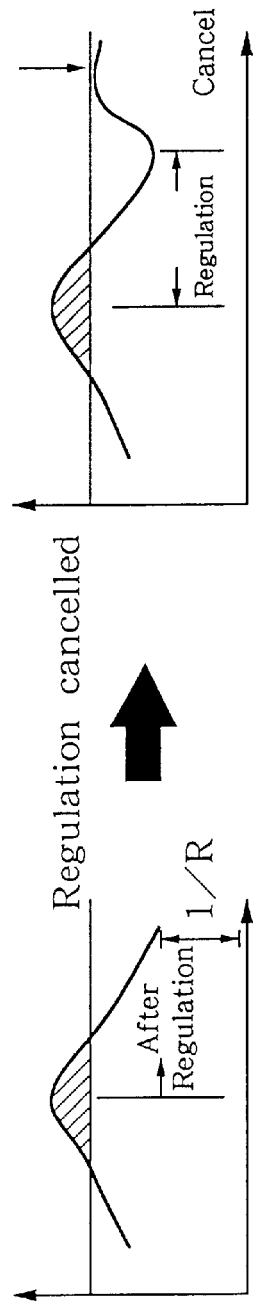
FIG. 42 shows the operation of the fifteenth embodiment of this invention in terms of the relation between cell flow λ and time.

FIG. 41 and FIG. 42 show the operation of this fifteenth embodiment of the invention in terms of the relation between cell flow $\lambda$ and time, with time taken along the horizontal axis and cell flow $\lambda$ along the vertical axis. In the left-hand diagram of FIG. 41 the total of the cell rates from the cell generators has reached $\lambda$ (where $\lambda>\Lambda$), with the result that a congested state has arisen. When this happens, the regulation factor R is set to $1/\lambda$ and notification of this is sent to the cell-generating terminals. If the cell rate from the cell generators effectively becomes $1/\lambda$ after the elapse of a prescribed time, then as shown in the right-hand diagram of FIG. 41, the congestion has cleared. If congestion is suppressed, retransmission from cell generators ceases and there is no shift to catastrophic congestion. However, because the cell rate of the cell generators is currently being regulated by $1/\lambda$, immediate cancellation of the regulation means that R times the traffic is applied, with the result that congestion will occur again. Accordingly, as shown in the left-hand diagram of FIG. 42, the regulation is not cancelled until the cell rate from the cell generators has dropped to 1/R or less. By doing it this way, congestion will not occur again even if after the cancellation of regulation the traffic increases by a factor of R (see the right-hand diagram of FIG. 42).

(Sixteenth embodiment)

Figure 43:
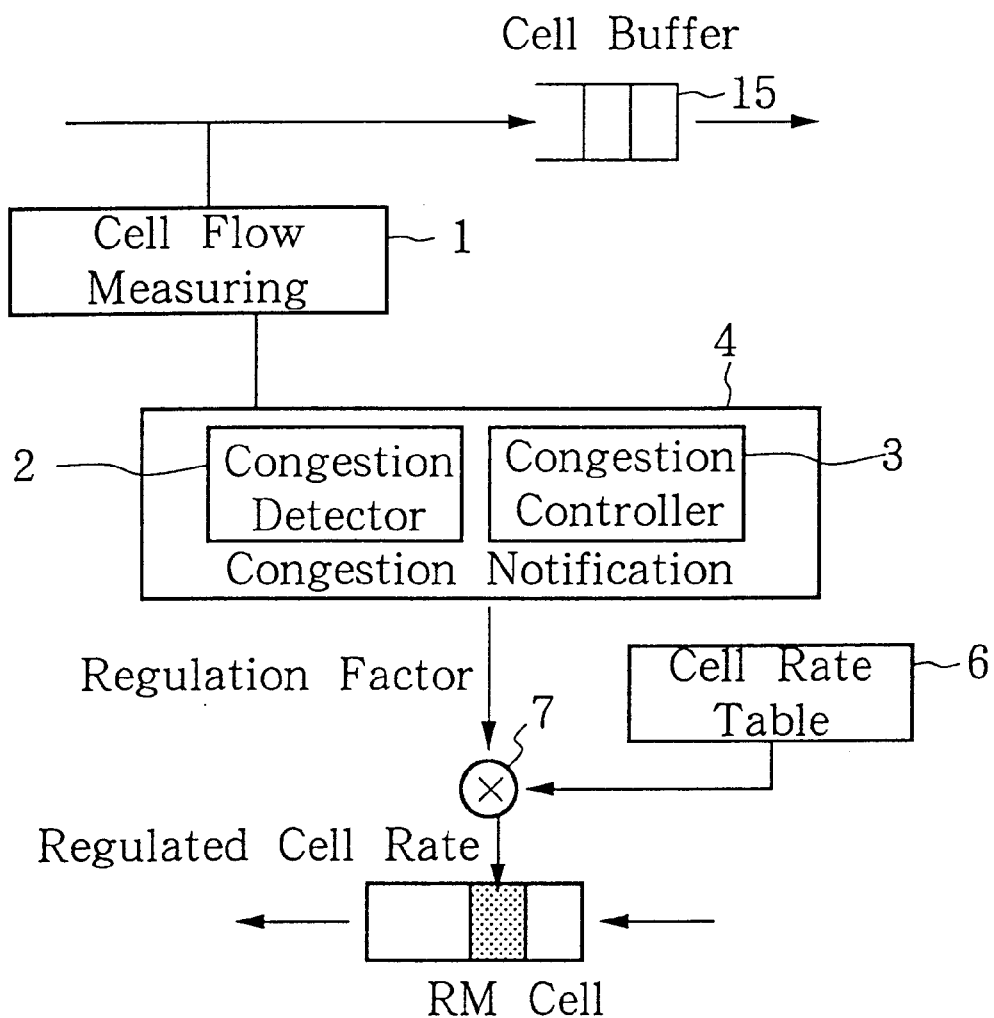
FIG. 43 is a block diagram of a dynamic rate control system according to a sixteenth embodiment of this invention.

A sixteenth embodiment of this invention will be explained with reference to FIG. 43 and FIG. 44, which are block diagrams of a dynamic rate control system according to this sixteenth embodiment. The dynamic rate control system shown in FIG. 43 comprises: cell buffer 15, cell flow measuring part 1, congestion notification part 4 comprising congestion detector 2 and congestion controller 3, rate table 6, and multiplier 7. In rate table 6, the cell rate at which the cell generator transmits cells is entered for each connection. The operation of cell flow measuring part 1, congestion detector 2 and congestion controller 3 is similar to the fifteenth embodiment, but in this sixteenth embodiment of the invention, what is carried in an RM cell flowing in the opposite direction to the direction in which congestion has been detected, and is thereby notified to the cell-generating terminal, is not the regulation factor R, but instead the product of the regulation factor R and the cell rate, this product being obtained by multiplication by multiplier 7. The cell-generating terminal regulates its cell rate using the cell rate entered in that RM cell.

Figure 44:
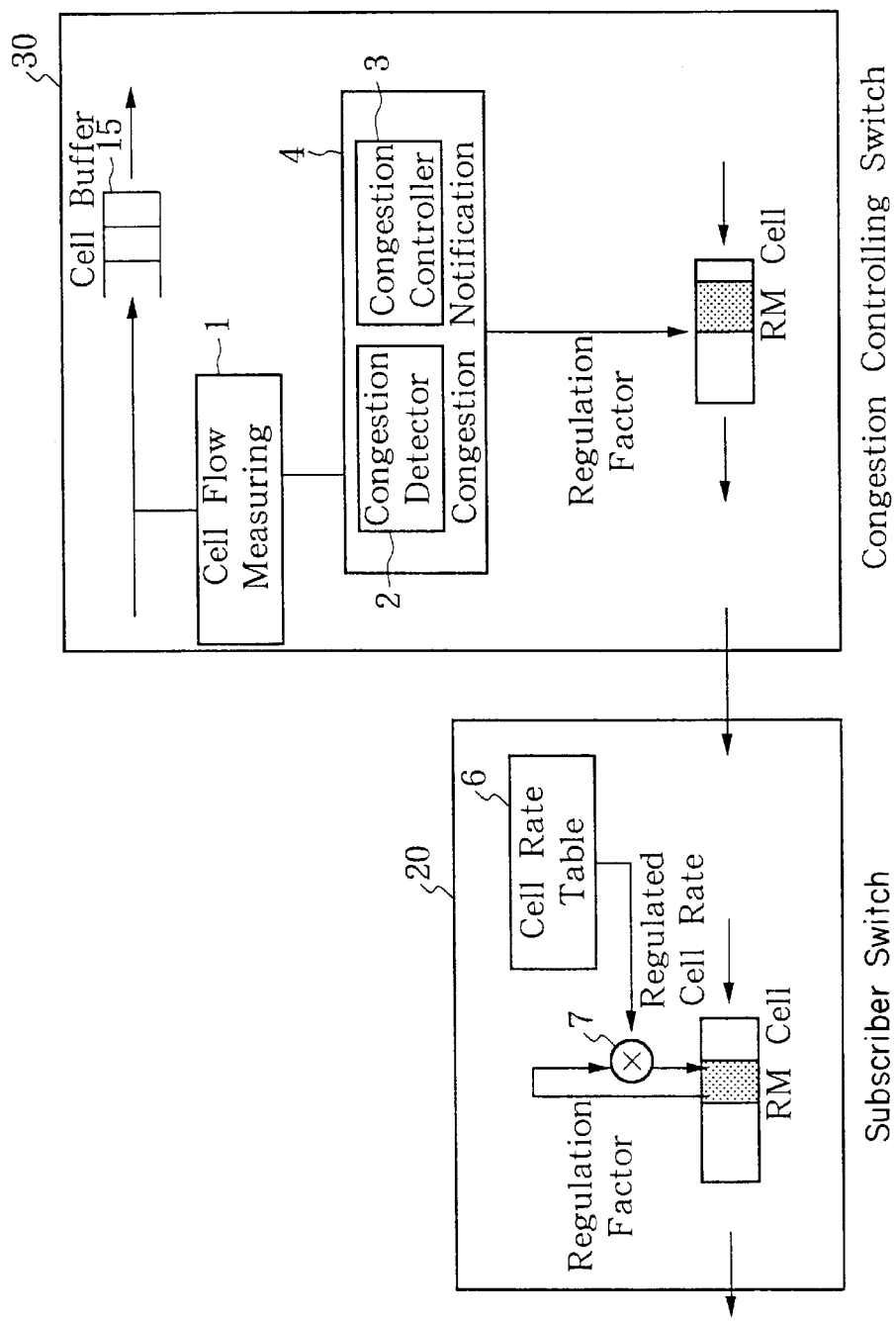
FIG. 44 is another block diagram of a dynamic rate control system according to the sixteenth embodiment of this invention.

FIG. 44 shows an example in which rate table 6 and multiplier 7 are provided in switch 20. It is not necessary for rate table 6 to be provided in congestion controlling switch 30 which is the point at which congestion is detected. Instead, it may be located in subscriber switch 20 which serves terminals. In this case, the RM cells used for notifying that there is congestion carry the regulation factor R while being transferred through the network, and this regulation factor is converted to a cell rate for the transfer from switch 20 to a subscriber.

One advantage of this sixteenth embodiment of the invention is that a cell-generating terminal does not require means for converting the regulation factor R to a regulated cell rate.

(Seventeenth embodiment)

Figure 45:
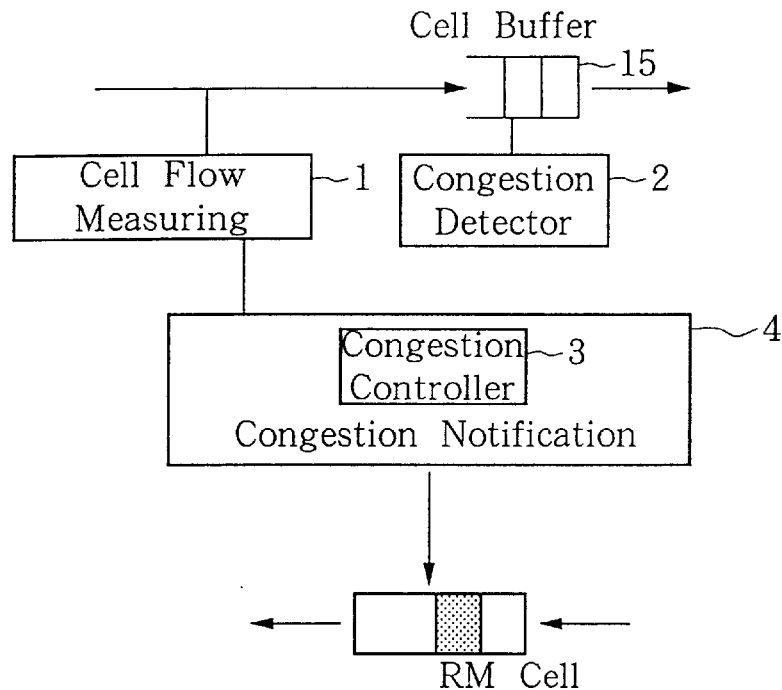
FIG. 45 is a block diagram of a dynamic rate control system according to a seventeenth embodiment of this invention.

A dynamic rate control system according to a seventeenth embodiment of this invention will be explained with reference to FIG. 45, which is a block diagram of a dynamic rate control system according to this seventeenth embodiment. The dynamic rate control system shown in FIG. 45 comprises: cell buffer 15, cell flow measuring part 1, congestion detector 2, and congestion notification part 4 that includes congestion controller 3. Congestion detector 2 detects the build-up of cells in cell buffer 15, i.e. it detects congestion on the basis of queue length. When the queue length exceeds a queue length threshold for congestion detection, it is decided that there is congestion and regulation is started. The decision to cancel the regulation is made in the same way as in the fifteenth and sixteenth embodiments.

(Eighteenth embodiment)

Figure 46:
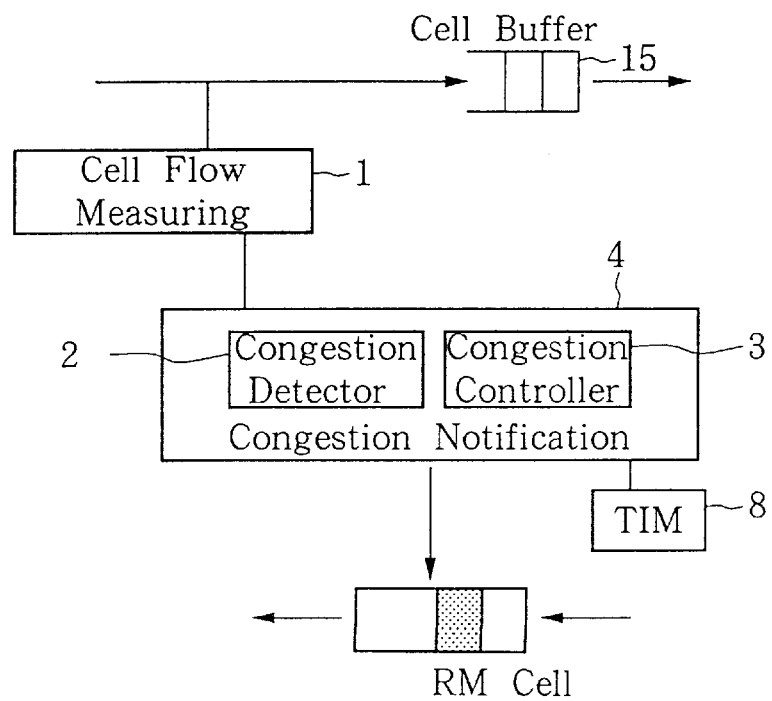
FIG. 46 is a block diagram of a dynamic rate control system according to an eighteenth embodiment of this invention.
Figure 47:
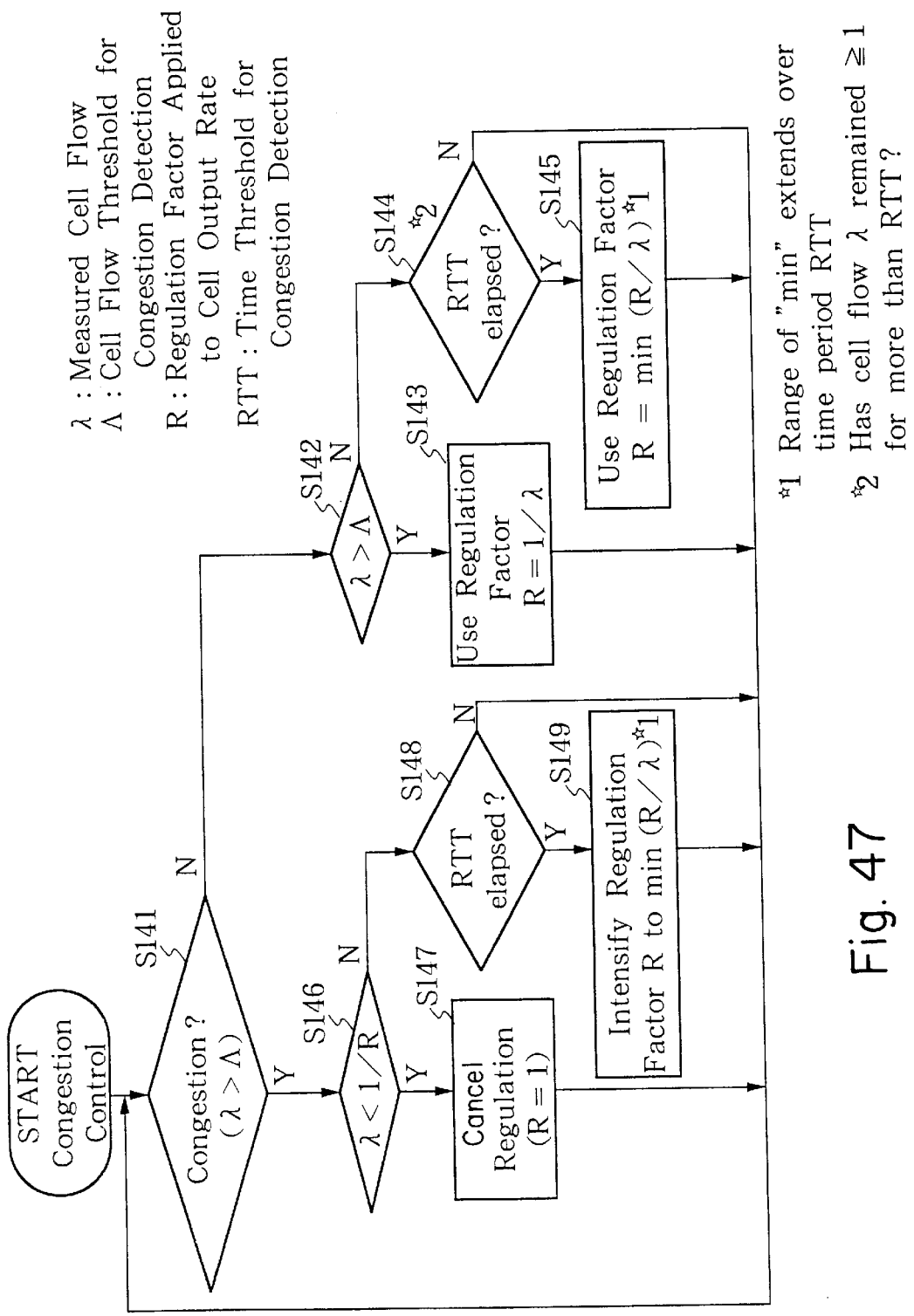
FIG. 47 is flowchart showing the operation of a dynamic rate control system according to the eighteenth embodiment of this invention.

A dynamic rate control system according to an eighteenth embodiment of this invention will be explained with reference to FIG. 46 and FIG. 47. FIG. 46 is a block diagram of the dynamic rate control system according to this eighteenth embodiment, while FIG. 47 is a flowchart showing the operation of the dynamic rate control system. The dynamic rate control system shown in FIG. 46 comprises: cell buffer 15, cell flow measuring part 1, congestion notifying part 4 comprising congestion detector 2 and congestion controller 3, and timer 8. In this eighteenth embodiment of the invention, it is decided that there is congestion when the congestion detection threshold has been exceeded continuously for more than a set time. In addition, if the congestion is not cleared after a set time has elapsed since the decision that there is congestion, the regulation is intensified.

A flowchart of the operation of congestion detector 2 and congestion controller 3 in this eighteenth embodiment of the invention is shown in FIG. 47. If there is no current congestion (S141), the measured cell flow $\lambda$ obtained by cell flow measuring part 1 is compared with a congestion detection threshold $\Lambda$ (S142). If cell flow $\lambda$ has exceeded threshold $\Lambda$, it is judged that there is congestion, whereupon the regulation factor R applied to the cell output rate from a cell generator is set to $1/\lambda$ (S143). Even if the cell flow $\lambda$ does not exceed the threshold $\Lambda$, if cell flow $\lambda$ stays equal to or greater than 1 for more than a set time RTT (S144), it is judged that there is congestion and the regulation factor R to be applied to the cell rate is set to min($1/\lambda$) (S145), where this minimum function ranges over the time period RTT. In other words, the regulation factor R is set to the reciprocal of the maximum cell flow $\lambda_{max}$ over the period RTT (i.e., to the minimum value min).

If there is currently congestion, the cell flow $\lambda$ is compared with the reciprocal 1/R of the current regulation factor R (S146), and if the cell flow $\lambda$ is the smaller, it is decided that the congestion has cleared and the regulation is cancelled (S147). If the cell flow $\lambda$ is not smaller than 1/R, and the congestion has continued for more than a set time RTT (S148), it is judged that there is severe congestion and the regulation factor R to be applied to the cell rate is intensified to min(R/$\lambda$) (S149), where this minimum function ranges over the time period RTT.

(Nineteenth embodiment)

Figure 48:
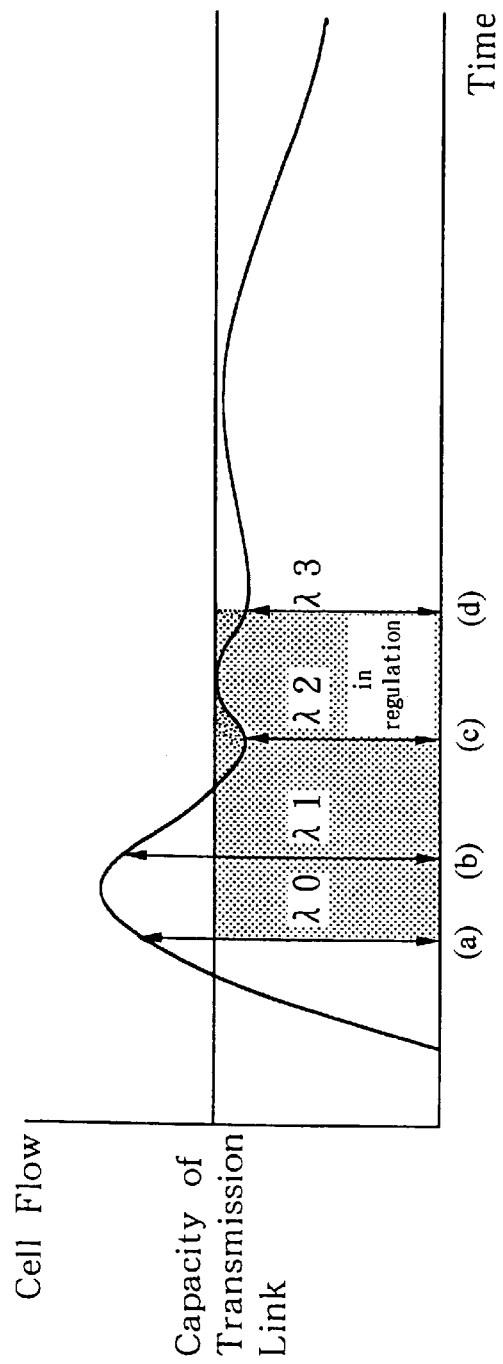
FIG. 48 serves to explain a dynamic rate control system according to a nineteenth embodiment of this invention.
Figure 49:
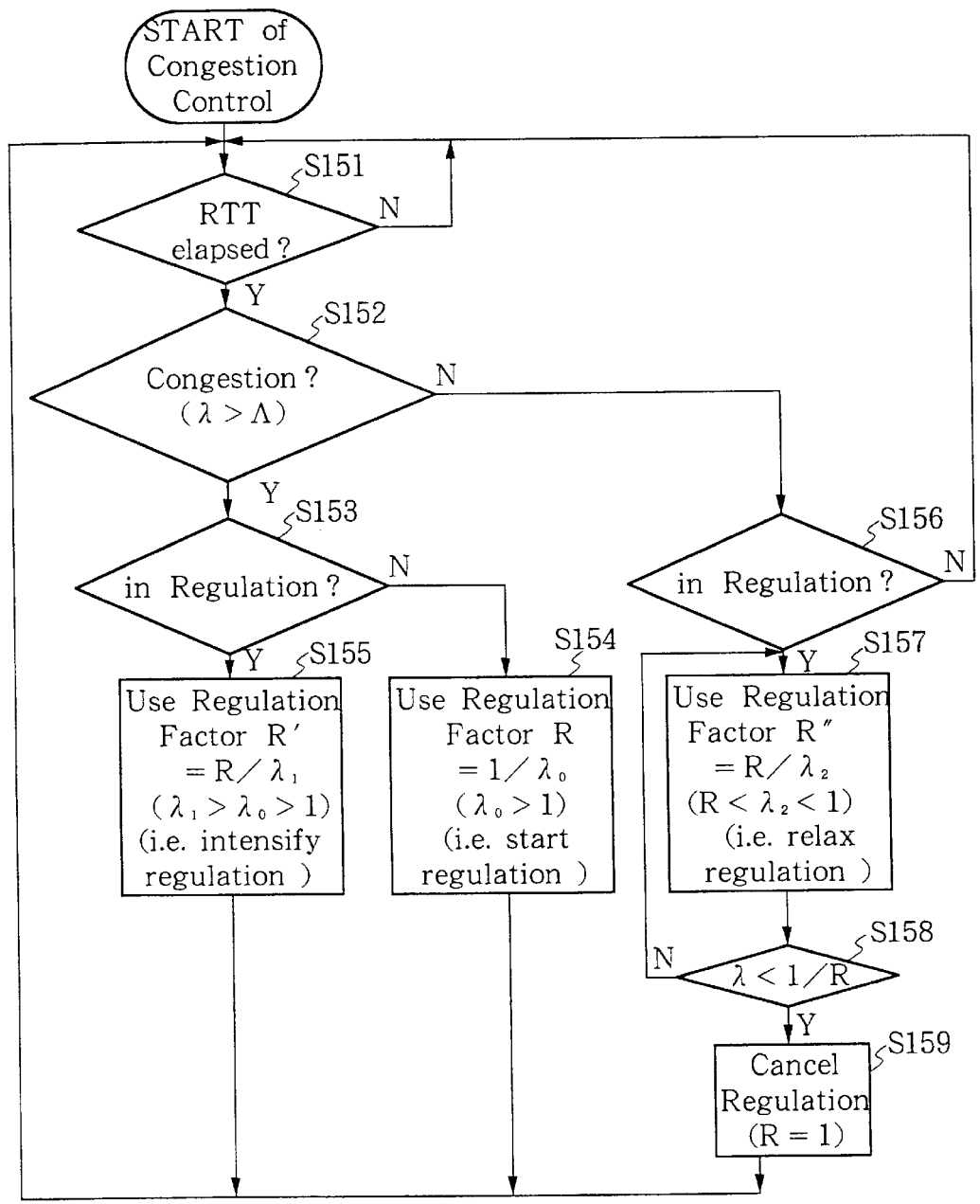
FIG. 49 is a flowchart showing the operation of the congestion detector and the congestion controller in the nineteenth embodiment of this invention.

A dynamic rate control system according to a nineteenth embodiment of this invention will be explained with reference to FIG. 48 and FIG. 49. FIG. 48 serves to explain the dynamic rate control system according to this nineteenth embodiment, while FIG. 49 is a flowchart showing its operation. If the regulation factor R is large, then after congestion has cleared, the network utilization efficiency will decrease until the regulation is cancelled. Accordingly, in this nineteenth embodiment of the invention the cancellation of the regulation is carried out in steps. As shown in FIG. 48 and FIG. 49, the number of cells in each set time period RTT is observed (S151), and if there is a state of congestion at time (a) when a cell rate of $\lambda 0$ is observed (S152), the cell rate of the cell generator is regulated (S153), with the regulation factor at the start of the congestion control being set to R=$1/\lambda 0$ ($\lambda 0$>1) (S154), where $\lambda 0$ is the cell flow from the cell generator. If, at time (b) when a cell rate of $\lambda 1$ is observed, the congestion has still not cleared (S152) after a set time has elapsed (S151) despite regulation having started (S153), the regulation factor is intensified by setting a next regulation factor R'=R/$\lambda 1$ ($\lambda 1$>$\lambda 0$>1) (S155), where $\lambda 1$ is the cell flow from the cell generator and has a value of equal to or greater than 1. If the congestion has cleared at time (c) when a cell rate of $\lambda 2$ is observed (S152, S156), the regulation factor is successively relaxed. That is, the regulation factor is relaxed within a range such that congestion will not re-occur, and is set to R"=R/$\lambda 2$ ($\lambda 2$<1) (S157), where $\lambda 2$ is the cell flow from the cell generator and has a value of less than 1. If the cell flow at time (d), when a cell rate of $\lambda 3$ is observed, is smaller than the reciprocal 1/R of the regulation factor R (S158), the regulation is cancelled (S159). The foregoing procedure enables network utilization efficiency to be increased even while regulation is being applied.

(Twentieth embodiment)

A dynamic rate control system according to a twentieth embodiment of this invention will be explained with reference to FIG. 50 and FIG. 51. FIG. 50 is a flowchart showing the operation of a dynamic rate control system according to this twentieth embodiment, and FIG. 51 shows a call type management table.

A dynamic rate control system according to this twentieth embodiment of the invention is provided in switch 20 as shown in FIG. 2 which served to illustrate the first embodiment, and includes cell rate computation and control part 12. In a cell rate computation and control part 12 according to this twentieth embodiment, the plurality of connection requests is divided into i groups in accordance with the peak rate and the average rate. As shown in FIG. 50, for all this plurality of connection requests the cell loss ratio CLRI of the $i^{th}$ group is calculated as:

$$\text{CLR}_i \leq (a_{all}/c) \cdot (r_i/a_i) \cdot \text{CLR}_{AVE} \tag{Eq.2}$$

where $\text{CLR}_{AVE}$ is the average cell loss ratio, $a_{all}$ is the sum of the average rates, c is the VP bandwidth, $r_i$ is the peak rate of group i, and $a_i$ is the average rate of group i. A group which satisfies this cell loss ratio $\text{CLR}_i$ is allowed to be connected.

In other words, as shown in FIG. 50, as a first step a connection for which there has been a connection request is provisionally entered in the call type management table (S161). As shown in FIG. 51, the call type management table has fields in which are recorded for each call type the number of connections, the peak rate, and the average rate. The peak rate and the average rate of a connection for which there has been a connection request are examined, and if a call type with the values is already entered in the call type management table, the relevant number of connections is incremented by 1. If there is no entry, the values are entered in the peak rate and average rate fields, the connection number field is set to "1", and the call type is added to the table.

Next, as the second step, the average cell loss ratio is calculated. $f_i(x)$, the cell rate probability density function for call type i, is calculated using the call type management table. This is given by:

$$f_i(x) = \begin{cases} \binom{N_i}{k} p_i^k (1-p_i)^{N_i-k}, & \text{if } x = kr_i \text{ for } k = 1, \ldots, N_i \\ 0, & \text{otherwise} \end{cases} \tag{Eq. 3}$$

where $N_i$ is the number of VCs of call type i and $p_i$ is the ratio of average cell rate to peak rate for call type i. $f_i(x)$ is convolved for all call types i to obtain the cell rate probability density function F(x) for all call types. Namely:

$$F(x) = f_1^* \ldots {}^*f_n(x) \tag{Eq.4}$$

where n is the number of call types and * is the convolution operator. The average cell loss ratio $\text{CLR}_{AVE}$ can then be expressed using F(x) as follows (S162):

$$CLR_{AVE} = \int_0^\infty (x-c)F(x)dx \qquad \text{(Eq. 5)}$$

Next, as the third step, the cell loss ratio for each call type is calculated. The cell loss ratio $CLR_i$ for call type i can be obtained from Eq.2:

$$CLR_i \leq (a_{all}/c) \cdot (r_i/a_i) \cdot CLR_{AVE} \qquad \text{(Eq. 2)}$$

where $a_{all}/c$ is a first safety factor which is common to all call types, and $r_i/a_i$ is a second safety factor specific to call type i (S163).

Next, as the fourth step, it is decided whether or not the cell loss ratio $CLR_i$ for call type i is smaller than the standardised value for cell loss ratio, and if it is greater, the decision is made to reject the connection request and the decision flow is terminated (S164).

If it is smaller, processing advances to the next step. Here, by changing the standardized value of the cell loss ratio according to call type, it is possible to meet the requested quality for a plurality of call types.

Next, as the fifth step, it is decided for all call types whether or not the cell loss ratio has been compared with the standardised value, and if it is ascertained for all call types that the decision has been made that the standardized value is satisfied, the processing advances to the next step. If decisions have not been completed for all call types, the third and subsequent processing steps are repeated for the next call type (S165, S167). Finally, as the sixth step, if it has been ascertained in the fifth step that the standardized value of the cell loss ratio is satisfied all call types, the connection request that was provisionally entered in the call type management table in the first step is formally entered and the decision flow terminates (S166).

We claim:

1. A dynamic rate control system which serves a plurality of terminals comprising:

means for setting a virtual path for one of said terminals on the basis of a request from said one terminal;

means for collecting route information which includes information relating to a residual bandwidth of the virtual path once said virtual path has been set up after a cell rate has been specified for said one terminal;

means for holding the cell rate requested by said one terminal;

means for controlling which, on the basis of the route information dynamically controls the cell rate of the virtual path once the virtual path has been set up, said control of said cell rate being provided so that said cell rate is as large as possible, up to the cell rate requested by said one terminal, and so that said cell rate is fair to the plurality of terminals from which there are connection requests;

wherein the means for controlling comprises:

notifying means for notifying information relating to an acceptable cell rate to source-side terminals of connections which said notifying means serves;

means for collecting and holding various information relating to the plurality of connections which said collecting and holding means serves and which share a transmission link, said information comprising an allowed cell rate and an actual cell rate of each connection, a total bandwidth and a total input bandwidth of the shared transmission link, and a number of connections which share said transmission link; and means for calculating each connection, on the basis of the information held in said collecting and holding means, the allowed cell rate which the notifying means notifies to the source-side terminals;

wherein the calculating means includes means for computing which uses a variance of the ratio of said allowed cell rate to the requested cell rate for each connection as an evaluative function, said variance being given by:

$$V(\{ccr_1, ccr_2, \ldots, ccr_n\}, \{r_1, r_2, \ldots, r_n\}) =$$
$$(1/n)\sum_j \left(ccr_j/r_j - (1/n)\sum_i ccr_i/r_i\right)^2$$

and obtains, for connection j (j=1, 2, ..., n), the acceptable cell rate $ERQ_j$ at that switch by means of:

$$ERQ_j = ccr_j - \alpha_j \cdot \text{sign}\{n \cdot ccr_j/r_j - w \cdot \Sigma_i ccr_i/r_i\}$$

where $\Sigma_i$ and $\Sigma_j$ are respectively the sums of from i=1 to i=n and from j=1 to j=n, $ccr_j$ and $r_j$ are respectively the allowed cell rate and the requested cell rate of connection j, n is the number of connections transmitting data, $\alpha_j$ and w are weighting functions, and sign { } is a function that indicates the sign of the value inside the curly brackets.

2. A dynamic rate control system which serves a plurality of terminals comprising:

means for setting a virtual path for one of said terminals on the basis of a request from said one terminal;

means for collecting route information which includes information relating to a residual bandwidth of the virtual path once said virtual path has been set up after a cell rate has been specified for said one terminal;

means for holding the cell rate requested by said one terminal;

means for controlling which, on the basis of the route information dynamically controls the cell rate of the virtual path once the virtual path has been set up, said control of said cell rate being provided so that said cell rate is as large as possible, up to the cell rate requested by said one terminal, and so that said cell rate is fair to the plurality of terminals from which there are connection requests;

wherein the means for controlling comprises:

means for notifying, when a terminal which said notifying means serves becomes a source terminal, to that terminal information relating to an acceptable cell rate;

means for collecting and holding various information relating to the connection over which said terminal which said control means serves becomes a source terminal, and relating to the plurality of connections that share the route, said information comprising an allowed cell rate and an actual cell rate of each connection, a bandwidth and a total input bandwidth of the shared route, and a number of connections which share said route; and means for calculating for each connection, on the basis of the information held in said collecting and holding means, the acceptable cell rate which the notifying means notifies;

wherein the calculating means includes means for computing which uses a variance of the ratio of said allowed cell rate to the requested cell rate for each connection as an evaluative function, said variance being given by:

$$V(\{ccr_1, ccr_2, \ldots, ccr_n\}, \{r_1, r_2, \ldots, r_n\}) =$$
$$(1/n)\sum_j \left(ccr_j/r_j - (1/n)\sum_i ccr_i/r_i\right)^2$$

and obtains, for connection j (j=1, 2, . . . , n), the acceptable cell rate $ERQ_j$ at that switch by means of:

$$ERQ_j = ccr_j - \alpha_j \cdot \text{sign}\{n \cdot ccr_j/r_j - w \cdot \Sigma_i ccr_i/r_i\}$$

where $\Sigma_i$ and $\Sigma_j$ are respectively the sums of from i=1 to i=n and from j=1 to j=n, $ccr_j$ and $r_j$ are respectively the allowed cell rate and the requested cell rate of connection j, n is the number of connections transmitting data, $\alpha_j$ and w are weighting functions, and sign { } is a function that indicates the sign of the value inside the curly brackets.

3. A dynamic rate control system as set forth in claim 1 or 2, wherein $\alpha_j$ is a positive constant.

4. A dynamic rate control system as set forth in claim 1 or 2, wherein $\alpha_j$ is equal to the absolute value of:

$$\{n \cdot ccr_j/r_j - w \cdot \Sigma_i ccr_i/r_i\}.$$

5. A dynamic rate control system as set forth in claim 1 or 2, wherein w is a decreasing function of said total input bandwidth.

6. A dynamic rate control system as set forth in claim 1 or 2, wherein w is a function of said total bandwidth and said total input bandwidth as calculated by:

$$w = (B_{all} + p_1)/(B_{use} + p_2) \times p_3$$

where $B_{all}$ is the total bandwidth, $B_{use}$ is the total bandwidth, $p_2$ is a constant for preventing the denominator becoming zero, $p_1$ is a constant for correcting $p_2$, and $p_3$ is a constant for setting the allowable width.

7. A dynamic rate control system as set forth in claim 1 or 2, wherein w is a function of the total input bandwidth as calculated by:

$$w = -p_4 \cdot B_{use} + p_5$$

where $B_{use}$ is the total input bandwidth, $p_4$ is a positive constant for setting the allowable width and $p_5$ is a correction constant.

8. A dynamic rate control system as set forth in claim 1 or 2, wherein when the cell rate requested for a connection is not clear and said one terminal is transmitting at or above a fixed proportion of a current allowed cell rate, a maximum value that can be permitted by the allowed cell rate in that connection is regarded as the requested cell rate, and otherwise, a minimum value that can be permitted by the allowed cell rate is regarded as the requested cell rate.

9. A dynamic rate control system which serves a plurality of terminals comprising:

means for setting a virtual path for one of said terminals on the basis of a request from said one terminal;

means for collecting route information which includes information relating to a residual bandwidth of the virtual path once said virtual path has been set up after a cell rate has been specified for said one terminal;

means for holding the cell rate requested by said one terminal;

means for controlling which, on the basis of the route information dynamically controls the cell rate of the virtual path once the virtual path has been set up, said control of said cell rate being provided so that said cell rate is as large as possible, up to the cell rate requested by said one terminal, and so that said cell rate is fair to the plurality of terminals from which there are connection requests the means for controlling including:

means for measuring cell flow;

means for comparing said measured cell flow with a threshold;

means for sending, in accordance with a result of said comparison, regulation information to the terminal constituting a source terminal of the cells, said regulation information including a cell flow regulation factor R; and means for maintaining, when regulation is being applied to said source terminal reaches a preset value below the threshold; and the means for comparing includes means for observing a variation in the results of the comparison over a predetermined period of time.

10. A dynamic rate control system as set forth in claim 9, wherein a plurality of the regulation factors (R,R',R") are set, and said plurality of regulation factors (R,R',R") are applied stepwise in accordance with the results of the observing means.

11. A dynamic rate control system as set forth in claim 10, wherein the plurality of regulation factors R, R' and R" are respectively:

$R = 1/\lambda 0$ ($\lambda 0 > 1$)

$R' = R/\lambda 1$ ($\lambda 1 > \lambda 0 > 1$)

$R'' = R/\lambda 2$ ($R < \lambda 2 < 1$)

where $\lambda 0$, $\lambda 1$ and $\lambda 2$ are the cell flows at different measurement times, and threshold $\Lambda$ is taken as 1.

12. A dynamic rate control system which serves a plurality of terminals comprising:

means for setting a virtual path for one of said terminals on the basis of a request from said one terminal;

means for collecting route information which includes information relating to a residual bandwidth of the virtual path once said virtual path has been set up after a cell rate has been specified for said one terminal;

means for holding the cell rate requested by said one terminal;

means for controlling which, on the basis of the route information dynamically controls the cell rate of the virtual path once the virtual path has been set up, said control of said cell rate being provided so that said cell rate is as large as possible, up to the cell rate requested by said one terminal, and so that said cell rate is fair to the plurality of terminals from which there are connection requests;

wherein the control means includes means for deciding whether or not to accept a connection request from a terminal in accordance with the cell loss ratio, and said means for deciding comprises:

means for computing a cell loss ratio $CLR_i$ of the $i^{th}$ group; and means for permitting the connection of a group which satisfies said cell loss ratio $CLR_i$; and the means for computing the cell loss ratio $CLR_i$ comprises means for classifying the plurality of connection requests into i groups in accordance with their peak rate and average rate, and which computes the cell loss ratio $CLR_i$ of the $i^{th}$ group as:

$$CLR_i \leq (a_{all}/c) \cdot (r_i/a_i) \cdot CLR_{AVE}$$

where, for all said plurality connection requests, $CLR_{AVE}$ is the average cell loss ratio, $a_{all}$ is the sum of the average rates, c is the VP bandwidth, $r_i$ is the peak rate of group i, and $a_i$ is the average rate of group i.

* * * * *